(12) United States Patent
Sun et al.

(10) Patent No.: US 12,217,069 B2
(45) Date of Patent: Feb. 4, 2025

(54) OPERATION SEQUENCE ADDING METHOD, ELECTRONIC DEVICE, AND SYSTEM

(71) Applicant: HUAWEI TECHNOLOGIES CO., LTD., Guangdong (CN)

(72) Inventors: Xilin Sun, Shenzhen (CN); Jie Li, Shenzhen (CN); Yinzhu Cheng, Shenzhen (CN); Min Liu, Nanjing (CN); Cheng Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/336,042

(22) Filed: Jun. 16, 2023

(65) Prior Publication Data

US 2023/0418630 A1   Dec. 28, 2023

Related U.S. Application Data

(63) Continuation of application No. PCT/CN2021/109941, filed on Jul. 31, 2021.

(30) Foreign Application Priority Data

Dec. 18, 2020 (CN) .......................... 202011503777.1

(51) Int. Cl.
   *G06F 9/451*   (2018.01)
   *G06F 3/0484*   (2022.01)
(52) U.S. Cl.
   CPC ............ *G06F 9/451* (2018.02); *G06F 3/0484* (2013.01)
(58) Field of Classification Search
   CPC .......... G06F 9/451; G06F 3/0484; G06F 8/38; H04M 1/72403
   See application file for complete search history.

(56) References Cited

U.S. PATENT DOCUMENTS

2003/0016247 A1   1/2003   Lai et al.
2014/0115539 A1*  4/2014   Chou .................. G06F 16/9566
                                             715/835
(Continued)

FOREIGN PATENT DOCUMENTS

CN   101179781 A   5/2008
CN   102929544 A   2/2013
(Continued)

OTHER PUBLICATIONS

Sunsgame Channel:"Macro Android 2023", Sep. 17, 2020,XP093129339, total 2 pages.
(Continued)

*Primary Examiner* — Cao H Nguyen

(57) ABSTRACT

An operation sequence adding method, an electronic device, and a system are provided. The method includes: detecting a first operation performed by a user on a first control; obtaining an event type of the first operation and name information of a first application in response to the first operation; displaying a second interface of the first application in response to the first operation, and detecting a second operation performed by the user on a second control; obtaining a second control identifier and an event type of the second operation in response to the second operation; saving the name information of the first application, the second control identifier, and the event type of the second operation; displaying a third interface of a second application, where the third interface of the second application includes a third control; detecting a third operation performed by the user on the third control; and displaying the second interface of the first application in response to the third operation. Therefore, an operation of a user is recorded and played back on an electronic device, an operation procedure of the user is simplified, and user experience is improved.

20 Claims, 47 Drawing Sheets

(56) References Cited

U.S. PATENT DOCUMENTS

2014/0317555 A1* 10/2014 Choi .................. G06F 3/04817
                                                      715/781
2023/0251773 A1*  8/2023 Zhang ................ G06F 3/04842
                                                      715/765

FOREIGN PATENT DOCUMENTS

| CN | 103853658 A | 6/2014 |
| CN | 106557223 A | 4/2017 |
| CN | 108089859 A | 5/2018 |
| CN | 108304105 A | 7/2018 |
| CN | 109976644 A | 7/2019 |
| CN | 110417988 A | 11/2019 |
| CN | 111143200 A | 5/2020 |
| JP | 2012003487 A | 1/2012 |

OTHER PUBLICATIONS

Bartels Media Gmbh:"Macro Recorder-Smart Record",Mar. 25, 2020,XP093129342, total 2 pages.

* cited by examiner

| CONT. FROM FIG. 5A | CONT. FROM FIG. 5B | CONT. FROM FIG. 5C |
|---|---|---|
| 1 | 2 | 3 |
| action:"startApp", packageName:"xxx", | action:"click", tag:"gift", ViewPath:"xxx" | action:"click", tag:"signing", ViewPath:"xxx" |

FIG. 5D

| Operation event | Shortcut operation sequence | |
|---|---|---|
| Select an H-mall application in an interface of a shortcut operation application | {<br>  "mEventTime": 663896,<br>  "mEventType": 64,<br>  "mPackageName": "com.vmall.client"}, | 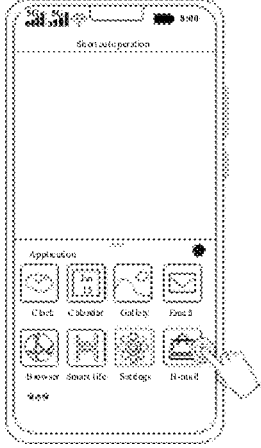 |
| Display a home page of the H-mall application | {<br>  "mClassName": "android.widget.LinearLayout",<br>  "mEventTime": 668135,<br>  "mEventType": 128,<br>  "mPackageName": "com.vmall.client",<br>  "mWindowName": "com.vmall.client/<br>com.vmall.client.base.fragment.VmallWapActivity"} | 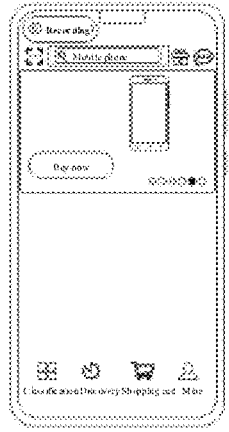 |

FIG. 6A

| Operation event | Shortcut operation sequence | |
|---|---|---|
| Click a "gift" control | {<br>  "mClassName": "android.widget.LinearLayout",<br>  "mRccTag": "gift",<br>  "mEventTime": 669343,<br>  "mEventType": 1,<br>  "mPackageName": "com.vmall.client",<br>  "mResourceId": 2131298148,<br>  "mToIndex": 0,<br>  "mViewPath": -1878077078,<br>  "mWindowName": "com.vmall.client/<br>com.vmall.client.base.fragment.VmallWapActivity"} | |
| Click a "Sign-in" control | {<br>  "mClassName": "android.widget.LinearLayout",<br>  "mEventTime": 670661,<br>  "mEventType": 1,<br>  "mPackageName": "com.vmall.client",<br>  "mRccTag": "sign-in",<br>  "mResourceId": 2131297323,<br>  "mViewPath": 1260377298,<br>  "mWindowName": "com.vmall.client/<br>com.vmall.client.base.fragment.VmallWapActivity"} | |

FIG. 6B

| Event data structure | Event type |
|---|---|
| TYPE_VIEW_CLICKED = 1 | Click event |
| TYPE_VIEW_LONG_CLICKED = 2 | Long press event |
| TYPE_VIEW_ITEM_CLICKED = 4 | Item click event |
| TYPE_VIEW_TEXT_CHANGED = 8 | Text editing event |
| TYPE_VIEW_SCROLLED = 16 | Scrolling event |
| TYPE_VIEW_PROGRESS_CHANGED = 32 | Progress changing event |
| TYPE_START_APP = 64 | Application startup event |
| TYPE_WINDOW_STATE_CHANGED = 128 | Window changing event |

FIG. 6C

OPERATION SEQUENCE ADDING METHOD, ELECTRONIC DEVICE, AND SYSTEM

CROSS REFERENCE TO RELATED APPLICATION

This application is a continuation of International Application No. PCT/CN2021/109941, filed on Jul. 31, 2021, which claims priority to Chinese Patent Application No. 202011503777.1, filed on Dec. 18, 2020. Both of the aforementioned applications are hereby incorporated by reference in their entireties.

TECHNICAL FIELD

This application relates to the field of wireless communication, and in particular, to an operation sequence adding method, an electronic device, and a system.

BACKGROUND

With development and popularization of smartphones, more third-party applications are also developed and used in the smartphones to implement more functions, such as an instant messaging application, a video application, a music application, and a shopping application. A user can implement different functions by operating the third-party applications. For some third-party applications, the user performs an operation at a high frequency, for example, forum sign-in, or attendance software clock-in. For these application scenarios, the user needs to perform continuous operations on a corresponding third-party application.

To simplify an operation procedure of the user, the user may set a shortcut instruction. However, in this manner, the user needs to assign logic between operations when setting the shortcut instruction, and the user needs to have specific programming knowledge. After setting the shortcut instruction, the user may select a corresponding shortcut instruction, so that the set shortcut instruction is automatically executed on a mobile phone.

The user can alternatively use Quick Macro software, and make a script or use an Android assistant mode, to record a click position of the user on a screen, and play back a click operation of the user on the mobile phone. However, when an application is updated or resolution of a device screen on which a click operation of the user is played back changes, an error occurs during playback of the click operation of the user.

SUMMARY

In view of this, embodiments of the present invention provide an operation sequence adding method, to record operations of a user on an electronic device, and add recorded continuous operations as a shortcut icon. According to the method, the user does not need to have programming knowledge, and the user performs an operation on a third-party application of the electronic device to complete recording of the operation of the user, and adds the recorded operation as a shortcut operation, thereby reducing learning costs of the user. In addition, according to the method, the operation of the user can be played back on a plurality of electronic devices, thereby simplifying an operation procedure of the user and improving user experience.

According to a first aspect, an embodiment of this application provides an operation sequence adding method. The method includes: displaying a first interface, where the first interface includes a first control, and the first control is associated with a first application; detecting a first operation performed by a user on the first control; obtaining an event type of the first operation in response to the first operation; determining that the event type of the first operation meets a first preset condition, and obtaining name information of the first application; displaying a second interface in response to the first operation, where the second interface is associated with the first application, and the second interface includes a second control; determining first path information of the second control, where the first path information of the second control is used to indicate a position of the second control in a layout of the second interface; detecting a second operation performed by the user on the second control; obtaining an event type of the second operation in response to the second operation; determining that the event type of the second operation meets a second preset condition, and obtaining the first path information of the second control; displaying a third interface in response to the second operation; saving the name information of the first application, the event type of the first operation, the first path information of the second control, and the event type of the second operation; displaying a fourth interface, where the fourth interface is associated with a second application, the fourth interface includes a third control, and the third control is associated with the first application; detecting a third operation performed by the user on the third control; displaying the second interface in response to the third operation based on the name information of the first application and the event type of the first operation; and displaying the third interface. According to the foregoing setting method, an application name, an operation event type, a control tag, and control path information can be obtained and saved, to position a control by using the control tag or the control path information, thereby facilitating accurate positioning of the control and improving user experience.

In a possible implementation of the first aspect, the second interface includes a fourth control and a fifth control, the fourth control is associated with the second control, and the fifth control is associated with the second control; the second control has second sub-path information and third sub-path information, the second sub-path information is used to indicate a position of the second control relative to the fourth control in the layout of the second interface, and the third sub-path information is used to indicate a position of the second control relative to the fifth control in the layout of the second interface; and the determining first path information of the second control includes: determining the first path information of the second control based on the second sub-path information and the third sub-path information. In the foregoing setting manner, path information can be used as an attribute to accurately position a control, and the control can be accurately positioned by using the path information, thereby accurately recording an operation of the user and playing back the operation of the user, and improving user experience.

According to the first aspect or any implementation of the first aspect, the second control is a sub-control of the fourth control, and the fifth control is a sub-control of the second control.

According to the first aspect or any implementation of the first aspect, the displaying the third interface includes: displaying the third interface based on the first path information of the second control and the event type of the second operation. In the foregoing setting manner, in a playback process of the operation of the user, a control to be operated can be accurately positioned by using path information, thereby accurately playing back the operation and improving user experience.

According to the first aspect or any implementation of the first aspect, the second control has a second control tag, and the second control tag is used to identify the second control; and the displaying the third interface includes: displaying the third interface based on the second control tag and the event type of the second operation. In the foregoing setting manner, in a playback process of the operation of the user, a control to be operated can be accurately positioned by using a control tag, thereby accurately playing back the operation and improving user experience. When an application is updated or a playback device is replaced, the control tag remains unchanged. Therefore, when the application is updated or the playback device is replaced, the control can still be accurately positioned, thereby accurately playing back the operation and improving user experience.

According to the first aspect or any implementation of the first aspect, before the displaying a first interface, the method further includes: displaying a fifth interface, where the fifth interface includes a sixth control; detecting a fourth operation performed by the user on the sixth control; and displaying the first interface in response to the fourth operation. In the foregoing setting manner, the user can be prompted to add a shortcut operation.

According to the first aspect or any implementation of the first aspect, the fifth interface is associated with the second application.

According to the first aspect or any implementation of the first aspect, the method further includes: sending the name information of the first application, the event type of the first operation, the first path information of the second control, and the event type of the second operation to a first electronic device; displaying a sixth interface on the first electronic device, where the sixth interface has a seventh control, and the seventh control is associated with the first application; detecting a fifth operation performed by the user on the seventh control; displaying the second interface on a second electronic device in response to the fifth operation based on the name information of the first application and the event type of the first operation; and displaying the third interface on the second electronic device. In the foregoing setting manner, the first electronic device can control the second electronic device to play back a recorded shortcut operation, thereby improving user experience.

According to the first aspect or any implementation of the first aspect, the method further includes: sending the name information of the first application, the event type of the first operation, the first path information of the second control, and the event type of the second operation to a first electronic device; displaying a sixth interface on the first electronic device, where the sixth interface has a seventh control, and the seventh control is associated with the first application; detecting a fifth operation performed by the user on the seventh control; displaying a seventh interface on a third electronic device in response to the fifth operation based on the name information of the first application and the event type of the first operation, where the seventh interface is associated with the second interface, and the seventh interface is associated with the first application; and displaying an eighth interface on the third electronic device, where the eighth interface is associated with the third interface, and the eighth interface is associated with the first application. In the foregoing setting manner, the first electronic device can control the third electronic device to play back a recorded shortcut operation, to implement distributed use of a shortcut operation manner, so that the user can flexibly play back the recorded operation by using different electronic devices, thereby improving user experience.

According to the first aspect or any implementation of the first aspect, the method further includes: displaying the third interface and an eighth control in response to the second operation, where the eighth control is associated with the second application; detecting a sixth operation on the eighth control; and displaying a ninth interface in response to the sixth operation, where the ninth interface is associated with the second application.

According to the first aspect or any implementation of the first aspect, the ninth interface has a ninth control, and the ninth control is associated with the second application; and after the displaying a ninth interface, the method further includes: detecting a seventh operation on the ninth control; and displaying the fourth interface in response to the seventh operation.

According to the first aspect or any implementation of the first aspect, the first path information of the second control is a string or a hash value. In the foregoing setting manner, a control can be directly positioned by using a string, to quickly find a position of the control. Alternatively, a control can be positioned by using a hash value. In this case, less memory is occupied for saving the hash value. This is conducive to saving system memory resources.

According to the first aspect or any implementation of the first aspect, the event type is any one of a click event, a long press event, an item click event, a text editing event, a scrolling event, a progress changing event, an application startup event, and a window changing event. According to the first aspect or any implementation of the first aspect, the first operation is any one of a click operation, a double-click operation, a knuckle tap, and a multi-finger selection operation; the second operation is any one of a click operation, a double-click operation, a knuckle tap, a multi-finger selection operation, a long press operation, an item click operation, a text editing operation, a scrolling operation, a sliding operation, and a progress changing operation; the third operation is any one of a click operation, a double-click operation, a knuckle tap, a multi-finger selection operation, a long press operation, an item click operation, a text editing operation, a scrolling operation, a sliding operation, and a progress changing operation; the fourth operation is any one of a click operation, a double-click operation, a knuckle tap, a multi-finger selection operation, a long press operation, an item click operation, a text editing operation, a scrolling operation, a sliding operation, and a progress changing operation; the fifth operation is any one of a click operation, a double-click operation, a knuckle tap, a multi-finger selection operation, a long press operation, an item click operation, a text editing operation, a scrolling operation, a sliding operation, and a progress changing operation; the sixth operation is any one of a click operation, a double-click operation, a knuckle tap, a multi-finger selection operation, a long press operation, an item click operation, a text editing operation, a scrolling operation, a sliding operation, and a progress changing operation; and the seventh operation is any one of a click operation, a double-click operation, a knuckle tap, a multi-finger selection operation, a long press operation, an item click operation, a text editing operation, a scrolling operation, a sliding operation, and a progress changing operation.

According to the first aspect or any implementation of the first aspect, the first preset condition is that the first operation is any one of a click operation, a double-click operation, a knuckle tap, and a multi-finger selection operation; or the second preset condition is that the second operation is any one of a click operation, a double-click operation, a knuckle tap, and a multi-finger selection operation.

According to the first aspect or any implementation of the first aspect, the first electronic device, the second electronic device, and the third electronic device are logged in to by using a unified account. In the foregoing setting manner, a device that does not record or save operation information of the user on the device can also share and synchronize a recorded operation sequence of the user by logging in to a same account, so that the user can more flexibly record and play back an operation by using different devices, thereby improving user experience.

According to a second aspect, an embodiment of this application provides an electronic device. The electronic device includes one or more touchscreens, one or more memories, and one or more processors, where the one or more memories store one or more computer programs; and when the one or more processors execute the one or more computer programs, the electronic device is enabled to implement the method according to the first aspect or any implementation of the first aspect.

According to a third aspect, an embodiment of this application provides a system. The system includes a first electronic device, a second electronic device, and a third electronic device, and the system may implement the method according to the first aspect or any implementation of the first aspect.

According to a fourth aspect, an embodiment of this application provides a computer-readable storage medium. The computer-readable storage medium includes instructions, where when the instructions are run on an electronic device, the electronic device is enabled to perform the method according to the first aspect or any implementation of the first aspect.

According to a fifth aspect, an embodiment of this application provides a computer program product. When the computer program product runs on an electronic device, the electronic device is enabled to perform the method according to the first aspect or any implementation of the first aspect.

According to the foregoing solutions, operations of the user are recorded on the electronic device, and recorded continuous operations are added as a shortcut icon. According to the method, the user does not need to have programming knowledge, and the user performs an operation on a third-party application of the electronic device to complete recording of the operation of the user, and adds the recorded operation as a shortcut operation, thereby reducing learning costs of the user. In addition, according to the method, the operation of the user can be played back on a plurality of electronic devices, thereby simplifying an operation procedure of the user and improving user experience.

BRIEF DESCRIPTION OF DRAWINGS

To describe embodiments of the present invention more clearly, the following briefly describes the accompanying drawings for describing embodiments. It is clear that the accompanying drawings in the following description show merely some embodiments of the present invention, and a person of ordinary skill in the art may derive other drawings from these accompanying drawings without creative efforts.

FIG. 5A, FIG. 5B, FIG. 5C, and FIG. 5D are a schematic diagram of recording an operation of a user according to an embodiment of this application;

FIG. 6A is a schematic diagram of a shortcut operation sequence according to an embodiment of this application;

FIG. 6B is a schematic diagram of a shortcut operation sequence according to an embodiment of this application;

FIG. 6C is a schematic diagram of an event type according to an embodiment of this application;

DESCRIPTION OF EMBODIMENTS

Figure 1:
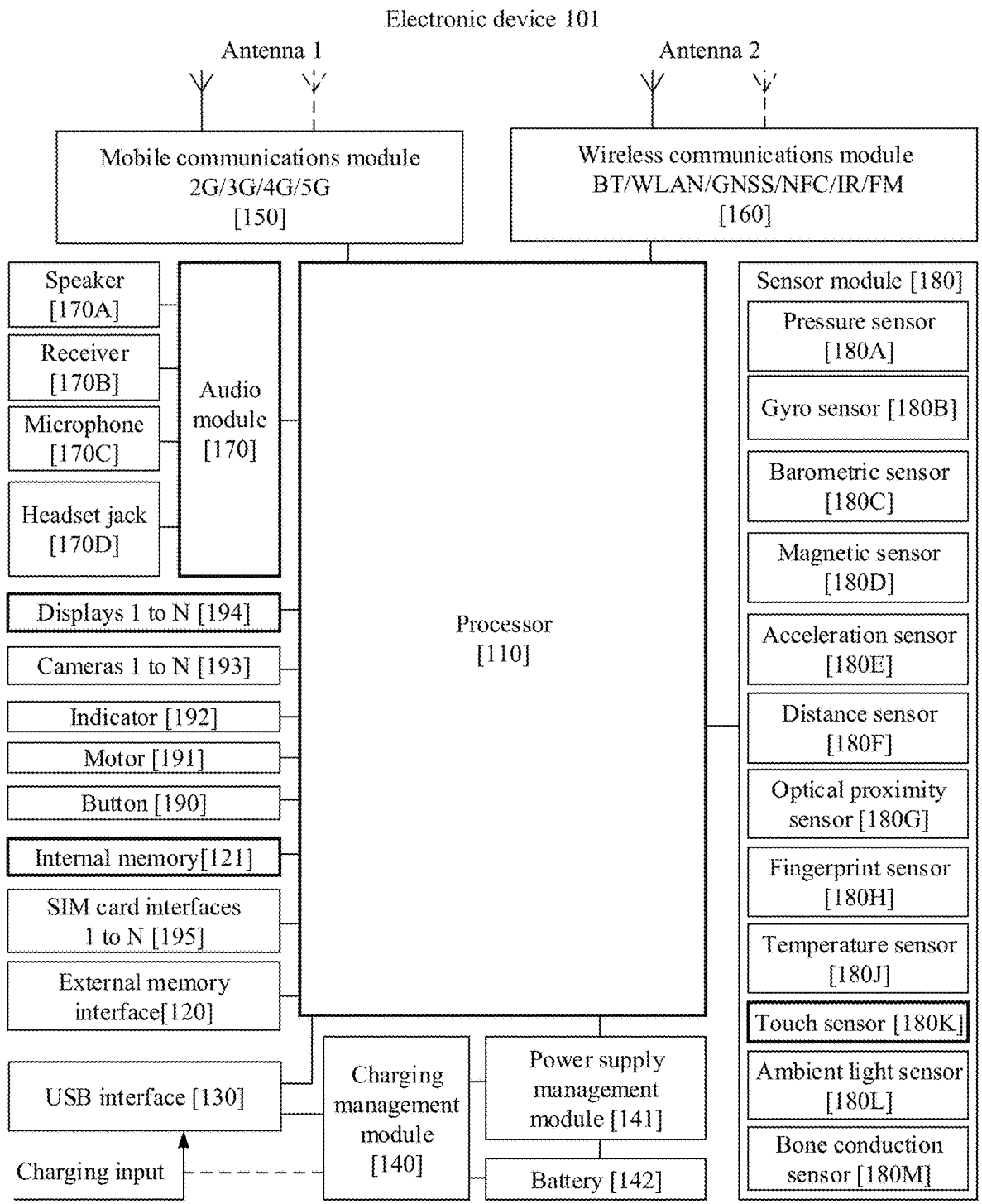
FIG. 1 is a schematic diagram of a structure of an electronic device according to an embodiment of this application.

Terms used in the following embodiments of this application are merely for the purpose of describing specific embodiments, but are not intended to limit this application. Terms "one", "a", "the", "the foregoing", and "this" of singular forms used in this specification and the appended claims of this application are also intended to include plural forms such as "one or more", unless otherwise specified in the context clearly. It should be further understood that the term "and/or" used in this application indicates and includes any one or all of possible combinations of one or more listed items.

Reference to "an embodiment", "some embodiments", or the like described in this specification indicates that at least one embodiment of this application includes a specific feature, structure, or characteristic described with reference to embodiments. Therefore, in this specification, statements, such as "in an embodiment", "in some embodiments", and "in some other embodiments", that appear at different places do not necessarily mean referring to a same embodiment, but mean "one or more but not all of embodiments", unless otherwise specifically emphasized. The terms "include", "comprise", "have", and their variants all mean "include but are not limited to", unless otherwise specifically emphasized.

According to the context, the term "when . . . " used in the following embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", when (a stated condition or event) is detected", or "in response to detecting (a stated condition or event)".

In the specification, claims, and accompanying drawings of the present invention, the terms "first", "second", "third", "fourth", and the like (if any) are intended to distinguish between similar objects but do not necessarily indicate a specific order or sequence. It should be understood that data used in such a way are interchangeable in proper cases, so that embodiments described herein can be implemented in an order other than the order illustrated or described herein.

It should be understood that, although terms such as "first electronic device" and "second electronic device" may be used to describe various electronic devices in this specification, these electronic devices shall not be limited by these terms. These terms are merely used for distinguishing an electronic device from another electronic device. For example, the first electronic device may be named a second electronic device and the second electronic device may be similarly named a first electronic device without departing from the scope of this application. Both the first electronic device and the second electronic device are electronic devices, but the first electronic device and the second electronic device may not be a same electronic device, or may be a same electronic device in some scenarios.

The following describes an electronic device (for example, a first electronic device or a second electronic device), a user interface used for such an electronic device, and an embodiment used for using such an electronic device. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, for example, a laptop computer (Laptop) with a touch panel or a touch-sensitive surface. In some other embodiments, the electronic device may not be a portable electronic device, but a desktop computer. It should be further understood that, in some other embodiments, the electronic device may alternatively be a smart home device that is related to a home life and that uses a wiring technology, a network communication technology, a security protection technology, an automatic control technology, an audio and video technology, and the like, for example, a smart television.

The following describes embodiments of the present invention with reference to the accompanying drawings in embodiments of the present invention. It is clear that the described embodiments are some but not all of embodiments of this application. All other embodiments obtained by a person skilled in the art based on embodiments of this application without creative efforts shall fall within the protection scope of this application. FIG. 1 is a schematic diagram of a structure of an electronic device 101.

The electronic device 101 may be a mobile phone, a smart watch, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an in-vehicle device, or a smart home device. A specific type of the electronic device is not specifically limited in this embodiment of this application.

The electronic device 101 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the electronic device 101. In some other embodiments of this application, the electronic device 101 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 101.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 101. The processor 110 communicates with the display 194 through the DSI, to implement a display function of the electronic device 101.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini-USB interface, a micro-USB interface, a USB Type-C interface, or the like. The USB interface 130 may be configured to connect to a charger to charge the electronic device 101, or may be configured to transmit data between the electronic device 101 and a peripheral device, or may be configured to connect to a headset to play audio by using the headset. Alternatively, the interface may be configured to connect to another electronic device, for example, an AR device.

It may be understood that an interface connection relationship between modules shown in this embodiment of the present invention is merely an example for description, and does not constitute a limitation on a structure of the electronic device 101. In some other embodiments of this application, the electronic device 101 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 101. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 101 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 101 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution that is applied to the electronic device 101 and that includes wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that is applied to the electronic device 101 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In this embodiment of this application, the electronic device 101 may be paired with another electronic device (for example, an electronic device 102) by using the wireless communication module 160, to establish a connection. After pairing is complete, the electronic device 101 may send data to the another electronic device by using the wireless communication module 160, or may receive, by using the wireless communication module 160, data sent by the another electronic device.

In some embodiments, in the electronic device 101, the antenna 1 is coupled to the mobile communications module 150, and the antenna 2 is coupled to the wireless communications module 160, so that the electronic device 101 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 101 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 101 may include one or N displays 194, where N is a positive integer greater than 1.

In this embodiment of this application, the display 194 may be configured to display an application interface and a control in the application interface.

The electronic device 101 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 101 may include one or N cameras 193, where N is a positive integer greater than 1.

The digital signal processor is configured to process a digital signal, and may process another digital signal in addition to the digital image signal. For example, when the electronic device 101 selects a frequency, the digital signal processor is configured to perform Fourier transform and the like on frequency energy.

The video codec is configured to compress or decompress a digital video. The electronic device 101 may support one or more video codecs. In this case, the electronic device 101 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the electronic device 101, such as image recognition, facial recognition, speech recognition, and text understanding.

The external memory interface 120 may be configured to connect to an external storage card such as a micro-SD card, to extend a storage capability of the electronic device 101. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or an address book) created during use of the electronic device 101, and the like. In addition, the internal memory 121 may include a high-speed random access memory, and may further include a nonvolatile memory, for example, at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications and data processing of the electronic device 101.

In this embodiment of this application, the internal memory 121 may be configured to store a control tag, a control path, and an operation event type that are obtained in a process of recording an operation of a user. The internal memory 121 may be further configured to store a shortcut operation sequence corresponding to a shortcut operation added by the user.

The electronic device 101 may implement audio functions such as music playing and recording by using the audio module 170, the speaker 170A, the receiver 170B, the microphone 170C, the headset jack 170D, the application processor, and the like.

The audio module 170 is configured to: convert digital audio information into an analog audio signal output, and convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 101 may listen to music or answer a hands-free call by using the speaker 170A.

The receiver 170B, also referred to as an "earpiece", is configured to convert an audio electrical signal into a sound signal. When answering a call or listening to voice information, the electronic device 101 may listen to a voice by placing the receiver 170B close to an ear.

The microphone 170C, also referred to as a "mike" or a "mic", is configured to convert a sound signal into an electrical signal. When making a call or sending voice information, the user may make a sound by moving the mouth close to the microphone 170C to input a sound signal to the microphone 170C. At least one microphone 170C may be disposed on the electronic device 101. In some other embodiments, two microphones 170C may be disposed in the electronic device 101, to implement a denoising function in addition to collecting a sound signal. In some other embodiments, three, four, or more microphones 170C may be disposed in the electronic device 101, to collect a sound signal, perform denoising, identify a sound source, implement a directional recording function, and the like.

In this embodiment of this application, when the user uses a voice to control the electronic device 101 to add the shortcut operation, the microphone 170C may be configured to receive a voice input of the user.

The headset jack 170D is configured to connect to a wired headset. The headset jack 170D may be the USB interface 130, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 101 determines intensity of pressure based on the change in the capacitance. When a touch operation is performed on the display 194, the electronic device 101 detects intensity of the touch operation by using the pressure sensor 180A. The electronic device 101 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating an SMS message is executed.

The gyro sensor 180B may be configured to determine a motion posture of the electronic device 101. In some embodiments, an angular velocity of the electronic device 101 around three axes (that is, axes X, Y, and Z) may be determined by using the gyro sensor 180B. The gyro sensor 180B may be configured to perform image stabilization during photographing. For example, when the shutter is pressed, the gyro sensor 180B detects an angle at which the electronic device 101 jitters, obtains, through calculation based on the angle, a distance for which a lens module needs to compensate, and allows the lens to cancel the jitter of the electronic device 101 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 101 calculates an altitude based on a value of the barometric pressure measured by the barometric pressure sensor 180C, to assist in positioning and navigation.

The magnetic sensor 180D includes a Hall sensor. The electronic device 101 may detect opening and closing of a flip cover by using the magnetic sensor 180D. In some embodiments, when the electronic device 101 is a clamshell phone, the electronic device 101 may detect opening and closing of a flip cover based on the magnetic sensor 180D. Further, a feature such as automatic unlocking upon opening of the flip cover is set based on a detected opening or closing state of the flip cover.

The acceleration sensor 180E may detect magnitudes of accelerations of the electronic device 101 in various directions (usually on three axes), and may detect magnitude and a direction of gravity when the electronic device 101 is still. The acceleration sensor 180E may be further configured to identify a posture of the electronic device, and is used in an application such as switching between landscape mode and portrait mode or a pedometer.

The distance sensor 180F is configured to measure a distance. The electronic device 101 may measure the distance in an infrared or a laser manner. In some embodiments, in a photographing scenario, the electronic device 101 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 101 emits infrared light by using the light-emitting diode. The electronic device 101 detects infrared reflected light from a nearby object by using the photodiode. When detecting sufficient reflected light, the electronic device 101 may determine that there is an object near the electronic device 101. When detecting insufficient reflected light, the electronic device 101 may determine that there is no object near the electronic device 101.

The ambient light sensor 180L is configured to sense ambient light brightness. The electronic device 101 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 101 is in a pocket, to prevent an accidental touch.

The fingerprint sensor 180H is configured to collect a fingerprint. The electronic device 101 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 101 executes a temperature processing policy based on the temperature detected by the temperature sensor 180J. For example, when the temperature reported by the temperature sensor 180J exceeds a threshold, the electronic device 101 lowers performance of a processor located near the temperature sensor 180J, to reduce power consumption to implement thermal protection. In some other embodiments, when the temperature is less than another threshold, the electronic device 101 heats the battery 142, to prevent the electronic device 101 from being shut down abnormally due to a low temperature.

The touch sensor 180K is also referred to as a "touch control device". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 101, and is at a position different from that of the display 194.

In this embodiment of this application, the touch sensor 180K may be configured to detect operations of the user, for example, click, long press, and sliding. The long press operation mentioned in this application may be understood as an operation corresponding to duration in which the user performs the operation and that meets preset duration.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function.

The button 190 includes a power button, a volume button, and the like. The button 190 may be a mechanical button, or may be a touch button. The electronic device 101 may receive key input, and generate key signal input related to a user setting and function control of the electronic device 101.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to contact with or separate from the electronic device 101. The electronic device 101 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 101 interacts with a network by using the SIM card, to implement a call function, a data communication function, and the like. In some embodiments, the electronic device 101 uses an eSIM, namely, an embedded SIM card. The eSIM card may be embedded in the electronic device 101 and cannot be separated from the electronic device 101.

Figure 2:
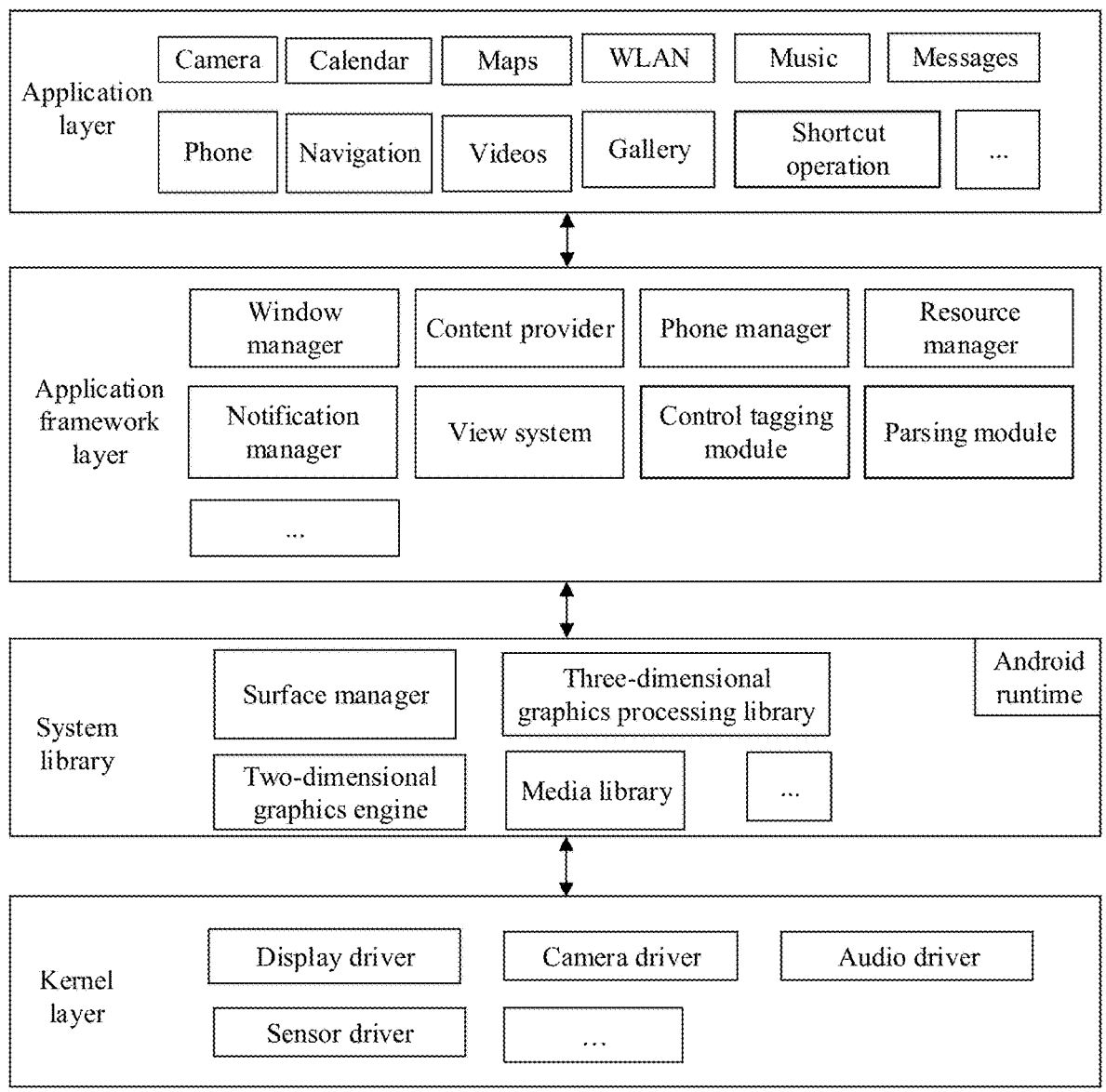
FIG. 2 is a block diagram of a software structure of an electronic device according to an embodiment of this application.

FIG. 2 is a block diagram of a software structure of the electronic device 101 according to an embodiment of the present invention.

A software system of the electronic device 101 may use a layered architecture, an event-driven architecture, a micro-kernel architecture, a micro service architecture, or a cloud architecture. In this embodiment of the present invention, an Android system of the layered architecture is used as an example to describe the software structure of the electronic device 101.

In the layered architecture, software is divided into several layers, and each layer has a clear role and task. The layers communicate with each other through a software interface. In some embodiments, an Android system is divided into four layers, that is, an application layer, an application framework layer, an Android runtime (Android runtime) and system library, and a kernel layer from top to bottom.

The application layer may include a series of application packages.

As shown in FIG. 2, the application packages may include applications such as "camera", "gallery", "calendar", "phone", "maps", "navigation", "WLAN", "Bluetooth", "music", "videos", and "messages". In addition, the application packages may include an application used by the user to add the shortcut operation and control a playback of the shortcut operation, for example, a shortcut operation application provided in embodiments of this application.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the electronic device 101, for example, management of a call status (including answering, declining, and the like).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted for in the status bar, an announcement is produced, the electronic device vibrates, or an indicator light blinks.

In this embodiment of this application, the application framework layer may include a control tagging module. The module may generate control path information for a control in an application interface, tag the control, and save the control path information in an internal processor.

In this embodiment of this application, the application framework layer may further include a parsing module, configured to: parse a shortcut operation sequence, position a control to be operated, and perform a corresponding operation on the control.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on a virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

FIG. 3A to FIG. 3L are schematic diagrams of human-machine interaction interfaces for adding a shortcut operation sequence on an electronic device according to an embodiment of this application. The following uses an example in which the electronic device 101 is a mobile phone, and an operation of a user is recorded to add and play back a shortcut operation on the mobile phone 101 for description.

Figure 3A:
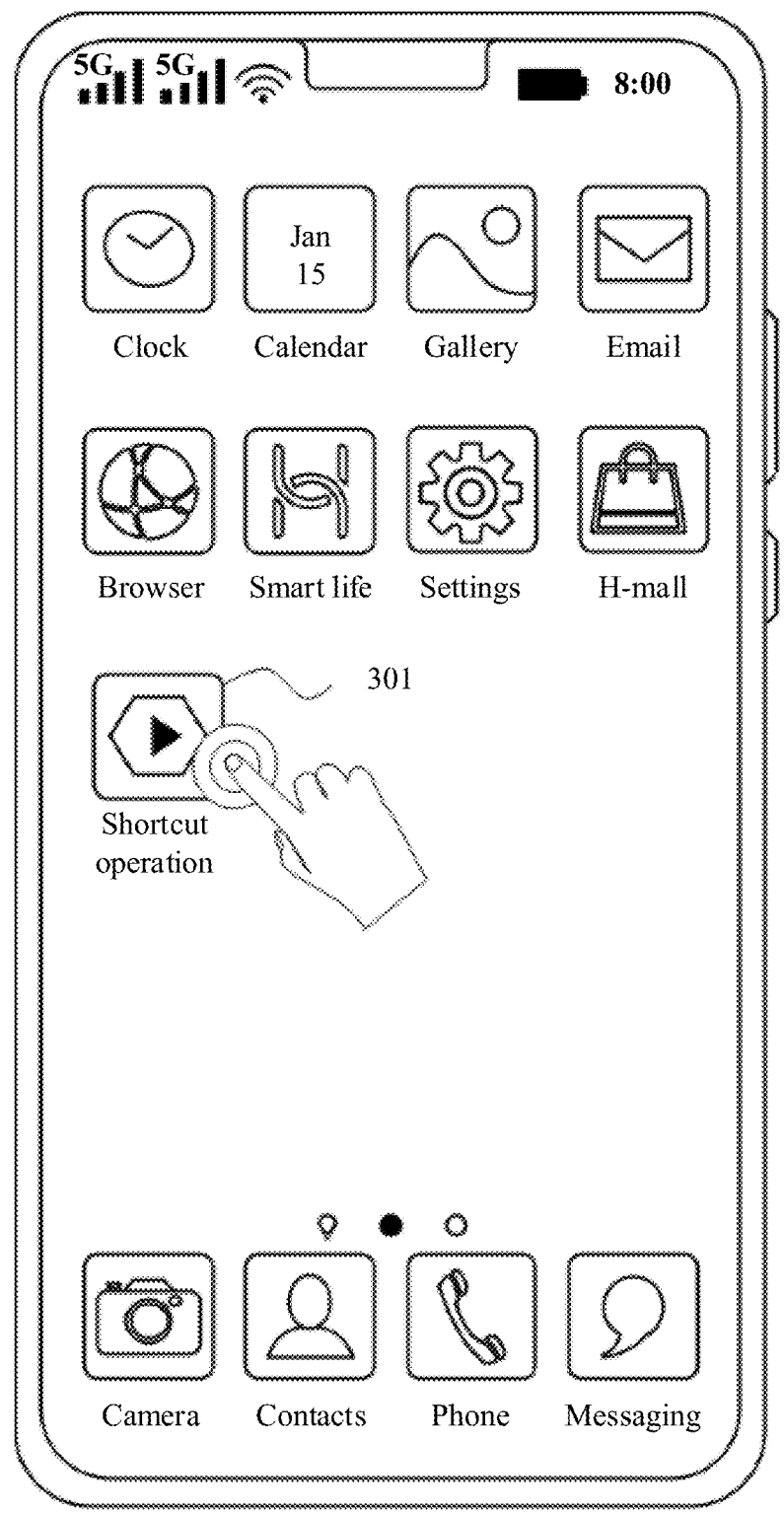
FIG. 3A to FIG. 3L are schematic diagrams of human-machine interaction interfaces according to an embodiment of this application.

As shown in FIG. 3A, 301 represents a shortcut operation application installed on the mobile phone 101, and the application may be used by the user to add the shortcut operation and manage the shortcut operation added by the user. The shortcut operation application may be further used to control starting and ending of recording of a series operations performed by the user on one or more third-party applications. The shortcut operation refers to an operation set that is customized by the user and that is performed on one or more applications, and the operation set may include one or more operations. For example, the user needs to perform clock-in at work every day. A process in which the user opens an attendance application for clock-in may be formed into a clock-in shortcut operation. The shortcut operation may include an operation that the user opens the attendance application, opens an attendance interface, and clicks a clock-in control. For another example, the user has a habit of adjusting brightness of a screen of the mobile phone to be 50% after 10 o'clock every night. The process of adjusting the brightness of the screen of the mobile phone may be formed into a brightness adjustment shortcut operation. The shortcut operation may include an operation that the user slides down an interface of the mobile phone, opens a notification bar interface that is slid down, and drags a brightness adjustment button to adjust the brightness to be 50%. For another example, the user takes a taxi home from the company every day, and this process may be formed into a taxi-hailing shortcut operation. The shortcut operation may include an operation that the user opens taxi-hailing software, enters a home address, selects a vehicle model, and confirms to hail a taxi. That an operation of a user is recorded refers to that when the user performs an operation on an application, operation information of the user is obtained and saved. The operation information includes an operation event type, a control tag of the operation, and control path information. A method for obtaining and saving the operation event type, the control tag of the operation of the user, and the control path information that are in the operation information of the user is described in detail in subsequent embodiments with reference to FIG. 4 to FIG. 10. Details are not described herein again.

It should be noted that the operation performed by the user on the application may be any possible operation, and the operation of the user may include but is not limited to at least one operation, for example, click, double-click, three-finger tapping, long press, item sliding, text editing, progress changing, or application startup. Parameters such as a type of the operation of the user and a quantity of operations are not limited in this application.

Figure 3B:
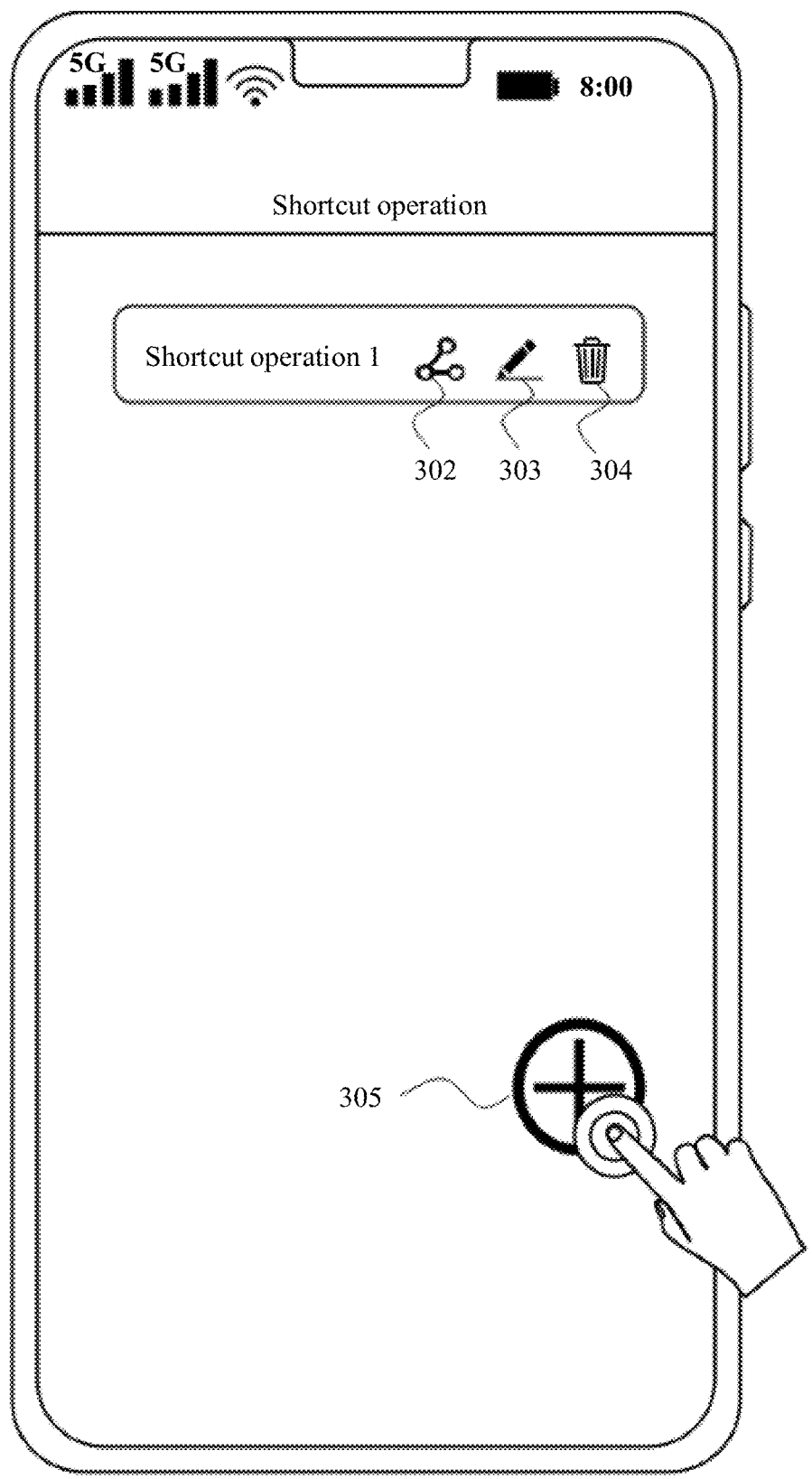

FIG. 3B shows an application interface of the shortcut operation application. As shown in FIG. 3B, the application interface may display a name of a shortcut operation added by the user, for example, a shortcut operation 1 shown in FIG. 3B. It should be noted that the name of the shortcut operation may be set by the user, or may be automatically generated by the shortcut operation application. The interface of the shortcut operation application may include a control 302, used to share the added shortcut operation, for example, share the shortcut operation 1 with another electronic device, or share an interface layout element or a link related to the shortcut operation 1 with another electronic device or another user. The interface of the shortcut operation application may include a control 303, used to edit the added shortcut operation, for example, modify the name of the shortcut operation. The interface of the shortcut operation application may include a control 304, used to delete the added shortcut operation. The application interface further includes a shortcut operation adding control 305. After the user clicks the shortcut operation adding control 305, in response to the click operation of the user, another application interface of the shortcut operation application may be displayed, and an operation of the user may be recorded, refer to FIG. 3C.

Figure 3C:
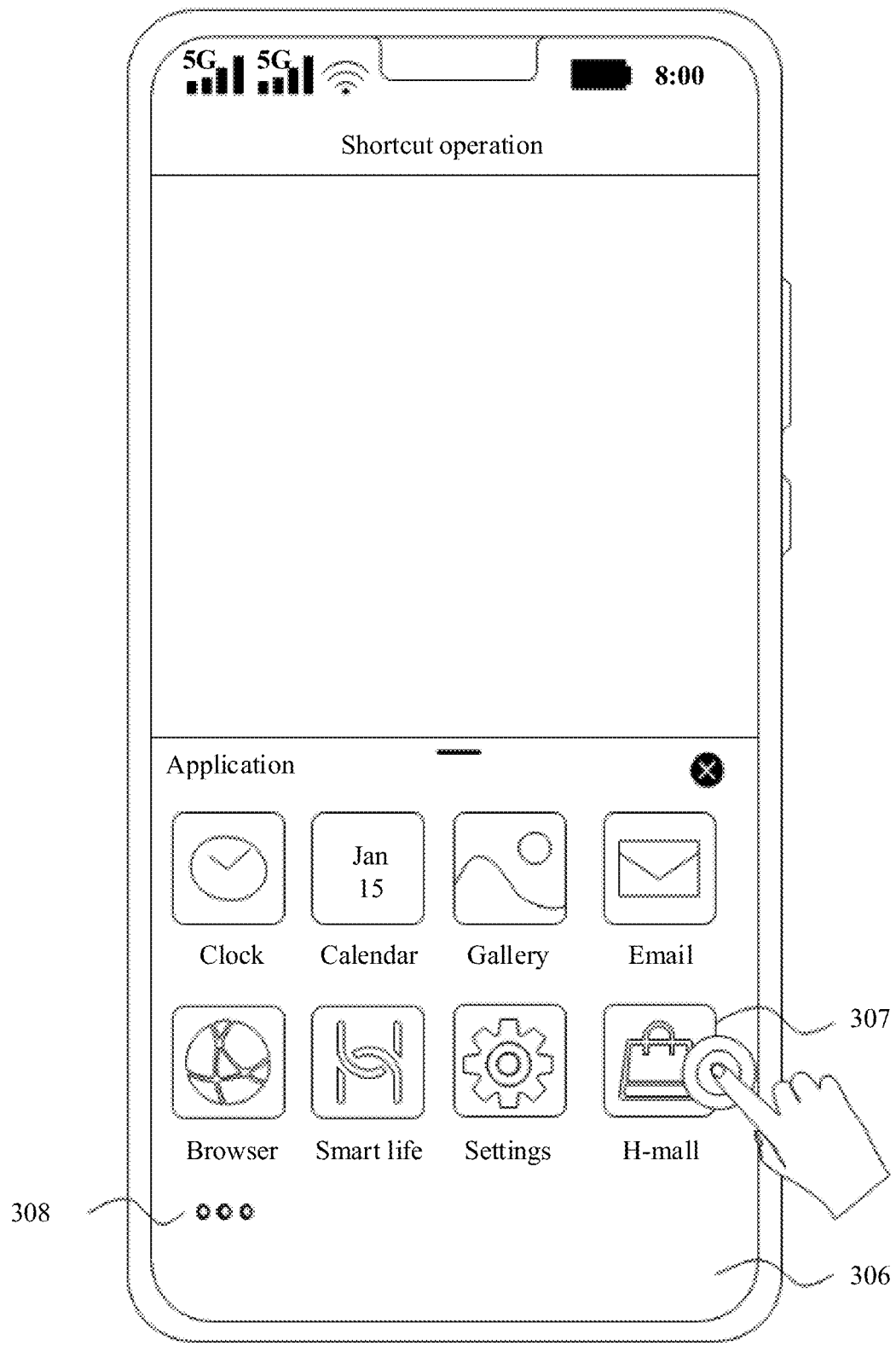

FIG. 3C shows the another application interface of the shortcut operation application. As shown in FIG. 3C, in the interface of the shortcut operation application, an area indicated by 306 may display applications already installed on the mobile phone. The user may click an application to be operated (for example, an H-mall application indicated by 307 in FIG. 3C), and in response to the click operation of the user, the interface of the shortcut operation application jumps to an interface of the application to be operated by the user, for example, an interface of the H-mall application shown in FIG. 3D.

It should be noted that FIG. 3C may show some or all of the third-party applications installed on the mobile phone 101. In FIG. 3C, a control of each application displayed in the application interface may be tagged by a control tagging module in an application framework layer of a system of the mobile phone, and control path information that can identify the control is added to the control of the application, to position the control of the application in a process of recording an operation of the user and playing back the operation on a plurality of devices. An application control tagging method provided by the application framework layer of the system of the mobile phone is described in detail in a subsequent embodiment with reference to FIG. 4.

In some application scenarios, when the application is updated, an application developer may alternatively tag the control of the application according to a method provided by a system provider of the mobile phone.

In some other application scenarios, when the application is updated, if a new control is added, the developer may also tag, according to the method provided by the system provider of the mobile phone, the control added to the application.

In addition, when the application to be operated by the user is not displayed in the interface of the shortcut operation application in FIG. 3C, the user may click a control 308 shown in FIG. 3C. In response to the click operation of the user, the interface of the shortcut operation application may jump to an application search interface, and the user may search for and select the application to be operated.

It may be understood that some or all of the applications displayed in FIG. 3C have an open permission to allow recording of an operation of the user. Alternatively, the user may set, in system settings of the mobile phone 101, a permission of an application to record an operation of the user.

Figure 3D:
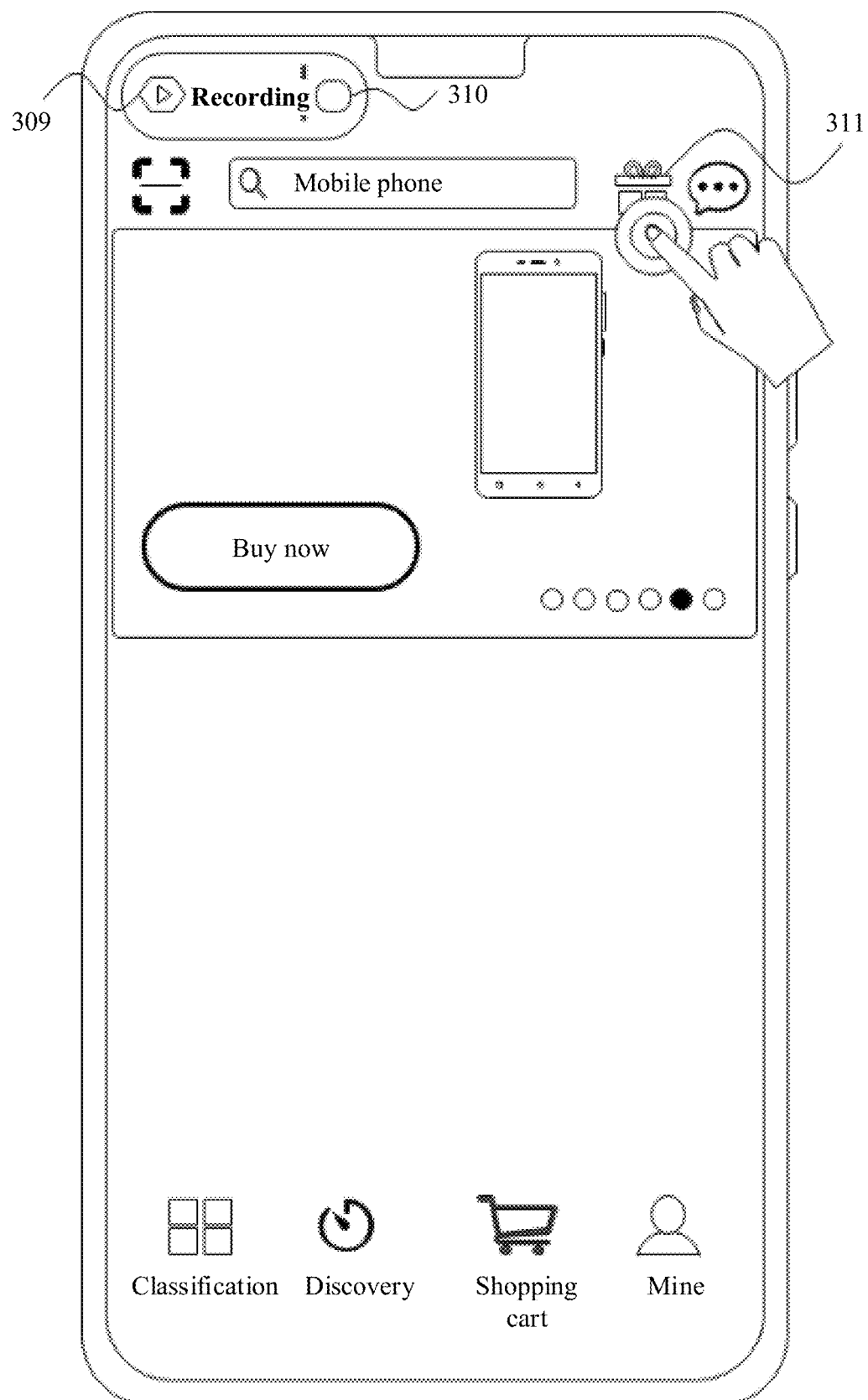

Refer to FIG. 3D. In a process of recording an operation of the user, the application interface may display a control 309, used to prompt the user that the operation of the user is being recorded. The application interface may further display a recording stop control 310, used to control to stop recording the operation performed by the user on the application. In the application interface shown in FIG. 3D, the user may perform the operation, for example, the user may click a "gift" control 311 in the interface.

Figure 3E:
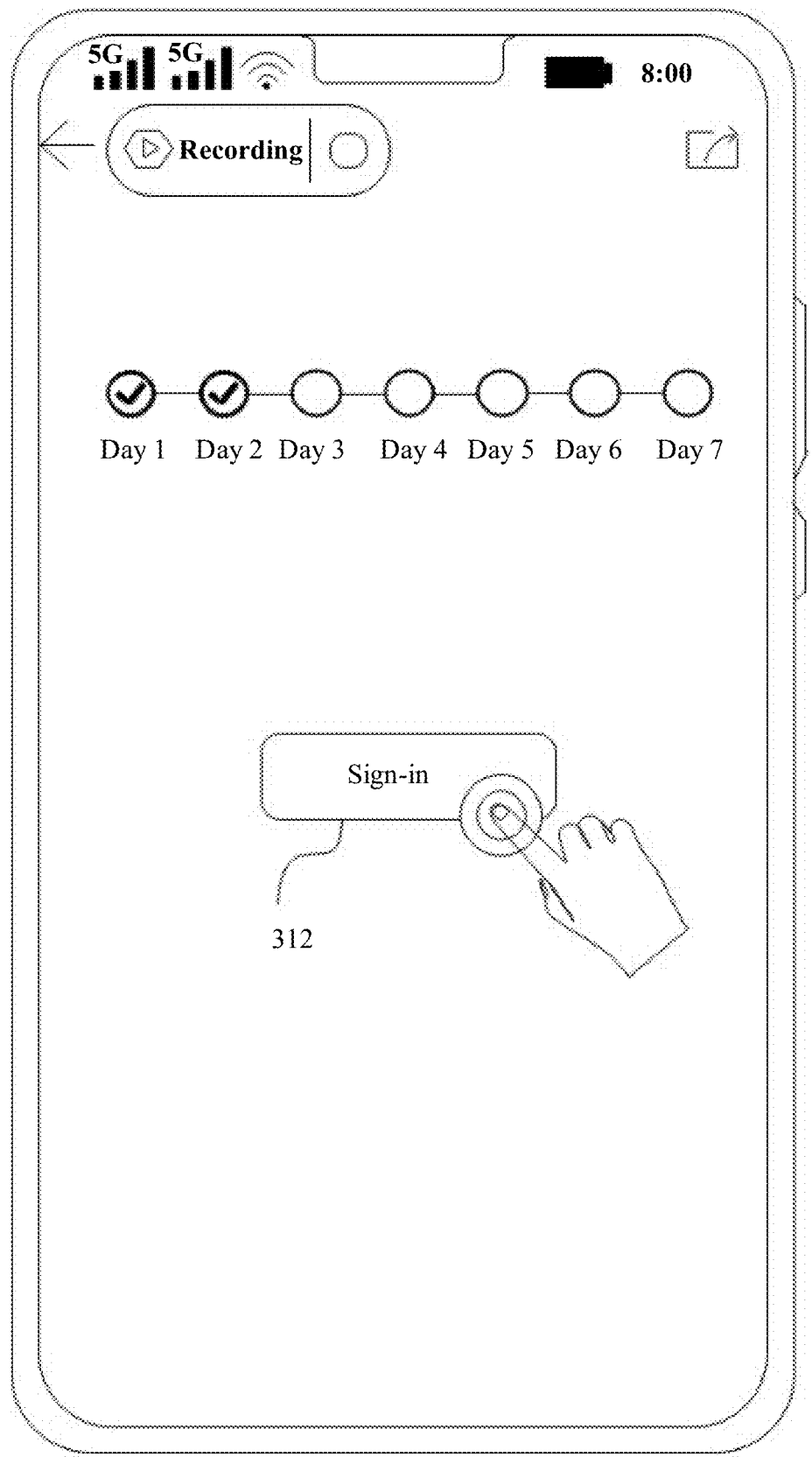
Figure 3F:
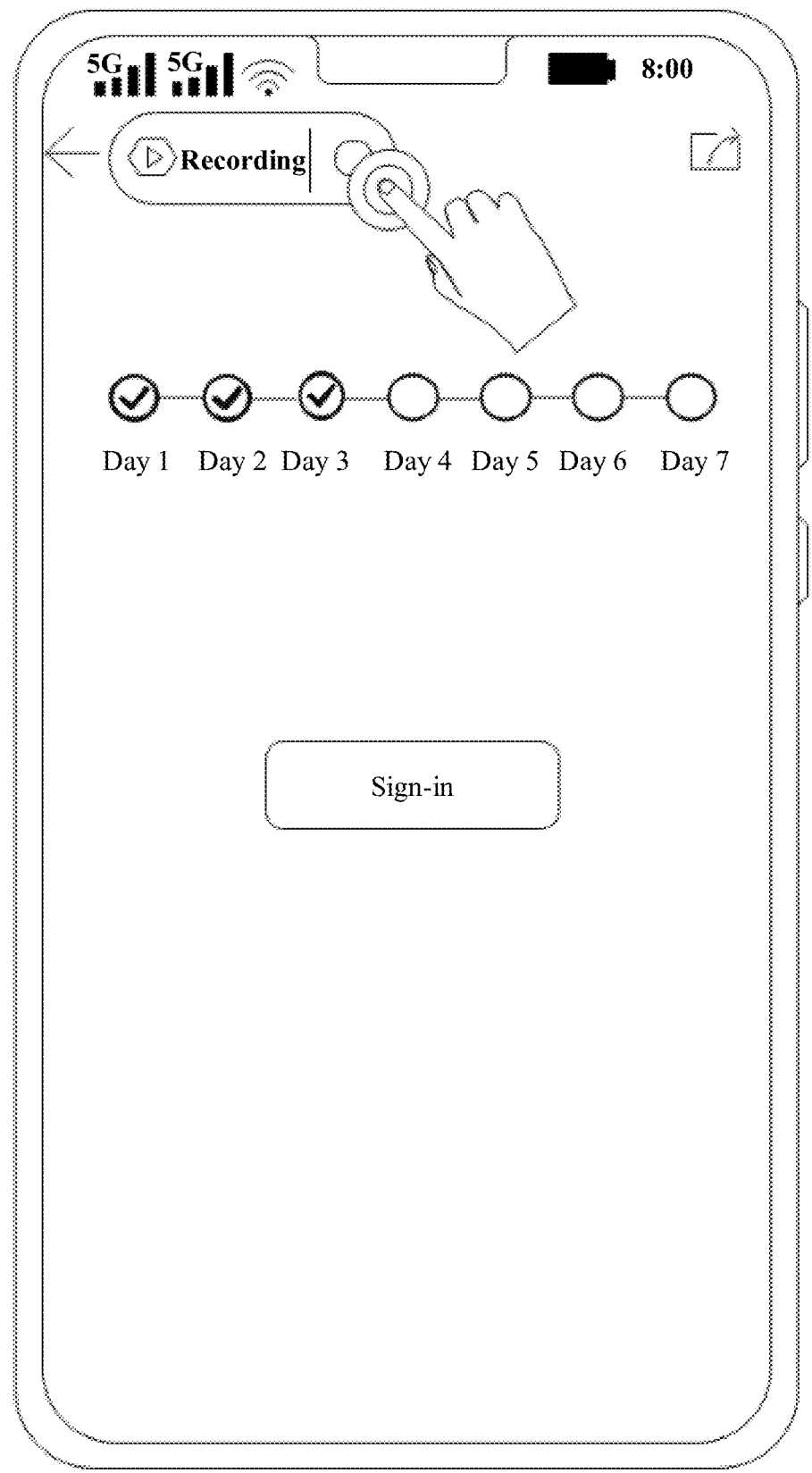

Refer to FIG. 3E and FIG. 3F. The shortcut operation application may be used to control to stop recording an operation of the user. For example, FIG. 3E shows an application interface of the H-mall application. After the user clicks a "sign-in" control 312 in FIG. 3E, the user completes sign-in. After the sign-in operation of the user on the H-mall application is completed, refer to FIG. 3F, the user clicks the recording stop control. In response to the click operation of the user, the shortcut operation application may control to stop recording the operation of the user.

Figure 3G:
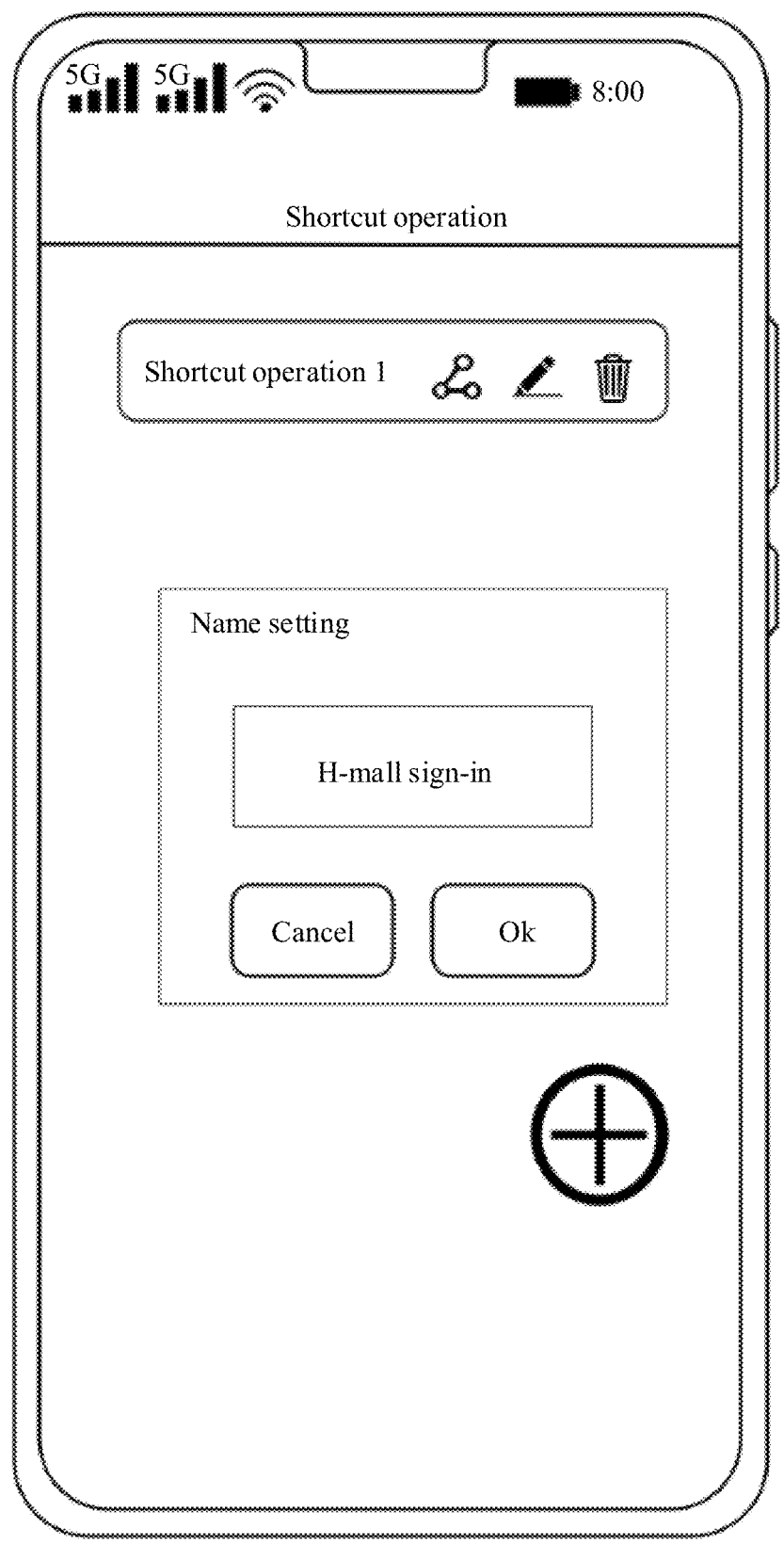
Figure 3H:
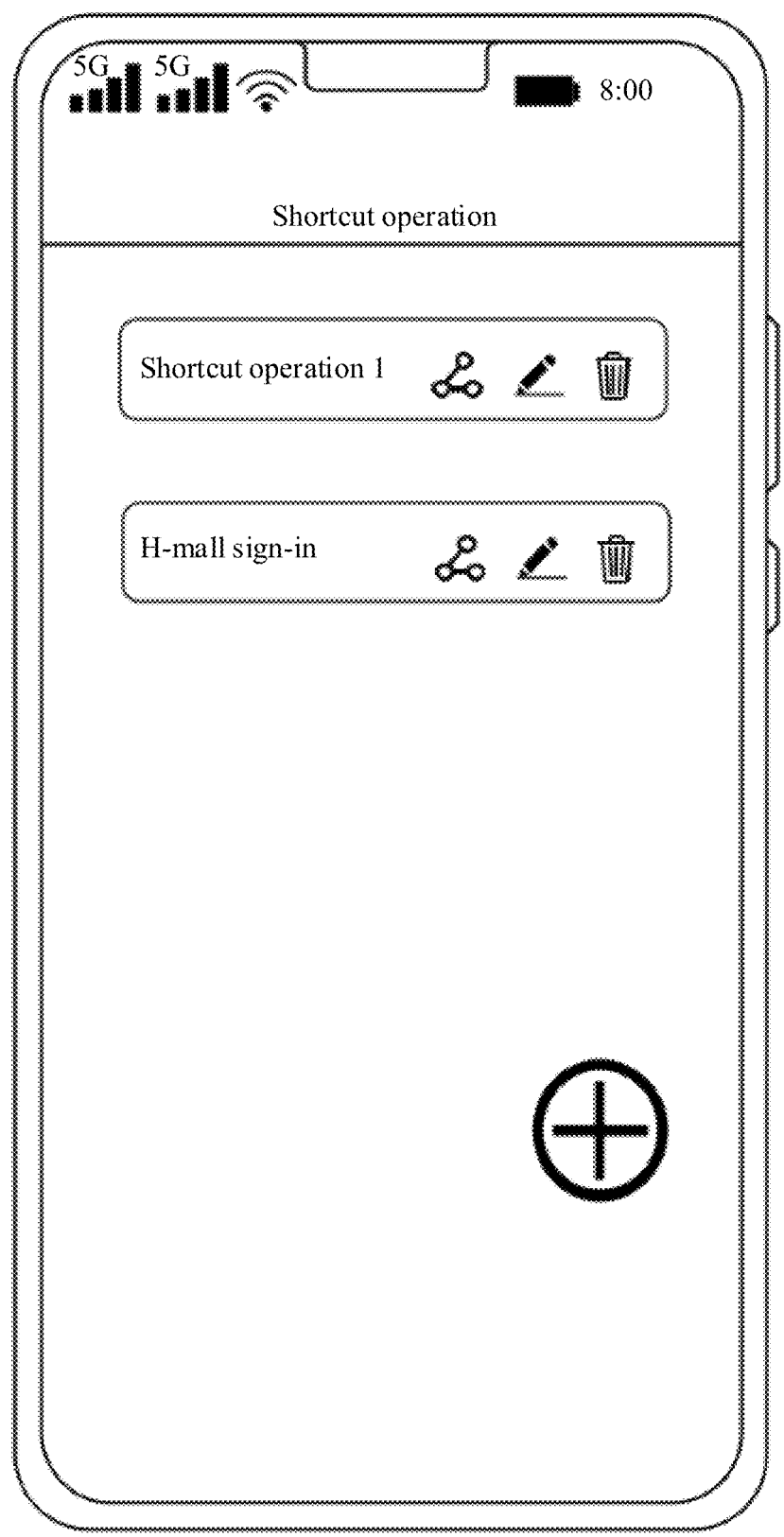

Refer to FIG. 3G and FIG. 3H. After the operation of the user is recorded, in the interface of the shortcut operation application, the user may set a name for the added shortcut operation, for example, "H-mall sign-in", or the name may be automatically generated by the shortcut operation application. After the shortcut operation of the user is added, refer to FIG. 3H, the interface of the shortcut operation application may display the added shortcut operation, for example, "H-mall sign-in".

Figure 3I:
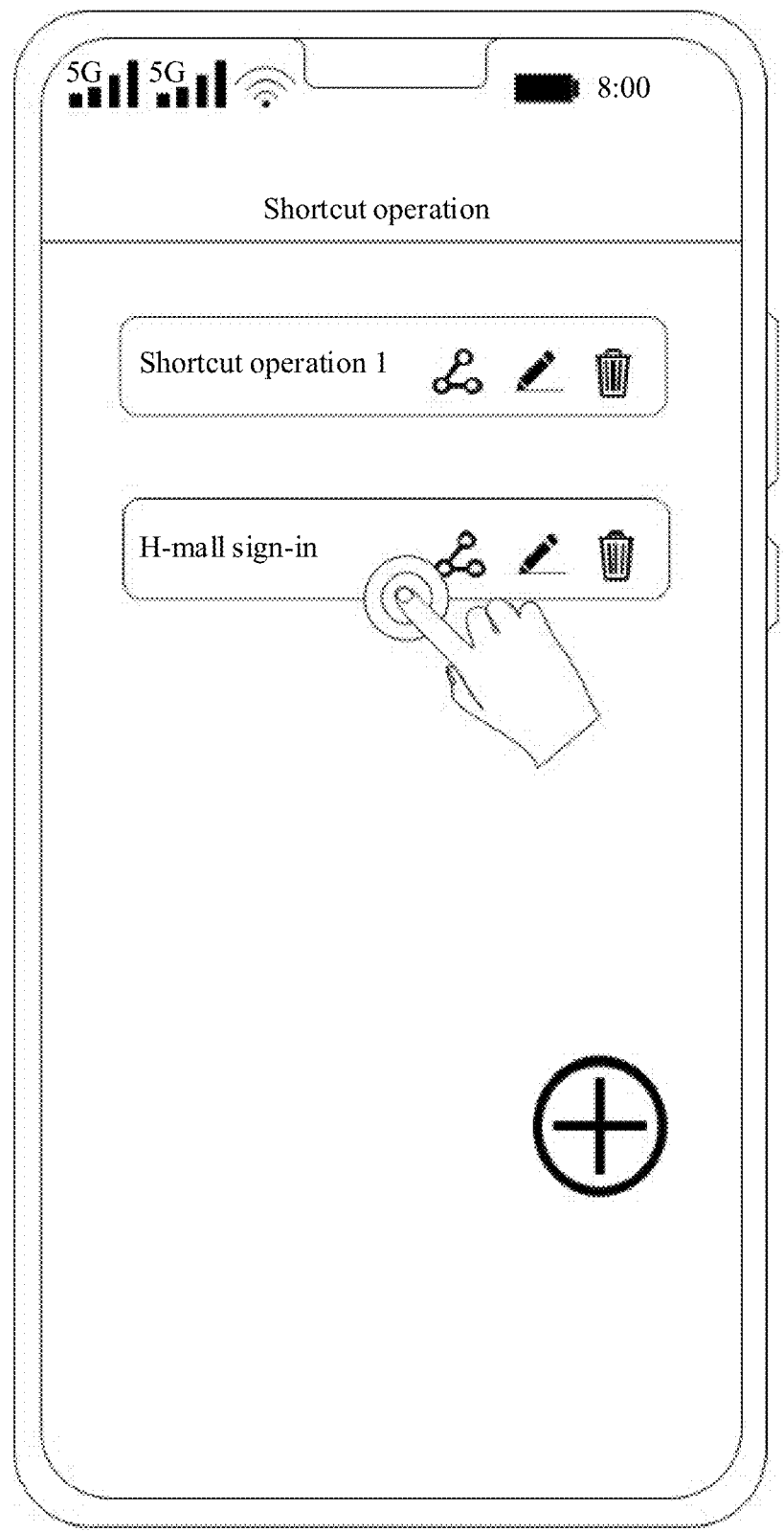
Figure 3J:
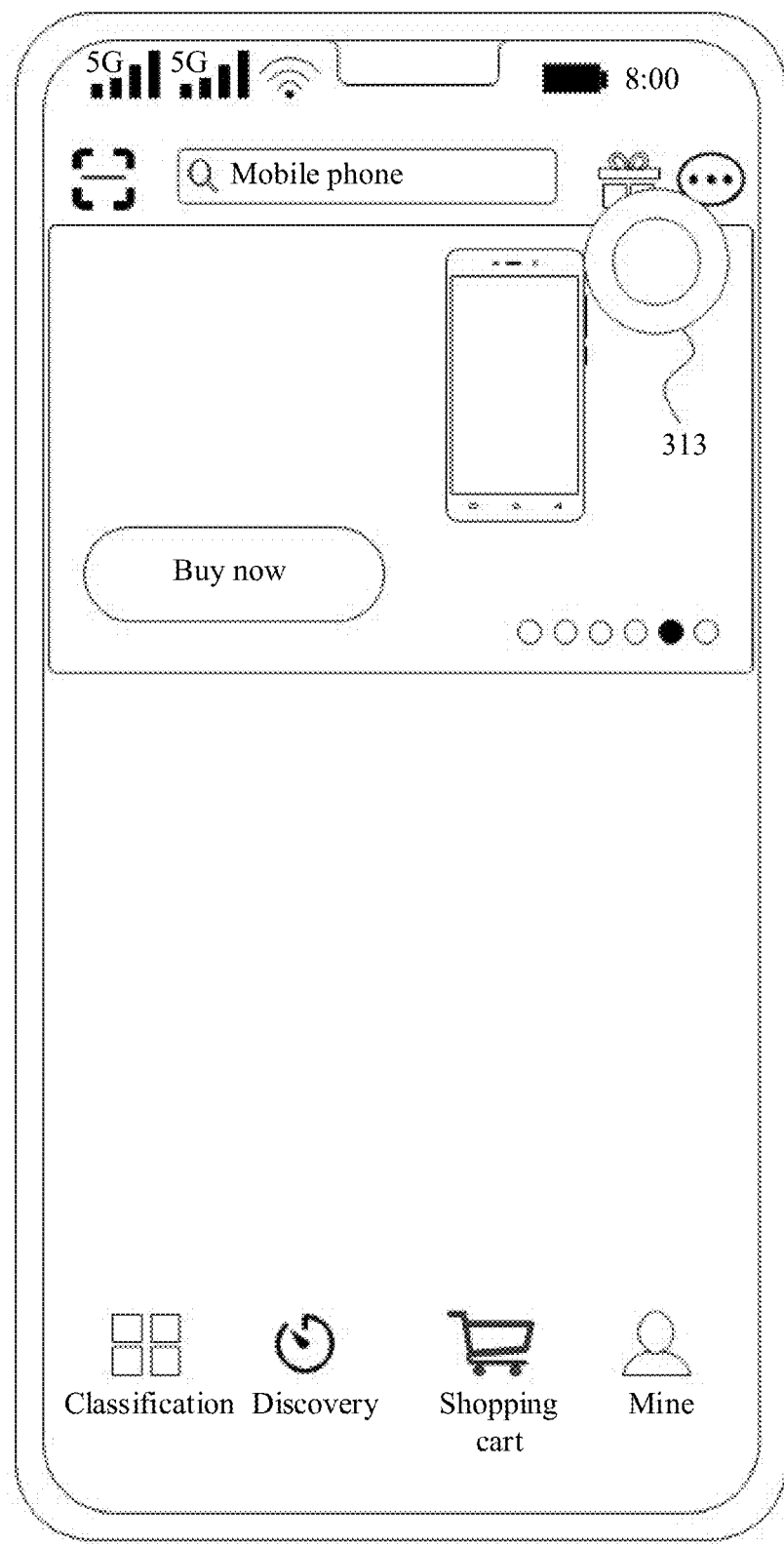
Figure 3K:
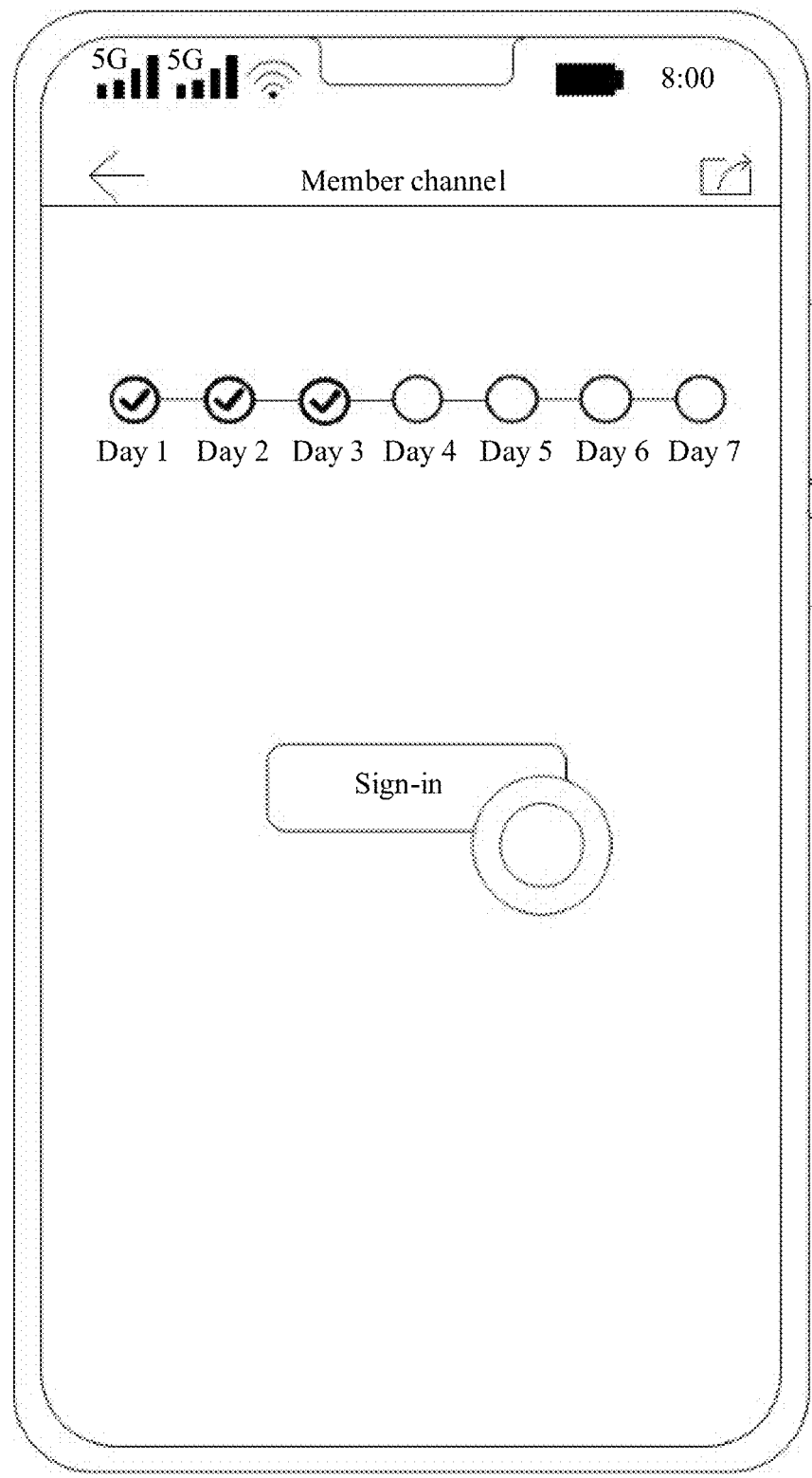
Figure 3L:
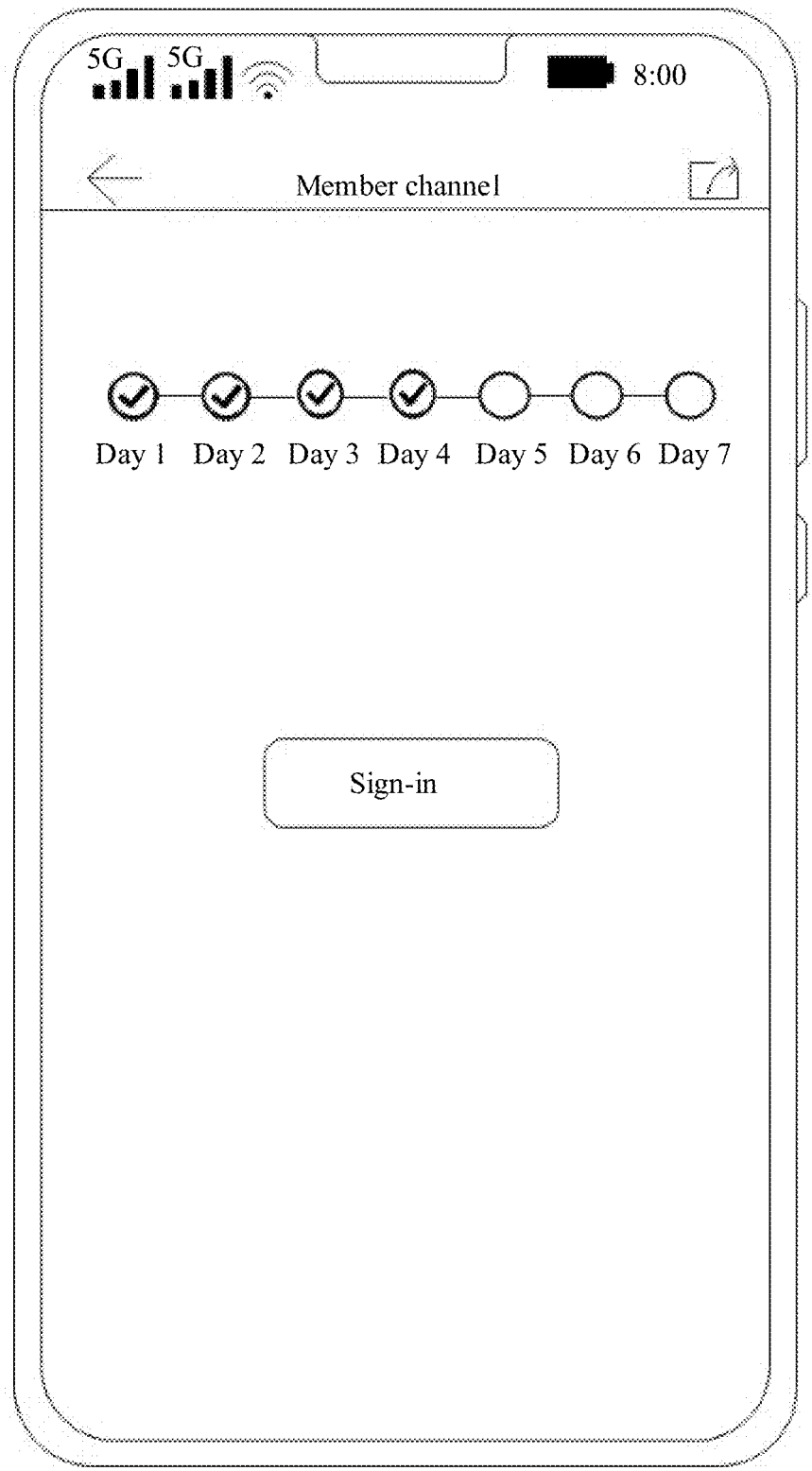

Refer to FIG. 3I and FIG. 3J. The user may select the added shortcut operation and play back the added shortcut operation on the electronic device. For example, refer to FIG. 3I. In the interface of the shortcut operation application, the added shortcut operation may be displayed, and the user may click to select the added shortcut operation to be played back. In a playback process, the electronic device may perform a corresponding operation on a control corresponding to the recording process. For example, refer to FIG. 3J. The "gift" control is clicked. Refer to FIG. 3K. The "sign-in" control is clicked. Refer to FIG. 3L. An interface obtained after the recorded shortcut operation is played back is displayed. It should be noted that, for ease of description, an icon 313 is shown in the figure, to prompt the user that the recorded shortcut operation is being played back, or there may be no icon 313.

According to the foregoing description, in a process of recording an operation of the user, operation information of the user on an application control may be obtained and saved, and the operation information includes an operation event type, control path information, and a control tag. An Android system is used as an example for description.

An application defines a GUI graphical user interface (graphical user interface, GUI) (namely, a display interface) by using a layout file. The layout file includes a view tree including a control and a layout container. The control (View) is an element presented in the GUI, and can provide the user with an operation function or be used to display specific content. A control group (ViewGroup) may include one or more Views. For example, the control may specifically include a text control, for example, a TextView control or an EditText control, may include a button control, for example, a Button control or an ImageButton control, or may include an image control, for example, an Image control. This is not limited in this embodiment of this application. The layout container is a layout structure configured to store the control and another layout container. That is, one layout container may include one or more controls, and be nested with one or more layout containers.

A display interface of the Android system is used as an example for description. Usually, one display interface corresponds to one Activity, and one Activity holds one Window object (whose instance is a PhoneWindow). The Window is used to draw various controls. As a most basic window system of the Android system, the PhoneWindow holds a top-level View object DecorView (which is essentially a ViewGroup). The DecorView is a root view (ViewRoot) of all Views and ViewGroups. The DecorView includes a ContentView (which is essentially a ViewGroup). The ContentView is a customized view of each application, namely, a display interface of the application. The ContentView includes one or more Views and/or one or more ViewGroups. It should be noted that, in a process of displaying an interface, starting from a performTraversals( ) method of the root view, the electronic device traverses the entire view tree from top to bottom. Each View control is responsible for drawing itself, and the ViewGroup further needs to be responsible for notifying a sub-View of the ViewGroup for drawing an operation.

Figure 4:
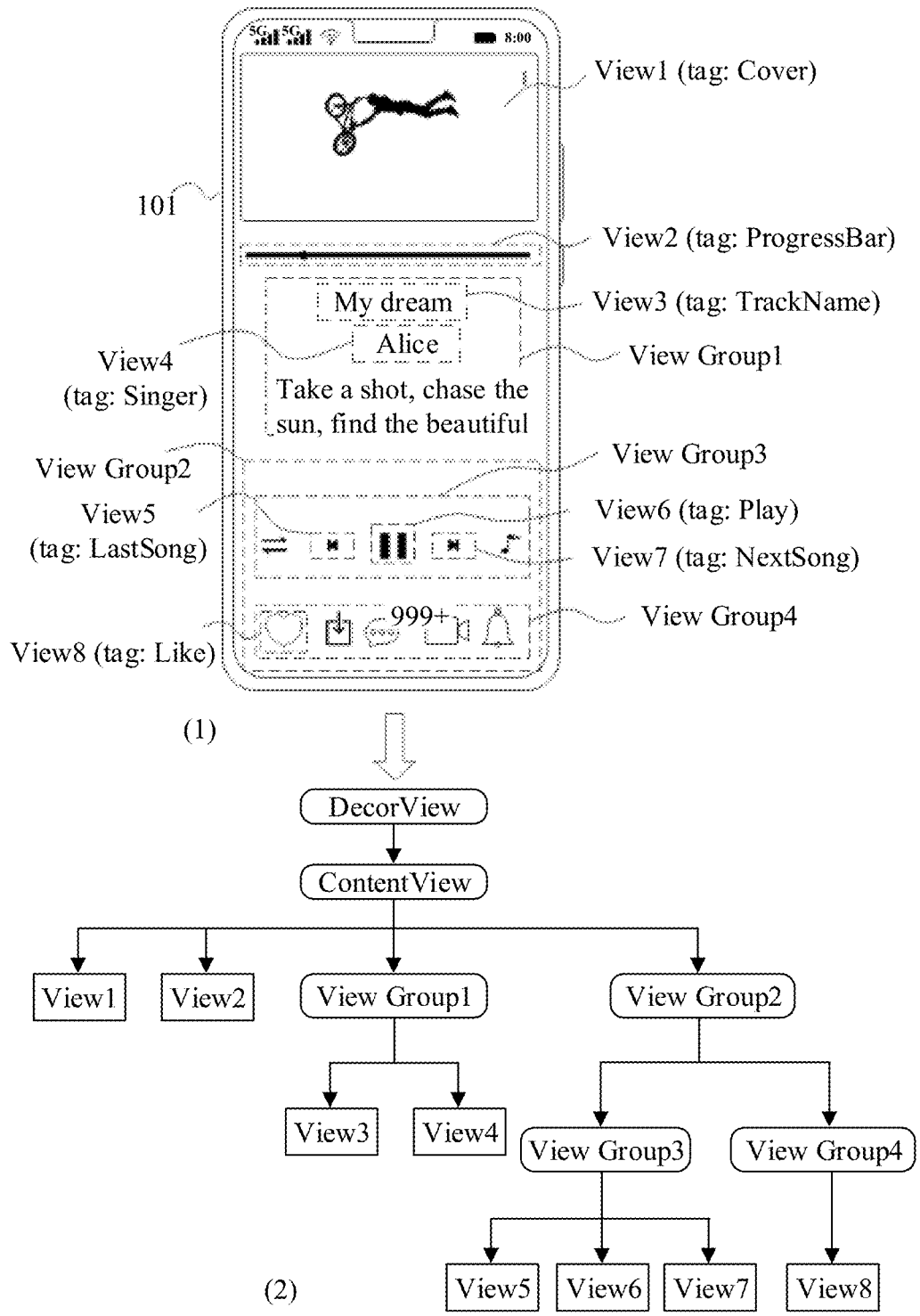
FIG. 4 is a schematic diagram of a control tagging method according to an embodiment of this application.
Figure 5A:
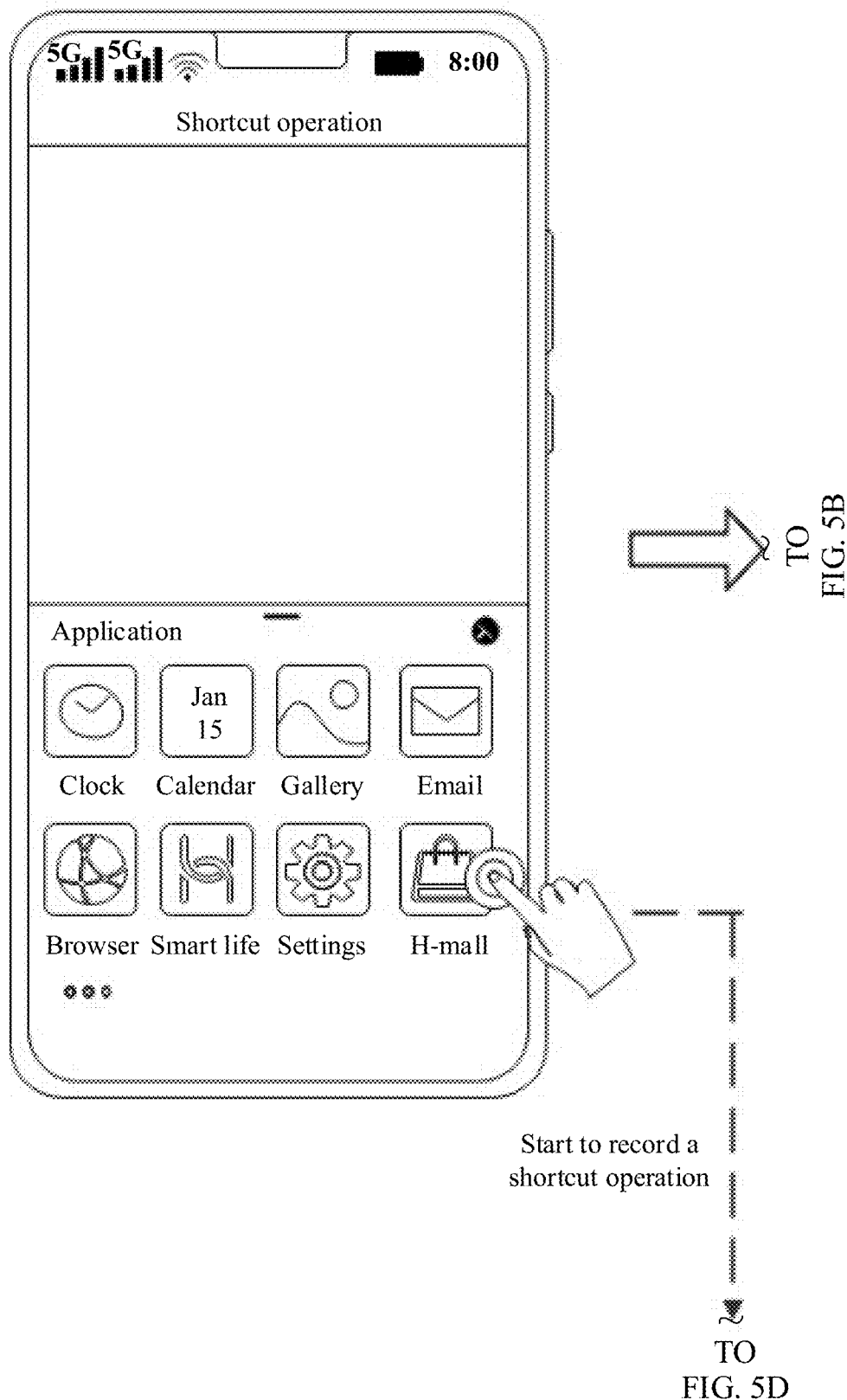
Figure 5B:
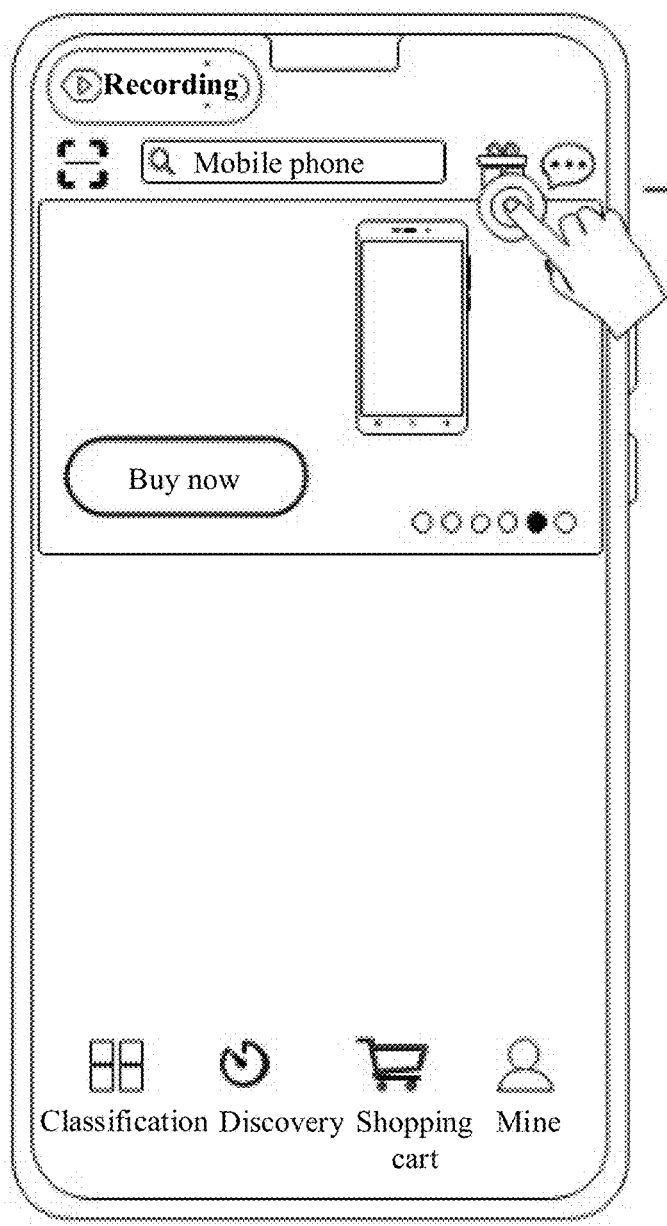
Figure 5C:
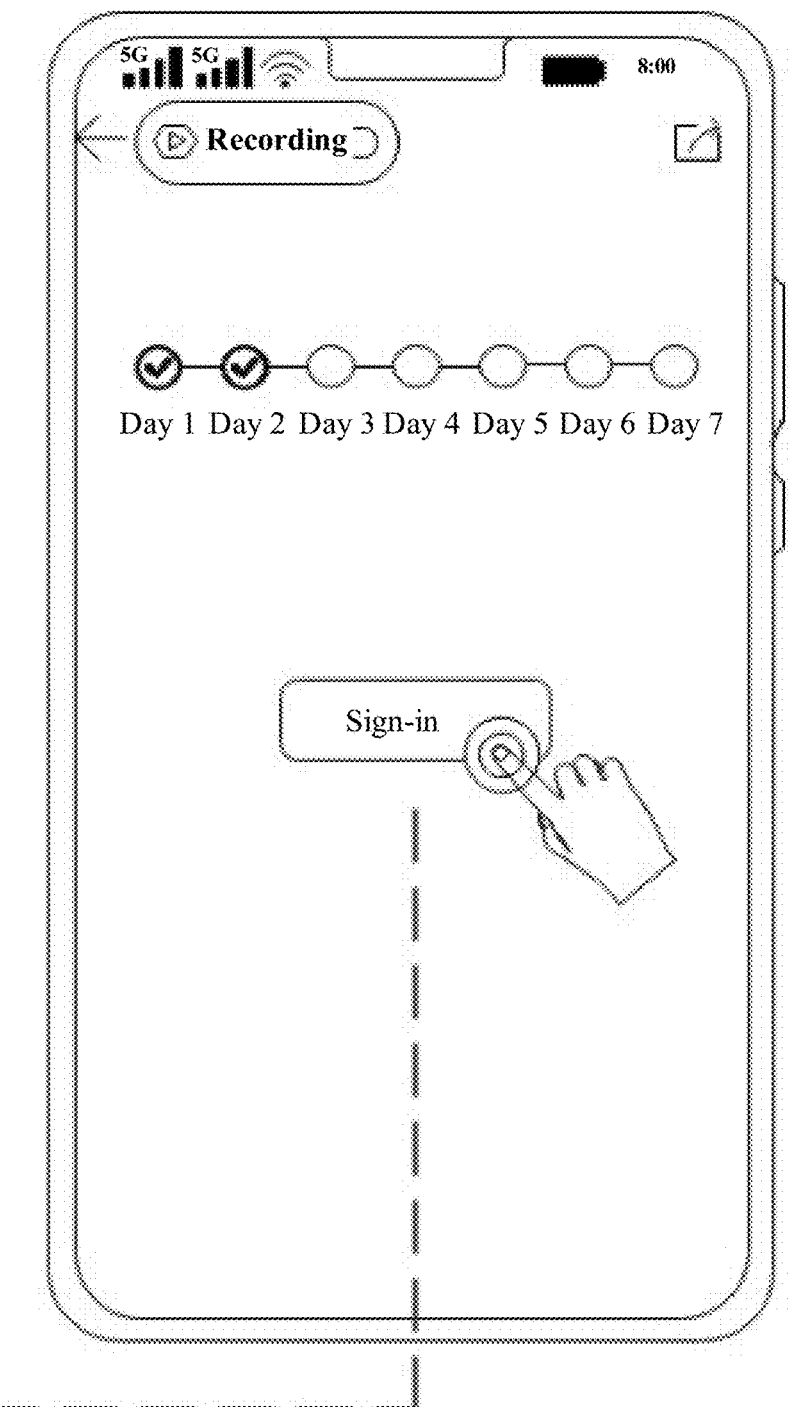

Refer to FIG. 4. (1) in FIG. 4 is a schematic diagram of an interface of a music application on the mobile phone 101. The interface of the music application corresponds to one DecorView. The DecorView includes a View1 (an image control), a View2 (a progress bar control), a ViewGroup1, and a ViewGroup2. The ViewGroup1 includes a View3 (a text control) and a View4 (a text control). The ViewGroup2 specifically includes a ViewGroup3 and a ViewGroup4. Similarly, the ViewGroup3 includes a View5 (a button control), a View6 (a button control), and a View7 (a button control). The ViewGroup4 includes a View8 (a button control). For a hierarchical structure relationship among the Views and the ViewGroups in the interface of the music application, refer to a view tree shown in (2) in FIG. 4.

For example, the developer may design a View or ViewGroup in each display interface in an application in a layout manner, for example, a linear layout (LinearLayout), a table layout (TableLayout), a relative layout (RelativeLayout), a frame layout (FrameLayout), an absolute layout (AbsoluteLayout), or a grid layout (GridLayout), to generate a layout file of each display interface, namely, a layout file.

In other words, the developer may set, in the layout file of each display interface, a hierarchical structure for each View and each ViewGroup in the display interface, and an attribute value (for example, a size (a width and a height) or a position). It can be learned from the hierarchical structure that each View may have a sub-View, and each View has an association relationship with a sub-View corresponding to the View. For example, the ContentView is a sub-View of the DecorView, the View Group1 is a sub-View of the ContentView, and the View3 is a sub-View of the View Group1. Starting from the performTraversals( ) method of the root view, the electronic device may traverse the entire view tree from top to bottom, and obtain, in a process of drawing a View, path information for finding the View from top to bottom. For example, refer to (1) in FIG. 4. The View3 is used as an example, and path information of the View3 is from the DecorView to the ContentView, from the ContentView to the View Group1, and from the View Group1 to the View3. Then, a layout file of these display interfaces is packaged in an installation package of the application, and the installation package of the application is put on an application market. Subsequently, the electronic device may download and install the installation package of the application from the application market. When an application runs in the electronic device, the electronic device may obtain a layout file of the application, draw a corresponding display interface according to the layout file, and present the display interface to the user.

It should be noted that an attribute of each View may further include a control tag. (1) in FIG. 4 shows that controls in the application interface may be tagged with different tags. When an operation sequence is added, the tags may position the controls on the application interface. For example, the image control View1 may be tagged with a "Cover" tag, and the progress bar control View2 may be tagged with a "ProgressBar" tag. It may be understood that the application developer may tag all the controls on the application interface, or may tag some of the controls. A control that is not tagged cannot be tagged and identified by using a control tag.

In a possible implementation, the application interface control tagging method may be that when developing a third-party application, the developer accesses an SDK for control tagging that is provided by the system provider of the mobile phone, and calls a tagging interface to tag a control of the third-party application.

In a possible implementation, the application interface control tagging method may alternatively be that when developing a third-party application, the developer uses, in an XML file, a control tagging template provided by the system provider of the mobile phone, to tag a control of the application interface.

In another possible implementation, when an application is updated, if a new control needs to be added, the developer may access, when the application is updated, an SDK for control tagging that is provided by the system provider of the mobile phone, and call a tagging interface to tag the control of the third-party application.

In another possible implementation, when an application is updated, if a new control needs to be added, the developer may alternatively use, in an XML file when the application is updated, a control tagging template provided by the system provider of the mobile phone, to tag the control of the application interface.

An embodiment of this application provides a control tagging method. Path information of each control in an application may be tagged by the control tagging module in the application framework layer of the electronic device, so that the path information can be used as an attribute for identifying a position of the control. Specifically, when an application runs on the electronic device, in a process of displaying an interface, starting from the performTraversals( ) method of the root view, the electronic device traverses the entire view tree from top to bottom. Based on the view tree, the control tagging module of the application framework layer of the electronic device can obtain control path information related to a control hierarchical structure relationship. The control path information can uniquely position a control in a process of adding an operation sequence. For example, the View3 is used as an example, and path information of the View3 is from the DecorView to the ContentView, from the ContentView to the View Group1, and from the View Group1 to the View3. The path information may be saved in a form of a string, for example, DecorView-ContentView-View Group1-View3, or may be saved in a form of a value, for example, a hash algorithm may be used to convert a string corresponding to the path information into a hash value.

FIG. 5A, FIG. 5B, FIG. 5C, and FIG. 5D show a method for recording an operation of a user according to an embodiment of this application.

As shown in FIG. 5A, FIG. 5B, FIG. 5C, and FIG. 5D, in a process in which the user performs an operation on a control of an application, each piece of operation information of the user may be saved in a corresponding field of a shortcut operation sequence, where the operation information includes an event type, a control tag, an operation parameter, and the like. As shown in Table 1, operation information obtained when the user opens an "H-mall" application and performs sign-in is saved in a shortcut operation sequence.

TABLE 1

| 1 | 2 | 3 |
|---|---|---|
| "action":"startApp", "packageName":"xxx" | "action":"click", "tag":"gift"; | "action":"click", "tag":"signing" |

As shown in Table 1, operation information obtained when the user starts the "H-mall" application is saved in an operation name "action" field, and content of the field is "startApp". The user needs to click a "gift" icon to enter a sign-in interface. Operation information obtained when the user clicks the "gift" icon is saved in an operation name "action" field and a control tag "tag" field, content of the "action" field is "click", and content of the "tag" field is "gift". After entering the sign-in interface, the user clicks a "sign-in" button, and operation content obtained when the user clicks the "sign-in" button is saved in an operation name "action" field and a control tag "tag" field, content of the "action" field is "click", and content of the "tag" field is "signing". As shown in FIG. 5A, FIG. 5B, FIG. 5C, and FIG. 5D, after completing sign-in, the user clicks a recording stop control, and all operation information of the user may be packaged into a shortcut operation sequence. An electronic device may send the shortcut operation sequence to an internal memory for storage.

FIG. 6A and FIG. 6B show shortcut operation sequence code corresponding to opening the H-mall application and completing sign-in. A first paragraph of FIG. 6A indicates that the H-mall application is selected in an interface of a shortcut operation application and is started, where application startup information includes: "mEventTime", used to indicate a time for performing an operation; "mEventType", used to indicate an event type of the operation; and "mPackageName", used to indicate which application is started. A second paragraph of FIG. 6A indicates that a home page of the H-mall application is displayed, where "mClassName" is used to indicate which page window is displayed. A first paragraph of FIG. 6B indicates an operation of clicking the "gift" control, where "mRccTag" is used to indicate a control tag, and "mViewPath" is used to indicate control path information. The path information is obtained in a process of drawing a View according to the control tagging method described in the foregoing embodiment. The path information may be saved in a form of a string, or may be saved in a form of a hash value. For example, the control path information may be used to generate a hash value by using a hash algorithm. A second paragraph of FIG. 6B indicates an operation of clicking the "sign-in" control.

FIG. 6C shows a correspondence between a value of "mEventType" shown in the code and an event type. For example, when the value of "mEventType" is 64, it indicates that an operation is an application startup event. The event type of the recorded operation of the user may alternatively be a click event, for example, a click event, a long press event, an item event (for example, an operation of selecting a contact in an address book), a text editing event, a scrolling event (for example, an operation of scrolling a contact list in the address book), a progress changing event (for example, an event of dragging a play progress of an audio or a video), or a window changing event (for example, a home page of an application jumps to a second interface) on a button control.

Figure 7A:
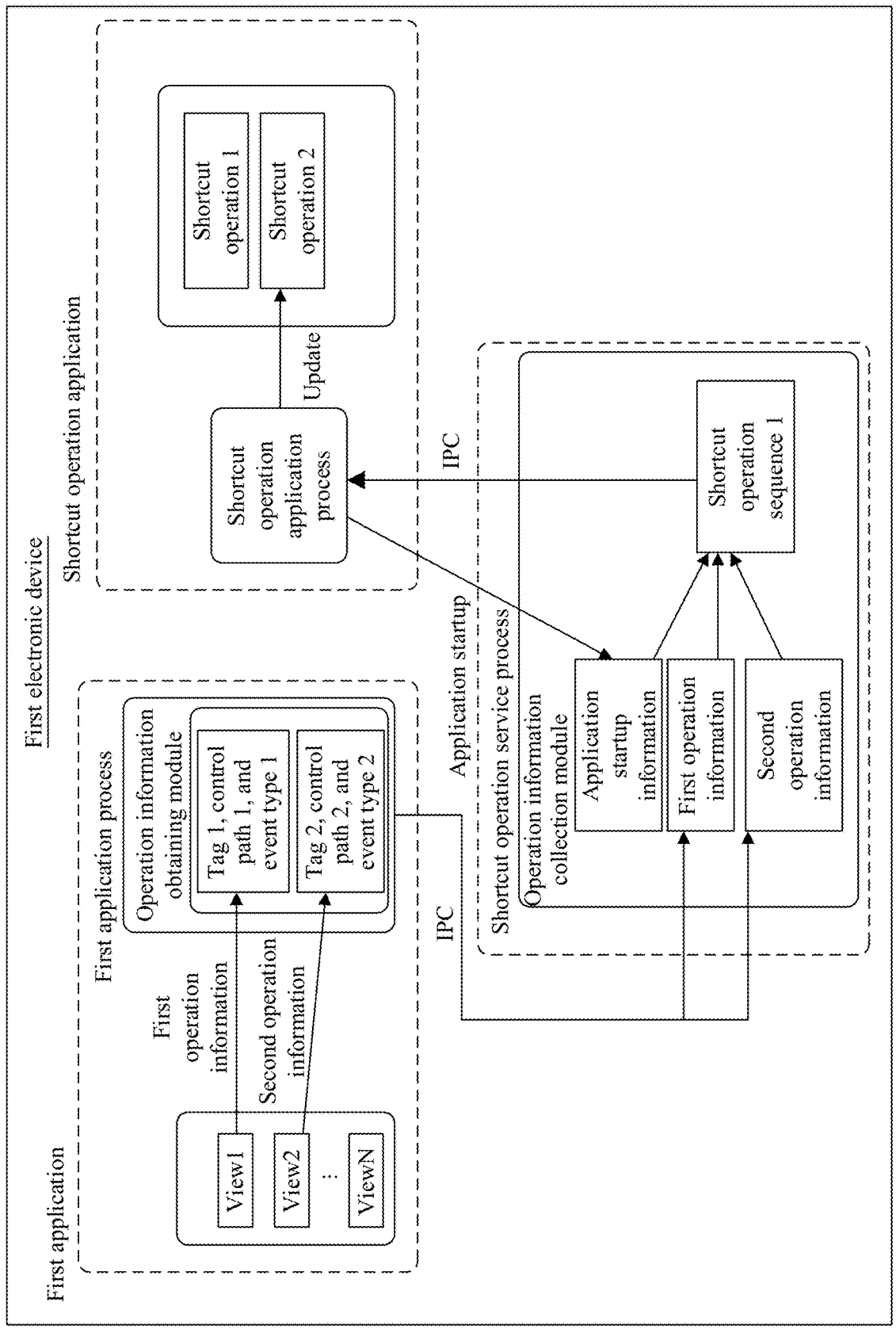
FIG. 7A is a schematic diagram of a method for recording an operation of a user according to an embodiment of this application.

FIG. 7A shows a method for recording an operation of a user according to an embodiment of this application. An example in which a first electronic device records, by using a shortcut operation application, an operation performed by a user on a first application is used for description. As shown in FIG. 7A, the first electronic device may include a shortcut operation service process, and the shortcut operation service process is located at an application layer of the first electronic device, and is used to record and play back a shortcut operation.

It should be noted that a process (Process) is a basic unit of resource allocation and scheduling in an operating system and a basis of a structure of the operating system. That is, when running any application, the operating system creates a process and allocates a space. Correspondingly, a first application process corresponds to the first application in the first device, and a shortcut operation application process corresponds to the shortcut operation application. In addition, a specific implementation type of an application in the first device is not limited in this application. In addition, the application mentioned in this application may also be referred to as an application.

The shortcut operation application process may be used to: in a process of recording an operation of the user, start an application that is selected by the user and that the user wants to operate, and send application startup information to the shortcut operation service process. The application startup information includes an event type, for example, an application startup event. The application startup information may further include an application name, for example, as shown in Table 1, content of a packageName field is an application name.

The first application process includes an operation information obtaining module. When the user performs the operation on the first application, the operation information obtaining module may obtain operation information of the user, for example, may obtain first operation information and second operation information of the user. For example, the first operation information includes: a control tag 1, for example, "mRccTag" in the foregoing embodiment; a control path 1, for example, the control path information in the foregoing embodiment; and an event type 1, for example, the click operation in the foregoing embodiment. Similarly, the second operation information includes a control tag 2, a control path 2, and an event type 2. The first application process may send the obtained operation information to the shortcut operation service process. In this application, an inter-process communication (inter-process communication, IPC) connection may be established between the first application process and the shortcut operation service process, to implement mutual communication between the first application process and the shortcut operation service process.

The shortcut operation service process includes an operation information collection module. The operation information collection module may package the application startup information and the operation information of the user on an application control into a shortcut operation sequence. The shortcut operation service process may send the packaged shortcut operation sequence to the shortcut operation application process through IPC communication. After receiving the shortcut operation sequence, the shortcut operation application process may correspondingly update, based on the received shortcut operation sequence, a shortcut operation displayed on an interface of the shortcut operation application. The shortcut operation service process may further send the packaged shortcut operation sequence to an internal memory, to save the shortcut operation sequence.

Figure 7B:
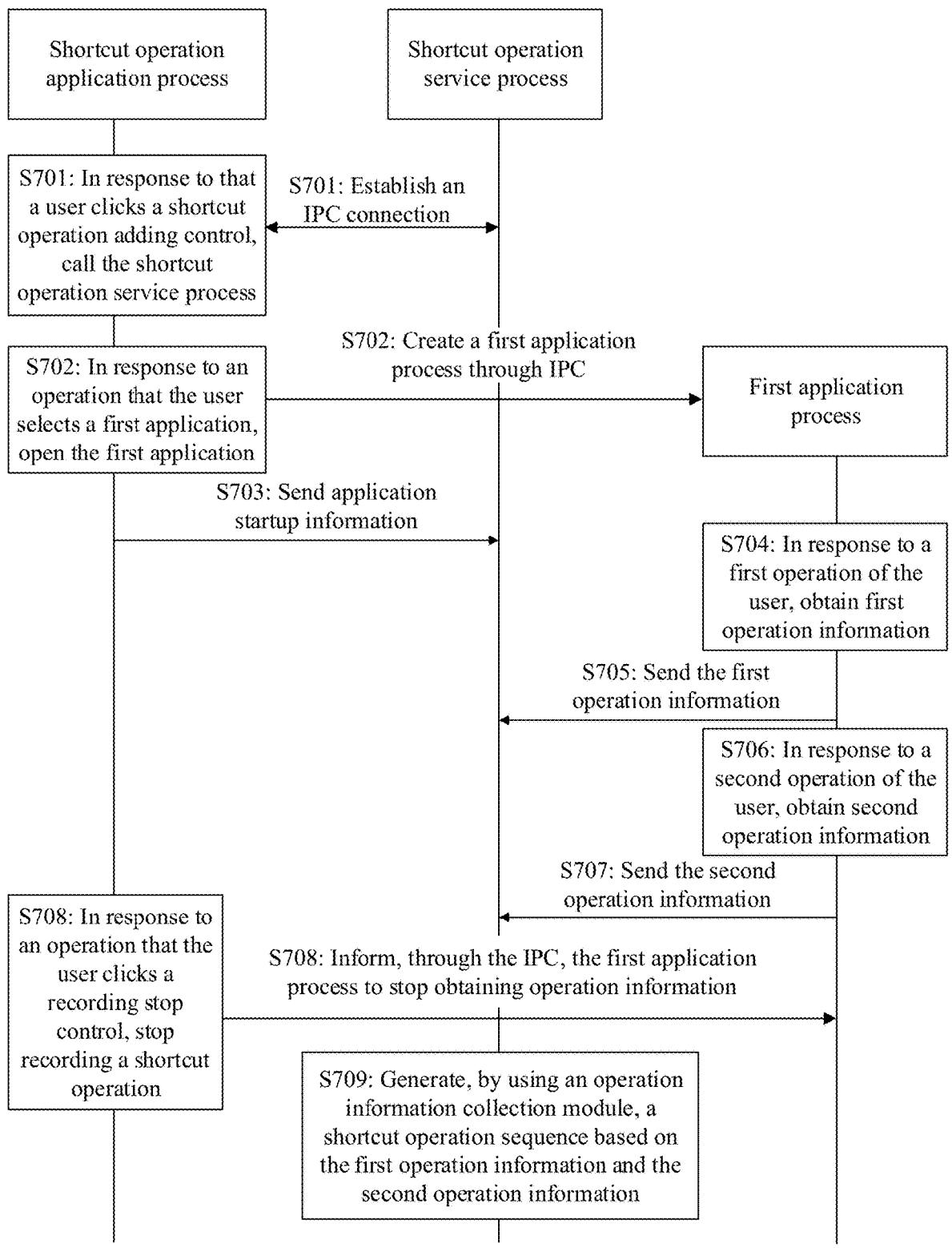
FIG. 7B is a schematic diagram of a method for recording an operation of a user according to an embodiment of this application.

FIG. 7B shows a method for recording an operation of a user according to an embodiment of this application. The method for recording an operation of a user may include the following steps:

Step S701: In response to that a user clicks a shortcut operation adding control, for example, the control 305 in FIG. 3B, a shortcut operation application process establishes a connection to a shortcut operation service process through IPC communication, to call the shortcut operation service process.

Step S702: In response to an operation that the user selects a first application, the shortcut operation application process opens the first application, to create a first application process.

Step S703: The shortcut operation application process sends application startup information to the shortcut operation service process. The application startup information includes an application name and an event type of application startup. For example, the application name is content of a packageName field shown in Table 2, and the event type is application startup. It should be noted that the user can open an application in a manner of clicking an icon corresponding to the application. For example, the user can open the application in a click manner, a double-click manner, a triple-click manner, a knuckle tap manner, a multi-finger selection manner, or the like. Specifically, when it is detected that the user performs an operation on the icon of the application, if it is determined that the operation is a click operation, name information of the application is obtained.

Step S704: In response to a first operation performed by the user on a control in an interface of the first application, the first application process obtains first operation information of the user, where the first operation information may include, for example, the control tag, the control path information, and the operation event type that are in the foregoing embodiment. It should be noted that when the first operation performed by the user on the control in the interface of the first application is detected, the operation may be determined. For example, if it is determined that the first operation is a click operation, the first operation information of the user is obtained.

Step S705: The first application process sends the first operation information of the user to the shortcut operation service process by using an operation information obtaining module.

Step S706: In response to a second operation performed by the user on the control in the interface of the first application, the first application process obtains second operation information of the user, where the second operation information may include, for example, the control tag, the control path information, and the operation event type that are in the foregoing embodiment. It should be noted that when the second operation performed by the user on the control in the interface of the first application is detected, the operation may be determined. For example, if it is determined that the second operation is a click operation, the second operation information of the user is obtained. Step S707: The first application process sends the second operation information of the user to the shortcut operation service process by using the operation information obtaining module.

Step S708: In response to an operation that the user clicks a recording stop control, stop recording a shortcut operation, and inform the first application process to stop obtaining operation information.

Step S709: The shortcut operation service process packages, by using an operation information collection module, the obtained application startup information, the first operation information, and the second operation information into a shortcut operation sequence. The shortcut operation sequence is associated with startup of the first application and performing of the first operation and the second operation on the control of the first application.

Figure 7C:
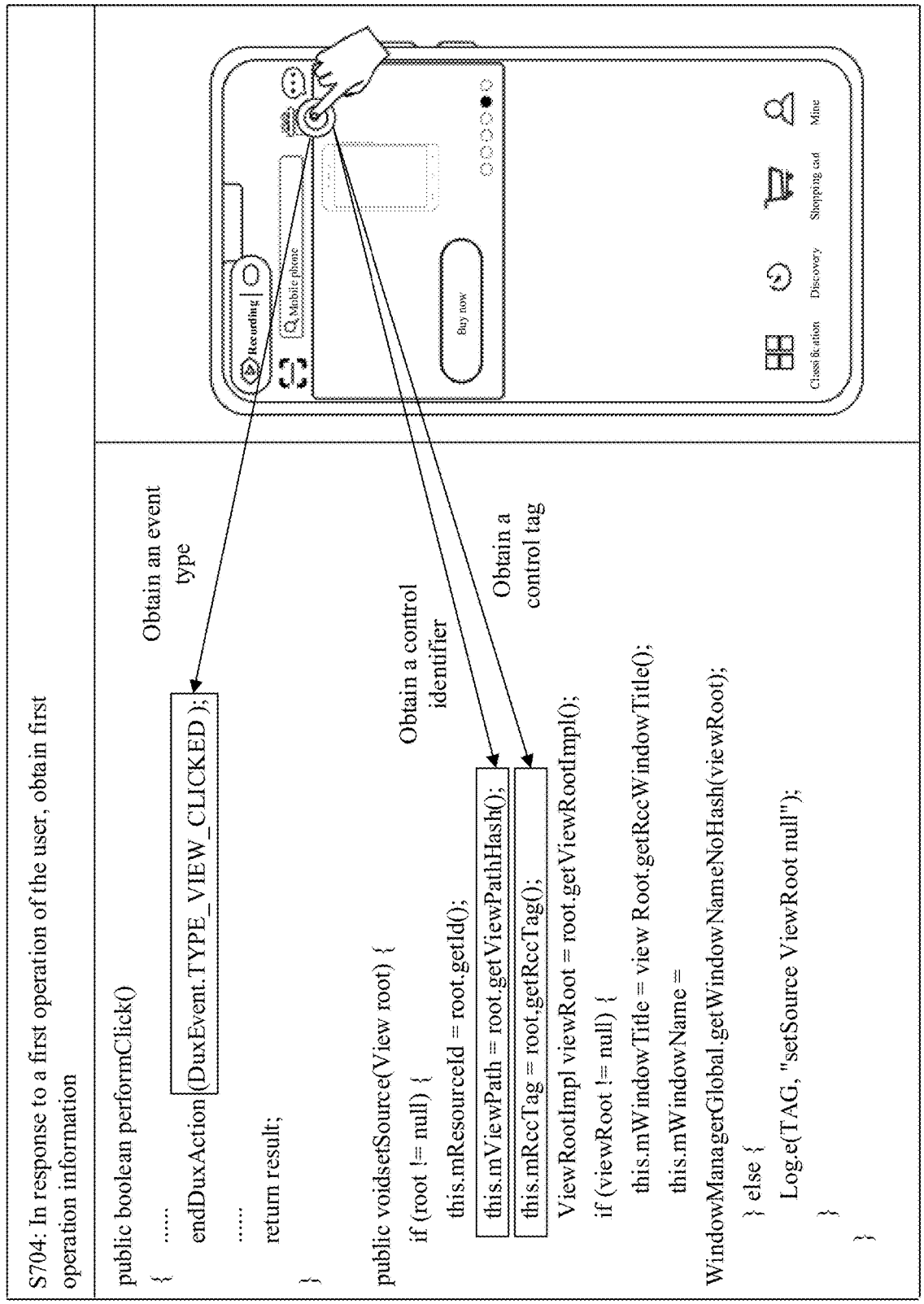
FIG. 7C is a schematic diagram of a method for recording an operation of a user according to an embodiment of this application.
Figure 8A:
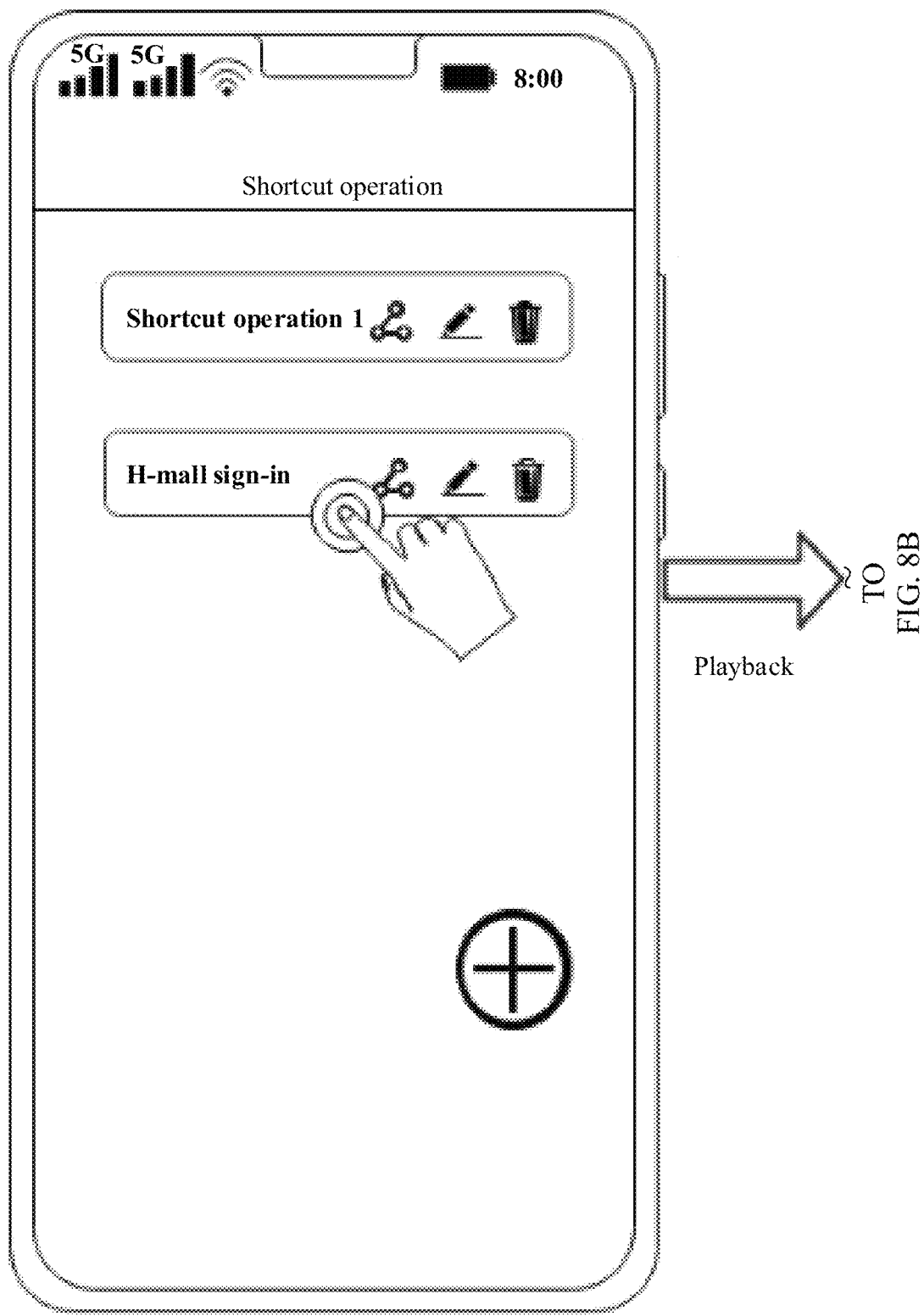
FIG. 8A, FIG. 8B, FIG. 8C, FIG. 8D, and FIG. 8E are a schematic diagram of playing back an operation of a user according to an embodiment of this application.
Figure 8B:
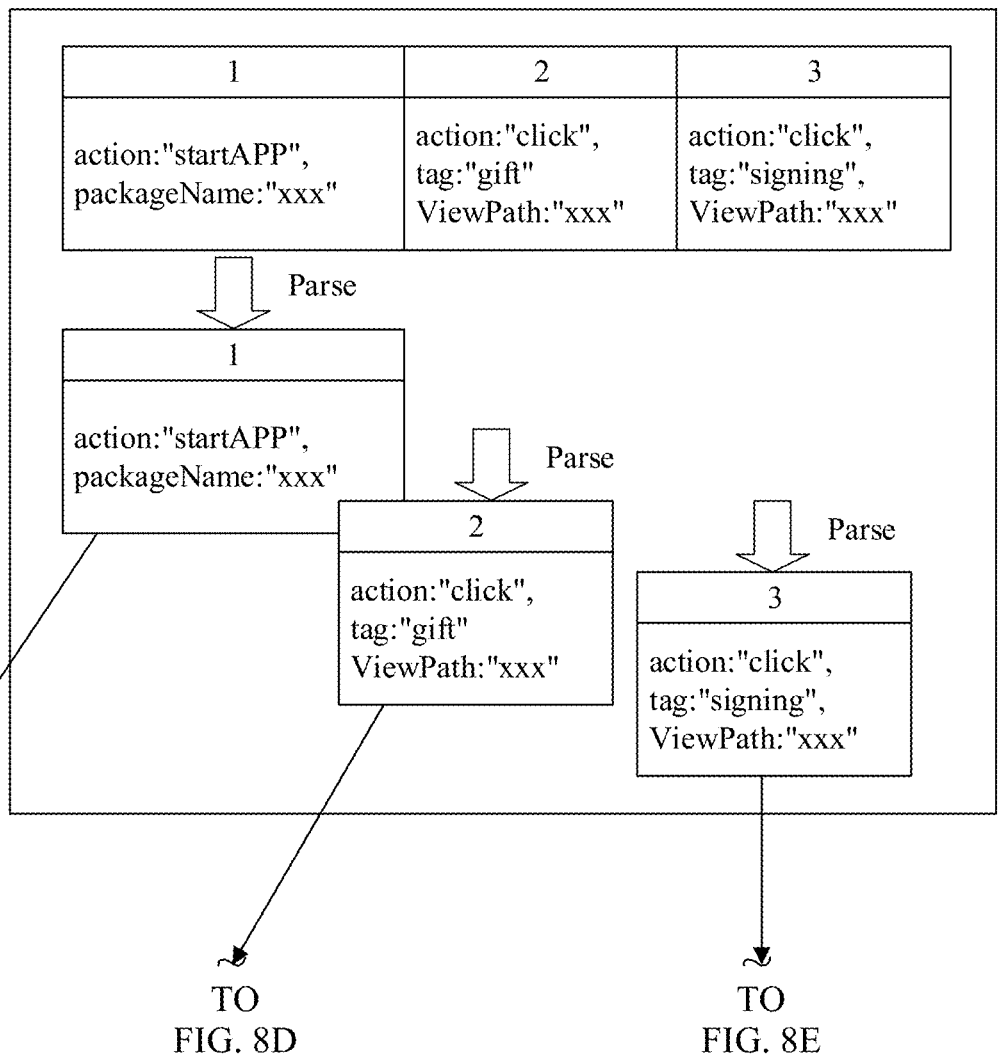
Figure 8C:
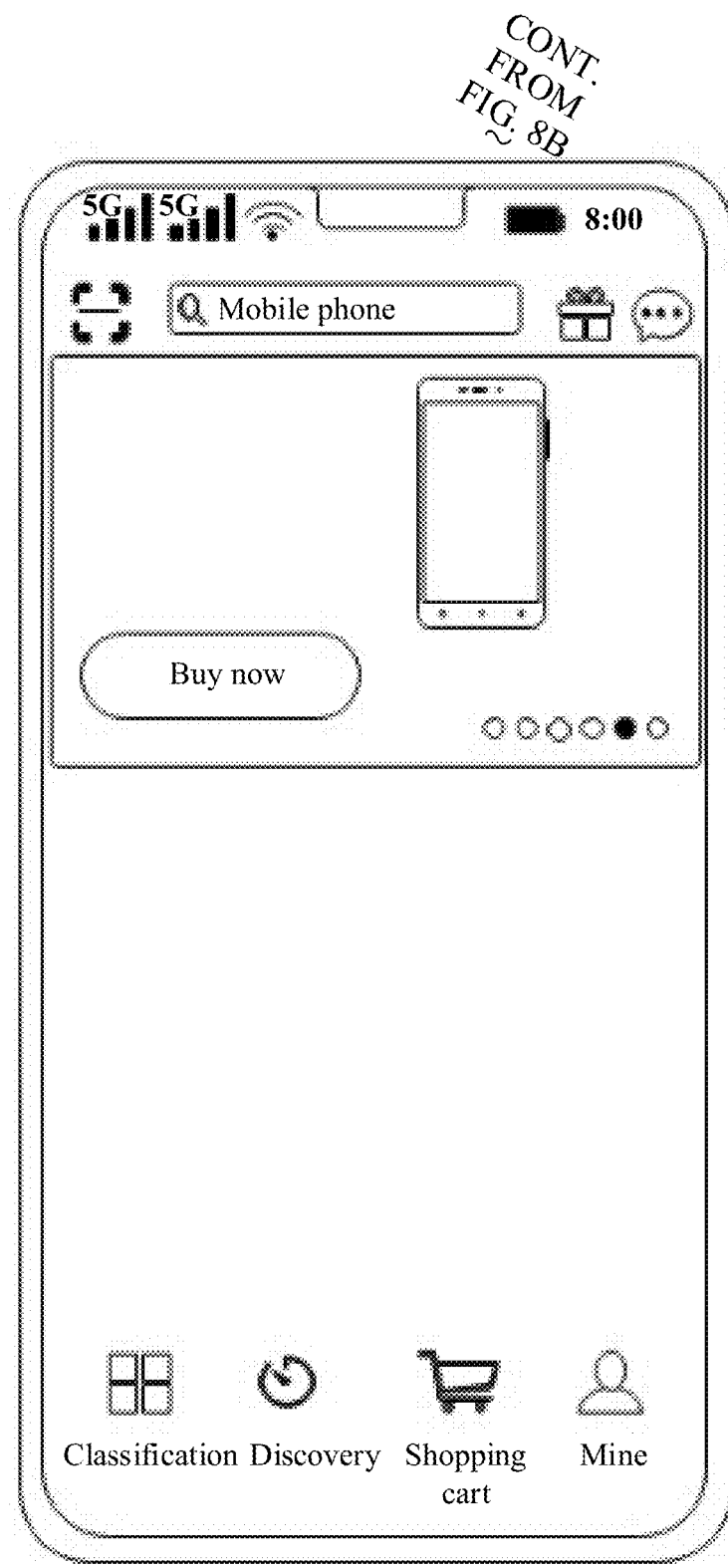
Figure 8D:
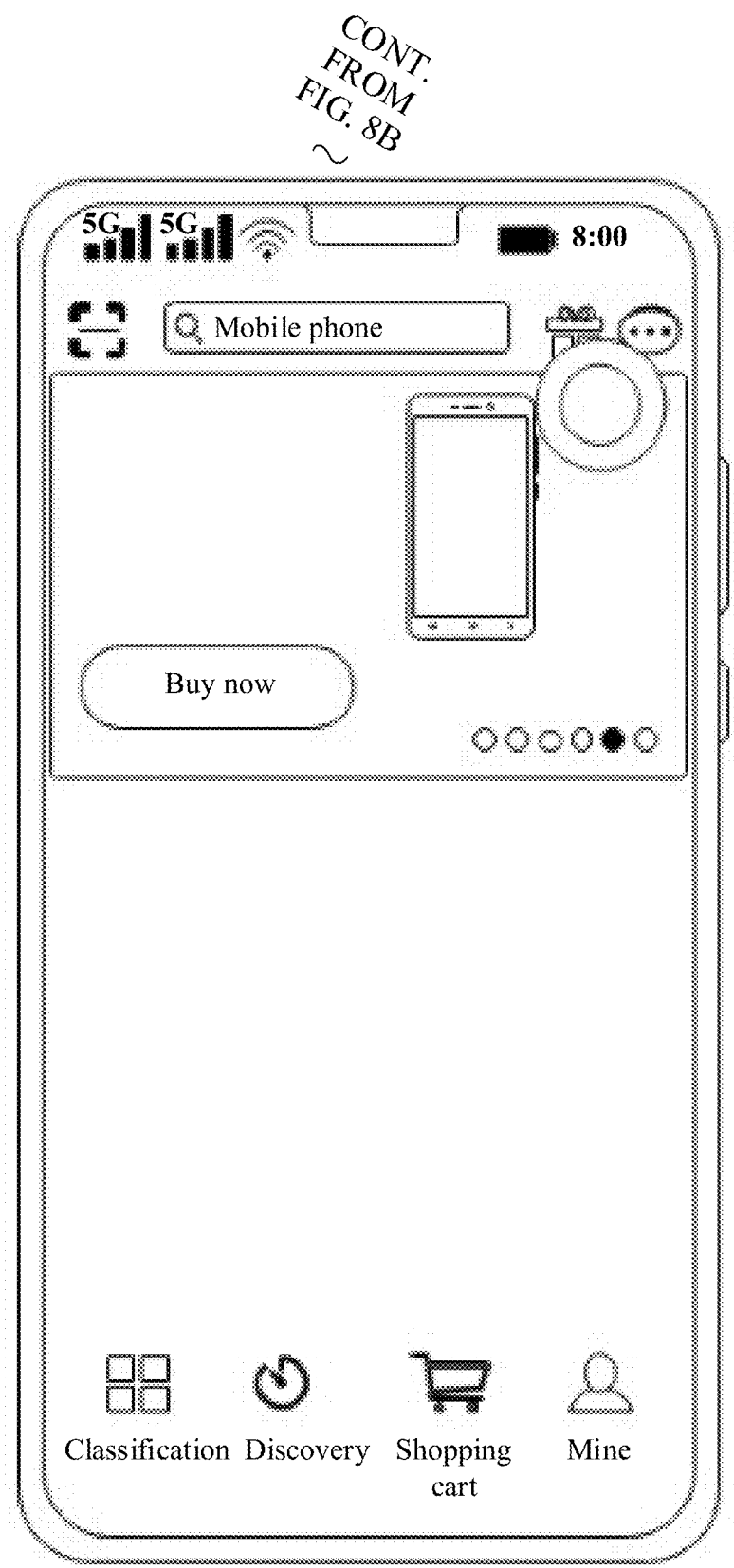
Figure 8E:
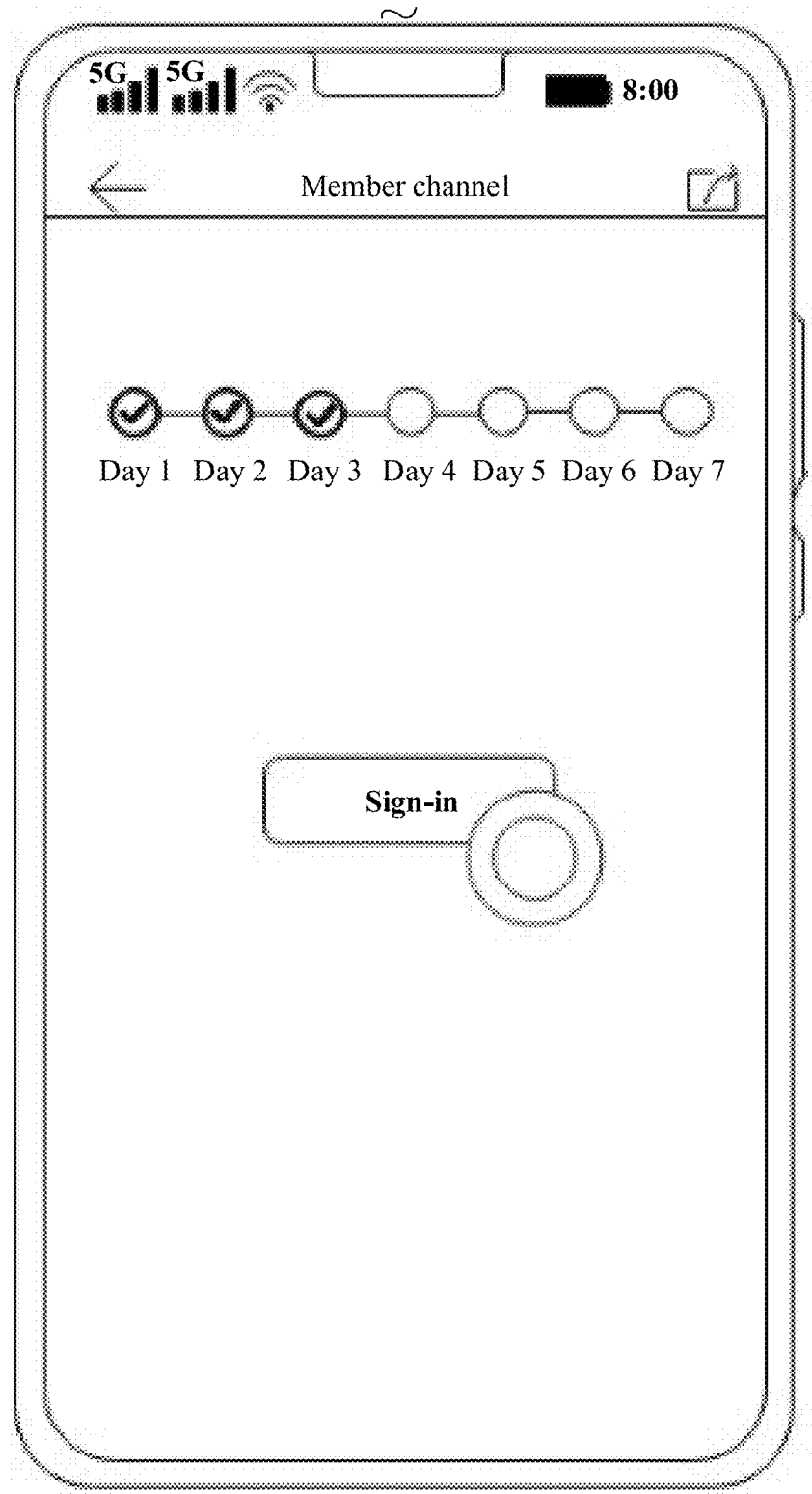

It should be noted that code for implementing the step S704 may be the code shown in FIG. 7C, for example, the operation event type is obtained by using DuxEvent.TYPE_VIEW_CLICK, for example, a click operation. The control path information is obtained by using getViewPathHash( ) and the control tag is obtained by using getItccTag( ).

It may be understood that all operation information of the user on the application is saved in the shortcut operation sequence. In FIG. 7, the first operation information and the second operation information are merely used as examples. In another possible implementation, according to an actual operation performed by the user on an application, less or more operation information may be saved in a shortcut operation sequence packaged by the shortcut operation service process. For example, the user only performs an operation of opening an application, and in this case, operation information of application startup is saved in a shortcut operation sequence. For another example, if the user wants to add a shortcut operation of taking a taxi home from the company, the user opens a taxi-hailing application, enters a company address in a pick-up place entry box control, enters a home address in a destination entry box control, and then clicks "confirm to hail". In this case, first operation information of entering a pick-up place, second operation information of entering a destination, and third operation information of clicking "confirm to hail" are saved in a shortcut operation sequence.

As shown in FIG. 7A to FIG. 7C, an operation of the user may be recorded by a shortcut operation application installed in an electronic device. The shortcut operation application may call a shortcut operation service process built in an application layer of the electronic device to record the operation of the user.

In some application scenarios, the user hopes to add a shortcut operation on a mobile phone. In a possible implementation, the user may click a shortcut operation adding control in the shortcut operation application, to call the shortcut operation service process, and record the operation performed by the user on the application. For example, in an interface of the shortcut operation application, the user may click the shortcut operation adding control, and select an application (for example, an H-mall application) to be operated. The shortcut operation application calls the shortcut operation service process built in the application layer of the electronic device, to record an operation performed by the user on the "H-mall" application.

In a possible implementation, the user may call the shortcut operation service process by using a voice input. For example, the user says, "Xiaoyi, add a shortcut operation", to the mobile phone. After the mobile phone collects a voice signal, a voice assistant system in the mobile phone may be used to perform voice recognition on the voice signal, and send a voice recognition result to a device management server. The device management server obtains, according to the voice processing result, a control instruction for calling the shortcut operation service process, and sends the instruction to the mobile phone, to call the shortcut operation service process. After the shortcut operation service process is called, the user may control the mobile phone by using a voice, to select an application to be operated, and control the mobile phone by using a voice, to perform an operation on the selected application. Alternatively, the user may control the mobile phone by using a voice, to select an application to be operated, and manually perform a wanted operation on the application. Alternatively, in the process in which the user controls the mobile phone by using the voice, to perform the operation on the selected application, the user may manually perform the operation.

For example, the mobile phone says, "please add an operation", to the user, and the user says, "open the H-mall", to the mobile phone 101, clicks "gift", and clicks "sign-in", to complete adding. After the mobile phone collects a voice signal and performs voice recognition, the mobile phone performs a corresponding operation on the "H-mall" application, and calls the shortcut operation service process to record the corresponding operation. After recording is complete, the mobile phone prompts the user for a result of adding a shortcut operation. For example, the mobile phone says, "a shortcut operation has been added", to the user.

As shown in FIG. 8A, FIG. 8B, FIG. 8C, FIG. 8D, and FIG. 8E, an operation of a user may be played back by parsing a shortcut operation sequence. Parsing of the shortcut operation sequence is performed based on a sequence of adding operation information to the shortcut operation sequence. For example, an application startup message is first parsed, and application startup is performed; then operation information of clicking a "gift" control is parsed, and the "gift" control is clicked; and operation information of clicking a "sign-in" control is finally parsed, and a click operation is performed on the "sign-in" control.

Figure 9:
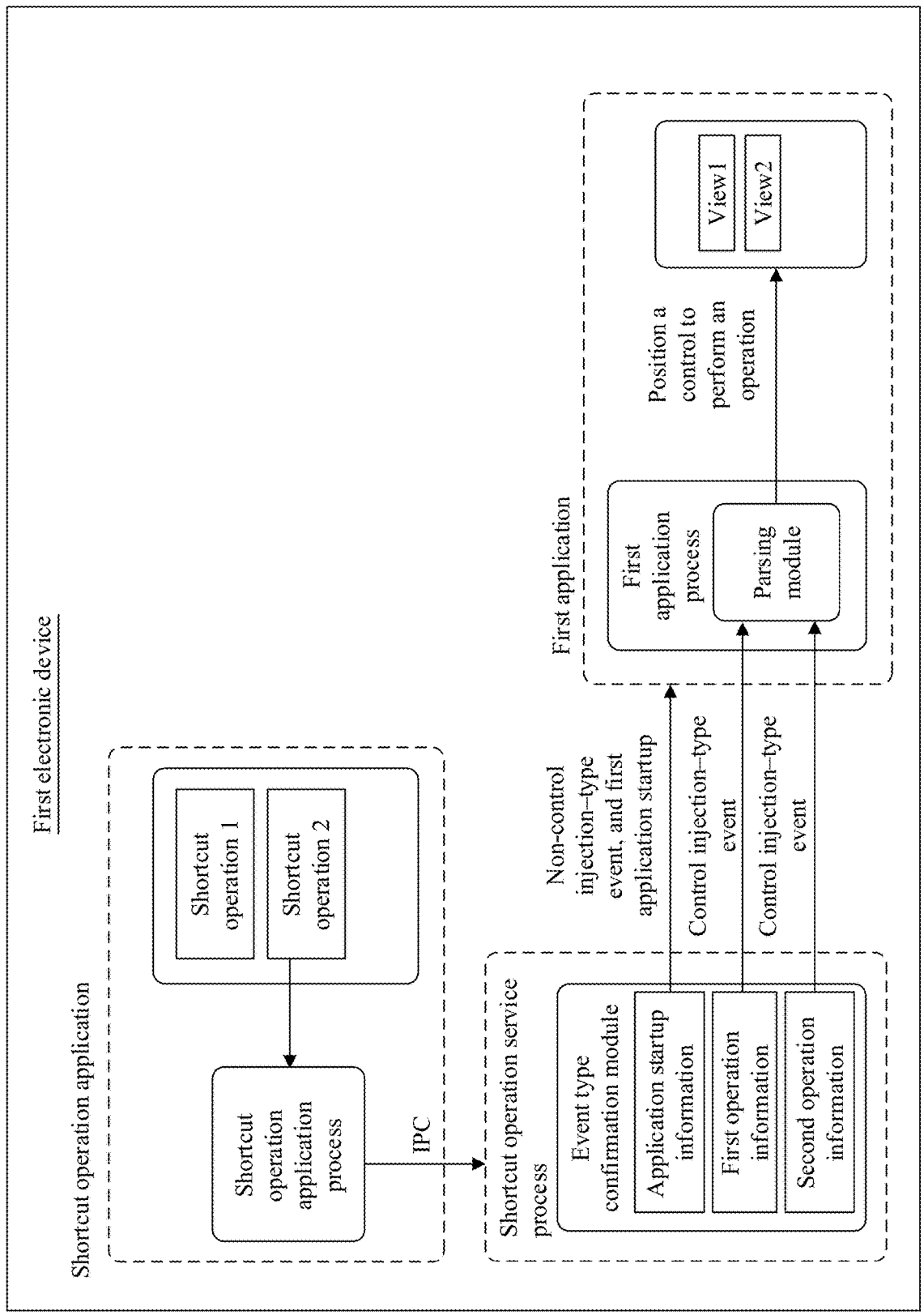
FIG. 9 is a schematic diagram of a method for playing back an operation of a user according to an embodiment of this application.

FIG. 9 shows a method for playing back an operation of a user according to an embodiment of this application. An example in which a first electronic device plays back, by using a shortcut operation application, an operation performed by a user on a first application is used for description. As shown in FIG. 9, a shortcut operation application process of the first electronic device may send a shortcut operation sequence to a shortcut operation service process through IPC communication.

The shortcut operation service process includes an event type confirmation module. After receiving the shortcut operation sequence, the shortcut operation service process may parse an event type in the shortcut operation sequence by using content of an event type "mEventType" field.

It should be noted that an event type of an operation in the shortcut operation sequence may be classified into a control injection—type operation or a non-control injection—type operation. The control injection—type operation includes an operation that needs to be performed on a control in an application interface, for example, click, long press, sliding, dragging, or text entry. The non-control injection—type operation includes an operation, for example, opening an application, returning to a main interface of an electronic device, or exiting the application.

If the event type confirmation module of the shortcut operation service process parses that the operation in the shortcut operation sequence is a non-control injection—type operation, for example, the operation sequence shown in FIG. 6A and FIG. 6B, the event type confirmation module parses, by using content "64" of the event type "mEventType" field, that opening of the H-mall application is a non-control injection—type operation. The event type confirmation module converts operation information of opening the H-mall application in the shortcut operation sequence into a data format that can be performed by the application, to control to open the H-mall application, and create an H-mall application process.

If the event type confirmation module of the shortcut operation service process parses that the operation in the operation sequence is a control injection—type operation, for example, the event type confirmation module parses, by using content "1" of the event type "mEventType" field, that a click application is a control injection—type operation, the event type confirmation module converts operation information of clicking a control in the shortcut operation sequence into a data format that can be performed by a third-party application, and sends the shortcut operation sequence to a parsing module in an application framework layer for further parsing. The parsing module receives the shortcut operation sequence, and further parses the control injection—type operation information. To be specific, the parsing module parses information such as an event type, an operation parameter, and a control tag. For example, the parsing module further parses that content of the control tag "mRccTag" field is "gift", and positions a "gift" control and performs the click operation. The H-mall application process may obtain a parsing result, and perform a corresponding operation on a corresponding control. Therefore, a sign-in operation in the H-mall application is played back.

It should be noted that, in the playback process, the control may be positioned by parsing control path information, to perform the operation. For example, the "mViewPath" field may be parsed to position the control.

In another possible implementation, when receiving the operation sequence, the parsing module may first determine whether there is a control tag. If there is a control tag, the control may be positioned by parsing the control tag, to perform the operation on the control. If there is no control tag, the control may be positioned by parsing the control path information, to perform the operation on the control. Alternatively, the parsing module may position the control by separately parsing the control tag and the control path information. If a consistent control is positioned in the two parsing manners, it is considered that positioning of the control is accurate, and the operation is further performed on the positioned control.

In some embodiments, the process of playing back the operation of the user may fail. For example, after an application version is updated, the control path information changes, and an original control cannot be accurately positioned by using the path information obtained when the operation of the user is recorded. In this case, the control is positioned by using the control tag, and the operation is performed. If there is no control tag and the control cannot be positioned, the playback process is interrupted and the user is prompted that the playback fails. The user can record the shortcut operation on the application again.

Alternatively, no control is found in the playback process because a window or a control that does not appear in the recording process appears, for example, an advertisement page that appears when the application is opened. In this case, a waiting time threshold may be preset. After the waiting time threshold arrives, the control tag or the control path information is parsed again to position the control. If the window or the control that does not appear disappears and the control can be positioned, the operation is performed. If the window or the control does not disappear after the waiting time threshold arrives and the control cannot be positioned, the playback process is interrupted, and the user is prompted that the playback fails. Alternatively, the user may wait for a period of time to play back the operation.

Alternatively, a case in which user information needs to be confirmed occurs in the playback process. For example, the user logs in to a music application by using an account, and records, on the music application, a shortcut operation of playing music in "my favorites", where the music in "my favorites" corresponds to account information of the user. When the user does not use the music application for a long time, and when the user plays back the shortcut operation, login information of the user expires. In this case, the user needs to use the account to log in during the playback process. When it is detected that the user information needs to be confirmed, the user may be prompted to enter the information. After verification of the account of the user succeeds, the playback operation is continuously performed. Alternatively, when it is detected that the user information needs to be confirmed, the playback operation is interrupted, and the user is prompted that the playback fails.

Figure 10:
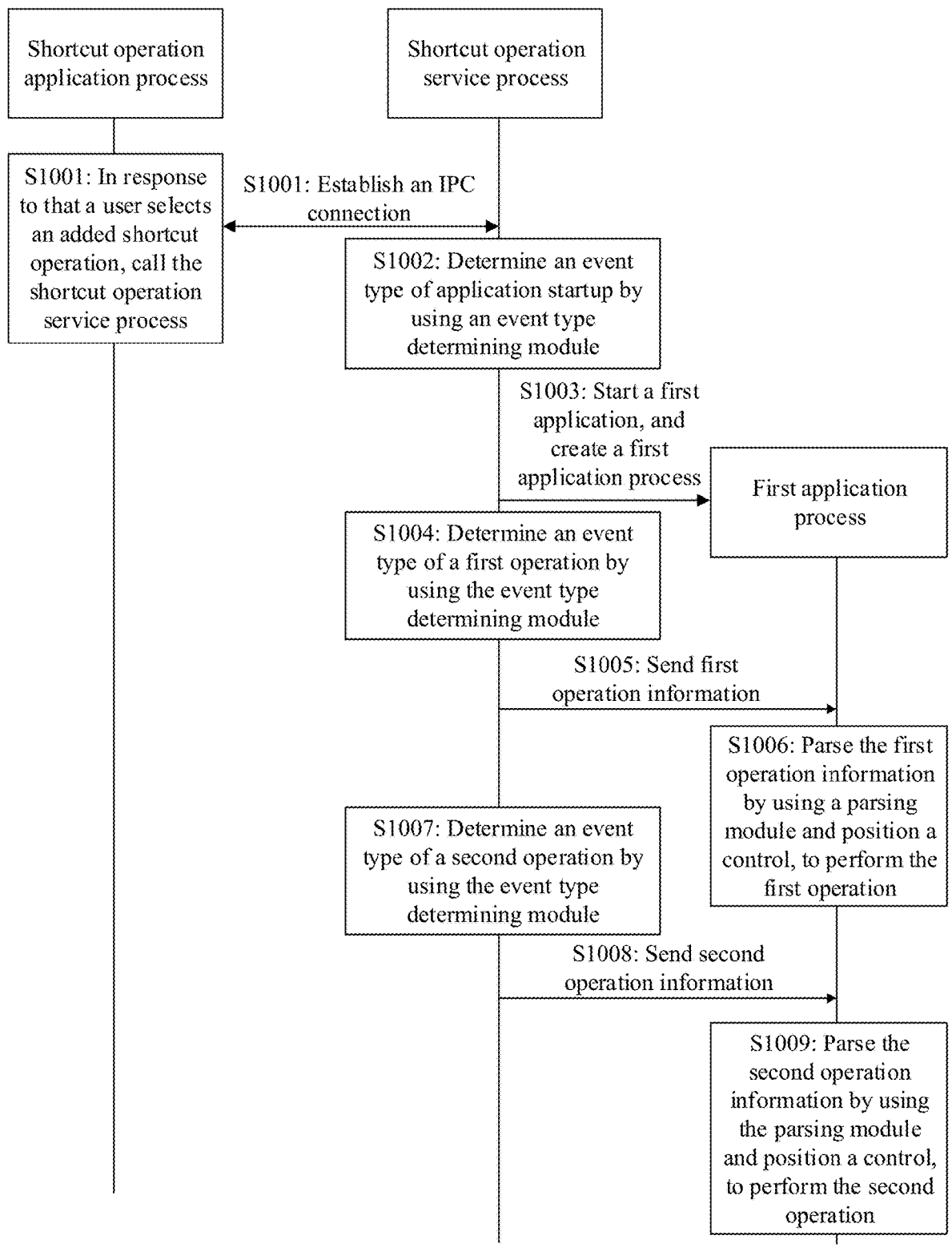
FIG. 10 is a schematic diagram of a method for playing back an operation of a user according to an embodiment of this application.

FIG. 10 shows a method for playing back an operation of a user according to an embodiment of this application. An example in which a shortcut operation is that a user starts a first application, a first operation performed in a first application is a click operation, and a second operation is a click operation is used for description. The method for playing back an operation of a user may include the following steps:

Step S1001: In response to that a user selects an added shortcut operation, a first shortcut operation application process establishes a connection to a shortcut operation service process through IPC communication, to call the shortcut operation service process. For example, refer to FIG. 3I, the added shortcut operation is the shortcut operation of clicking "H-mall sign-in". The first shortcut operation application process sends a shortcut operation sequence to the shortcut operation service process.

Step S1002: After receiving the shortcut operation sequence, the shortcut operation service process determines that an application startup event is a non-control injection—type operation by using an event type determining module.

Step S1003: The shortcut operation service process starts a first application to create a first application process.

Step S1004: After receiving the shortcut operation sequence, the shortcut operation service process determines that an event type of a first operation is a control injection—type operation by using the event type determining module.

Step S1005: The shortcut operation service process sends first operation information to the first application process.

Step S1006: The first application process includes a parsing module, and after receiving the first operation information sent by the shortcut operation service process, the first application process parses the first operation information. The parsing module may parse a control tag in the first operation information to position a control (for example, by parsing content of an "mRccTag" field), and perform a corresponding operation. Alternatively, the parsing module may parse control path information in the first operation information (for example, may parse an "mViewPath" field) to position a control, and perform a corresponding operation.

Step S1007: After receiving the shortcut operation sequence, the shortcut operation service process determines that an event type of a second operation is a control injection—type operation by using the event type determining module.

Step S1008: The shortcut operation service process sends second operation information to the first application process.

Step S1009: After receiving the second operation information sent by the shortcut operation service process, the first application process parses the second operation information. The parsing module may parse a control tag in the second operation information to position a control (for example, by parsing content of an "mRccTag" field), and perform a corresponding operation. Alternatively, the parsing module may parse control path information in the second operation information (for example, may parse an "mViewPath" field) to position a control, and perform a corresponding operation.

As shown in FIG. 10, playing back, on a first electronic device, a shortcut operation added by the user may be implemented by starting a shortcut operation service process built in an application layer of the electronic device.

In some application scenarios, that the electronic device 101 is a mobile phone is used as an example. The user may click a shortcut operation in a shortcut operation application on the mobile phone, call a shortcut operation service process, and control the added shortcut operation to be played back on the mobile phone. For example, the user clicks an H-mall sign-in shortcut operation in the shortcut operation application on the mobile phone, and calls the shortcut operation service process on the mobile phone, to play back, on the mobile phone, the shortcut operation selected by the user.

In another possible implementation, the user may select, through voice input control, a shortcut operation in the shortcut operation application on the mobile phone, to call the shortcut operation service process to control the added shortcut operation to be played back on the mobile phone.

It may be understood that, in some other embodiments, in addition to being the mobile phone 101, the electronic device configured to perform a playback may alternatively be a watch or another electronic device (for example, a tablet computer) that establishes a connection to the mobile phone by using a network and that is paired with the mobile phone.

In some application scenarios, that the first electronic device is a mobile phone is used as an example for description. A shortcut operation sequence corresponding to a shortcut operation recorded by the user is saved in the mobile phone, and the user can record the shortcut operation by using the mobile phone. For example, the user records a "clock-in" shortcut operation on the mobile phone, and the "clock-in" is used to perform clock-in when the user arrives a working place. The user first opens the shortcut operation application, and then selects a clock-in application. In the clock-in application, the user opens a clock-in interface, clicks "clock-in", clicks a recording stop control of the shortcut operation application, and saves the foregoing operation as the "clock-in" shortcut operation. Therefore, the "clock-in" shortcut operation is displayed in an interface of the shortcut operation application. When the user wants to play back the shortcut operation on the mobile phone, the user may select the "clock-in" shortcut operation in the interface of the shortcut operation application. In response to the selection of the user, the "clock-in" shortcut operation is played back on the mobile phone 101.

In some other embodiments, the user may record a shortcut operation on a watch, and save a shortcut operation sequence corresponding to the recorded shortcut operation. The shortcut operation recorded by the user on the watch may be played back on the watch. For example, the user records a "running indoors" shortcut operation on the watch, where the "running indoors" is used to record data of the user running indoors. The user opens the shortcut operation application and selects an application for recording motion data. In the application, the user selects "running indoors", clicks "start", clicks the recording stop control of the shortcut operation application, and saves the foregoing operation as the "running indoors" shortcut operation. Therefore, the "running indoors" shortcut operation is displayed in the shortcut operation application of the watch. When the user wants to play back the shortcut operation on the watch, the user may select the "running indoors" shortcut operation in the interface of the shortcut operation application of the watch. In response to the selection of the user, the "running indoors" shortcut operation is played back on the watch.

Figure 11:
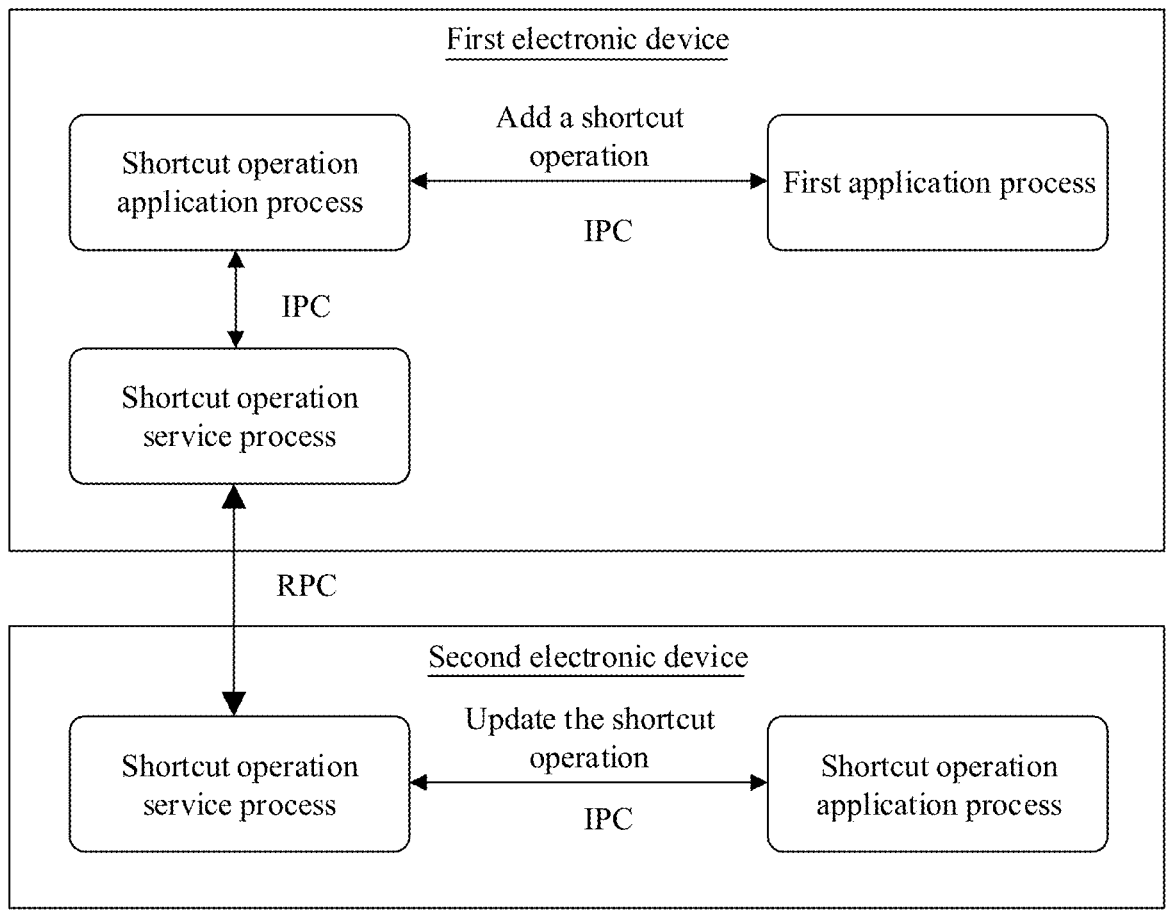
FIG. 11 is a schematic diagram of sharing a recorded operation of a user according to an embodiment of this application.

As shown in FIG. 11, a first electronic device may send a recorded shortcut operation to a second electronic device. The first electronic device has a shortcut operation application, a shortcut operation application process corresponds to the shortcut operation application, the first electronic device further has a first application, and a first application process corresponds to the first application. An application layer of the first electronic device has a shortcut operation service process. The shortcut operation service process may be used to send a shortcut operation added by a user on the first electronic device to the second electronic device.

The second electronic device has a shortcut operation application. An application layer of the second electronic device has a shortcut operation service process.

A remote procedure call (remote procedure call, RPC) connection may be established between the shortcut operation service process of the first electronic device and the shortcut operation service process of the second electronic device, to implement mutual communication between the shortcut operation service process of the first electronic device and the shortcut operation service process of the second electronic device.

After receiving the shortcut operation sent by the first electronic device, the shortcut operation service process of the second electronic device sends the shortcut operation to the shortcut operation application process through IPC communication. After receiving the shortcut operation, the shortcut operation application process updates and displays the received shortcut operation on an interface of the shortcut operation application.

For example, that the first electronic device is a mobile phone and the second electronic device is a watch is used as an example for description. It should be noted that, in addition to being the mobile phone 101, the first electronic device may alternatively be an electronic device that supports an audio/video service, for example, a tablet computer, a notebook computer, a wearable electronic device that has a wireless communication function (for example, a smart watch), a virtual reality device, or a smart home device (for example, a smart television). A specific form of the first electronic device is not specifically limited in the following embodiments. In addition to being the watch, the second electronic device may alternatively be an electronic device that supports an audio/video service or a voice call service, for example, a tablet computer, a notebook computer, a wearable electronic device that has a wireless communication function, a virtual reality device, or a smart home device (for example, a smart television). A specific form of the second electronic device is not specifically limited in the following embodiments.

In some application scenarios, the user has a mobile phone and a watch. After the mobile phone and the watch are paired through a connection, a shortcut operation recorded by the user on the mobile phone may be sent to the watch, the shortcut operation added by the user may be displayed on the watch, and the user may click the shortcut operation on the watch to control the shortcut operation to be played back on the mobile phone. For the playback process, refer to the interfaces shown in FIG. 14A to FIG. 14H. FIG. 14A to FIG. 14E show interfaces on the watch, and FIG. 14F to FIG. 14H show interfaces on the mobile phone.

Figure 14A:
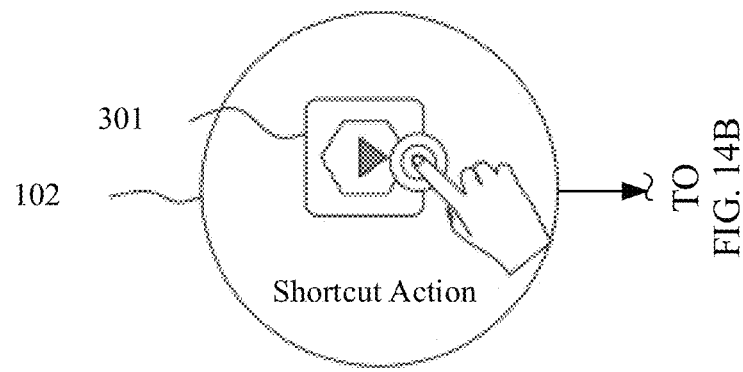
FIG. 14A to FIG. 14H are schematic diagrams of playing back an operation on a plurality of devices according to an embodiment of this application.
Figure 14B:
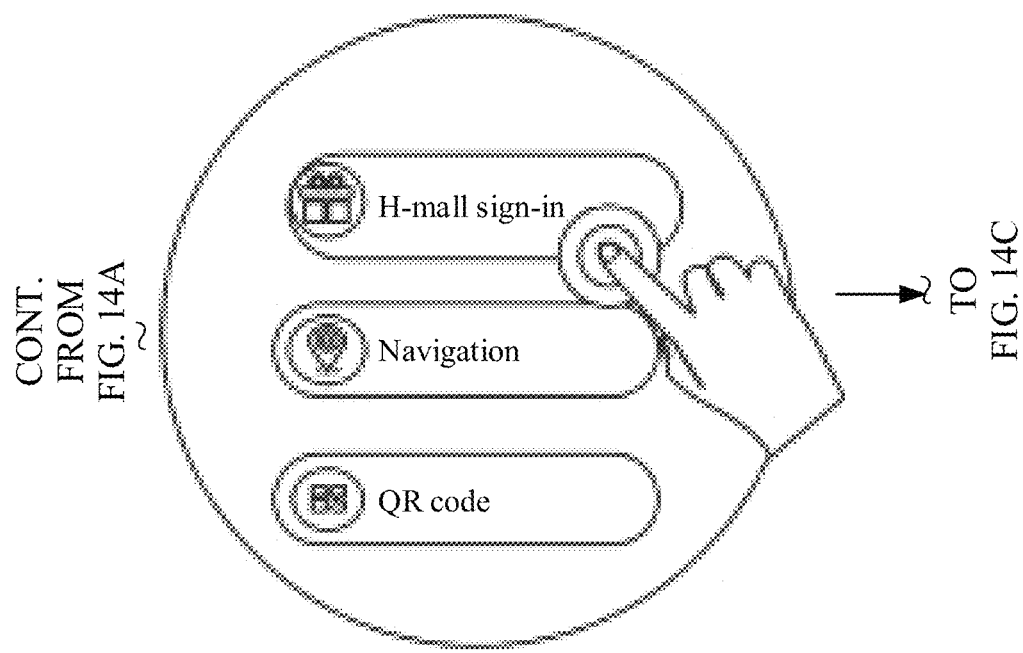

The user may click a shortcut operation to be played back on another application interface of the shortcut operation application shown in FIG. 14B. In response to the click operation of the user, the shortcut operation application calls the shortcut operation service process of the watch and the shortcut operation service process of the mobile phone, and starts to play back the shortcut operation selected by the user on the mobile phone paired with the watch. For example, the user selects an H-mall sign-in shortcut operation in the shortcut operation application on the watch (refer to FIG. 14B), and the mobile phone starts to play back the shortcut operation, so that the user performs sign-in in the H-mall application on the mobile phone. It should be noted that an application related to the shortcut operation needs to be installed in the mobile phone configured to play back the shortcut operation of the user, and a control of the application is identified according to the tagging method provided by the control tagging module in the application framework layer of the electronic device.

Figure 14C:
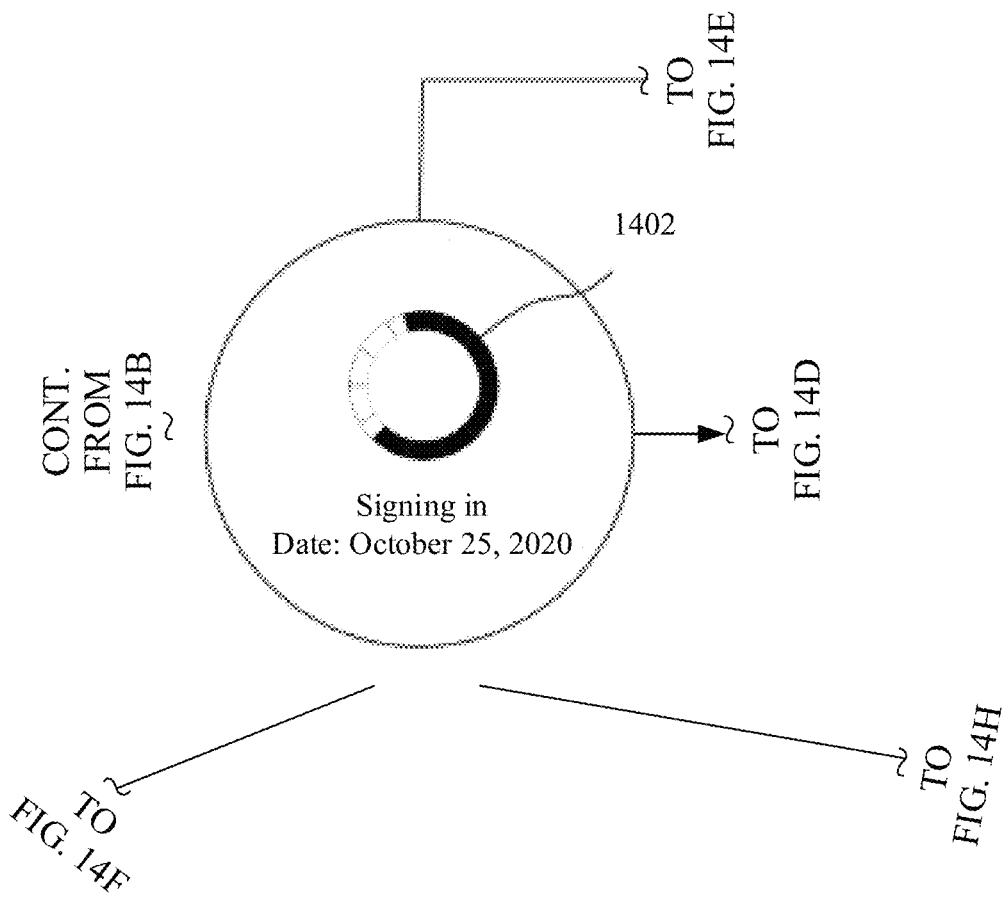

FIG. 14C shows the another application interface of the shortcut operation application. The application interface may display an icon of the shortcut operation or may prompt the user of content of the shortcut operation. A prompt form and prompt content are not specifically limited in this embodiment of this application. For example, the user selects a shortcut operation of performing sign-in in the H-mall application on the mobile phone. An interface of the shortcut operation may display a "gift" icon, where the icon may display progress of playing back the shortcut operation, may display text information of "sign-in", or may display a sign-in date.

Figure 14D:
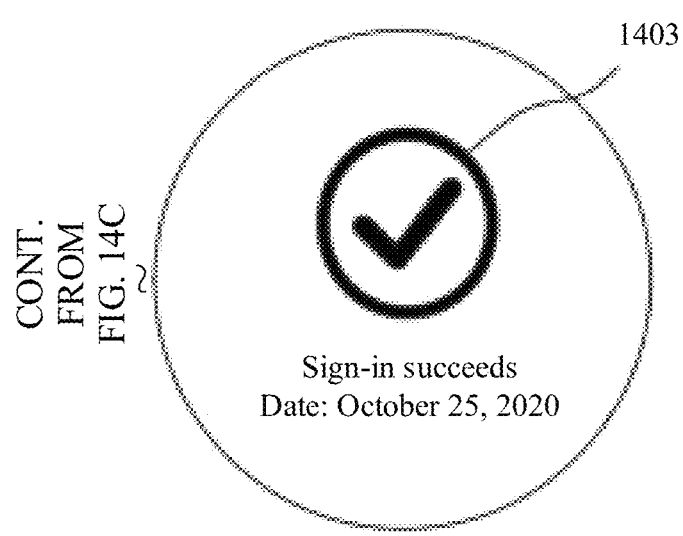
Figure 14E:
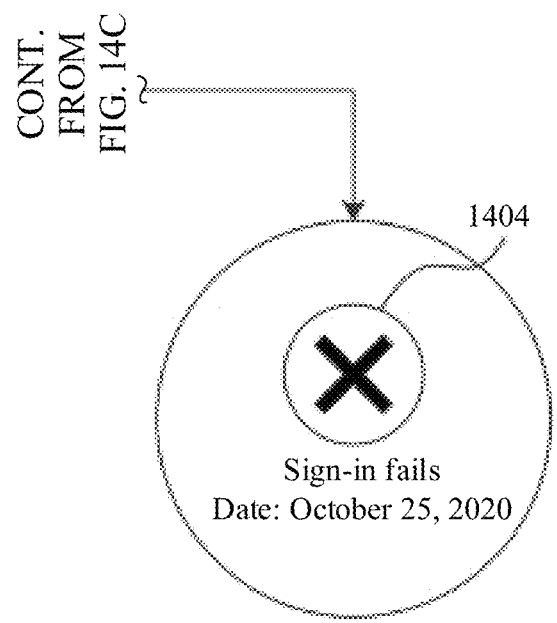
Figure 14F:
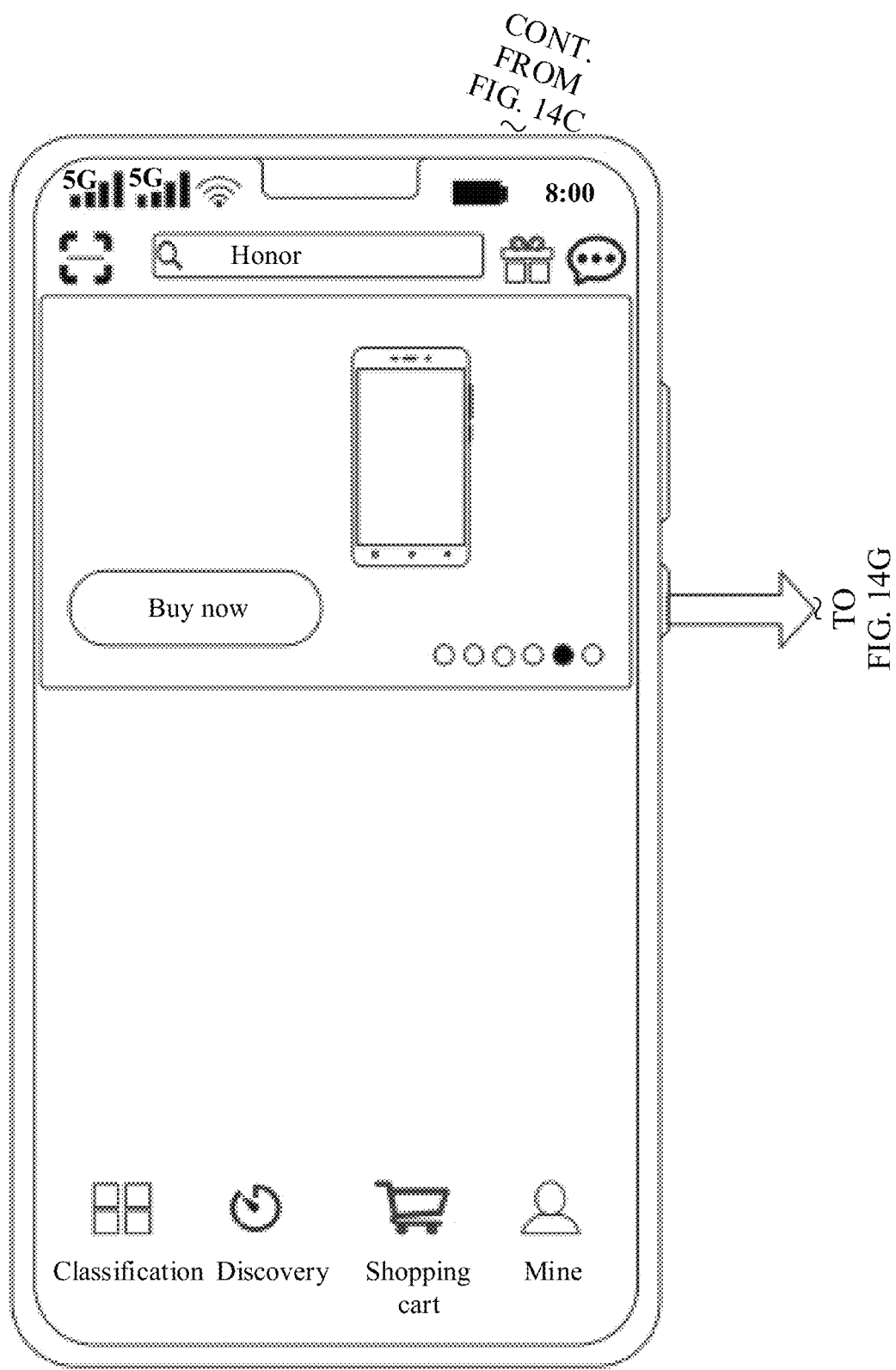
Figure 14G:
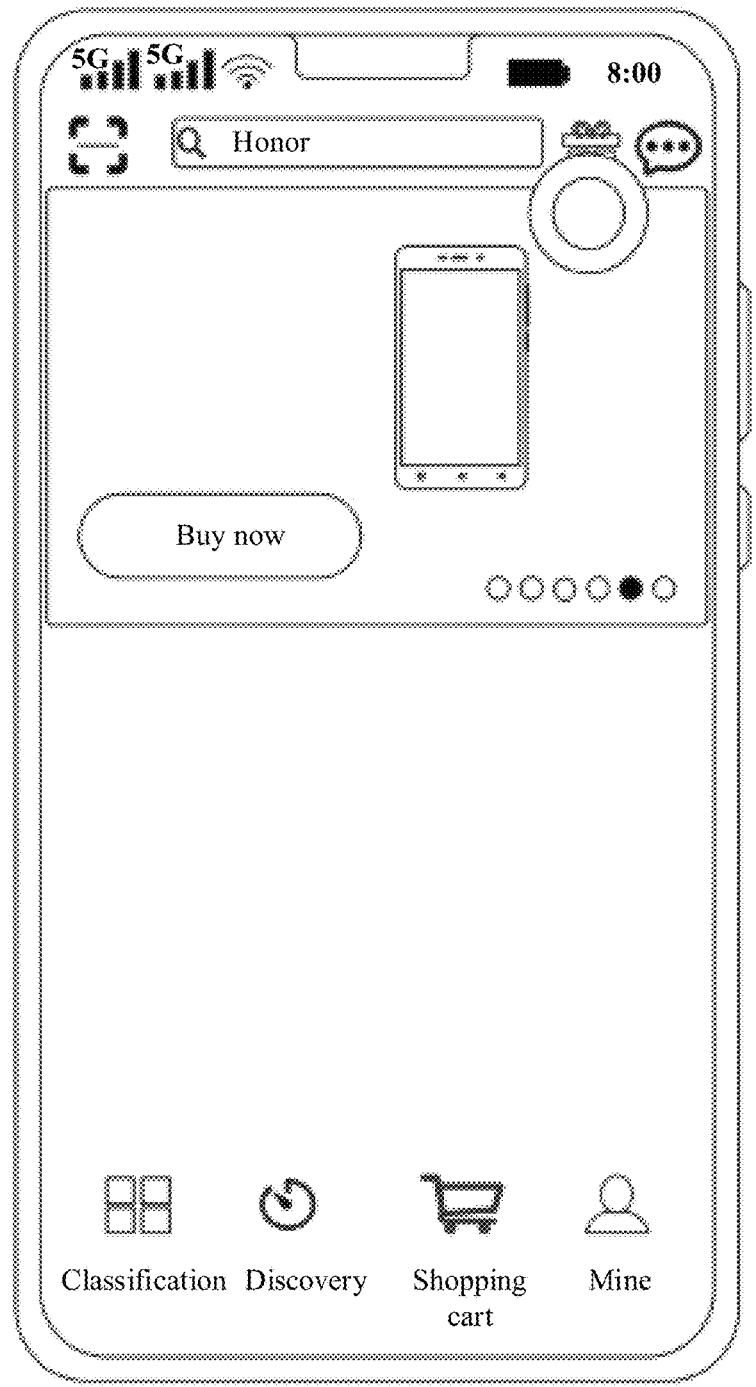
Figure 14H:
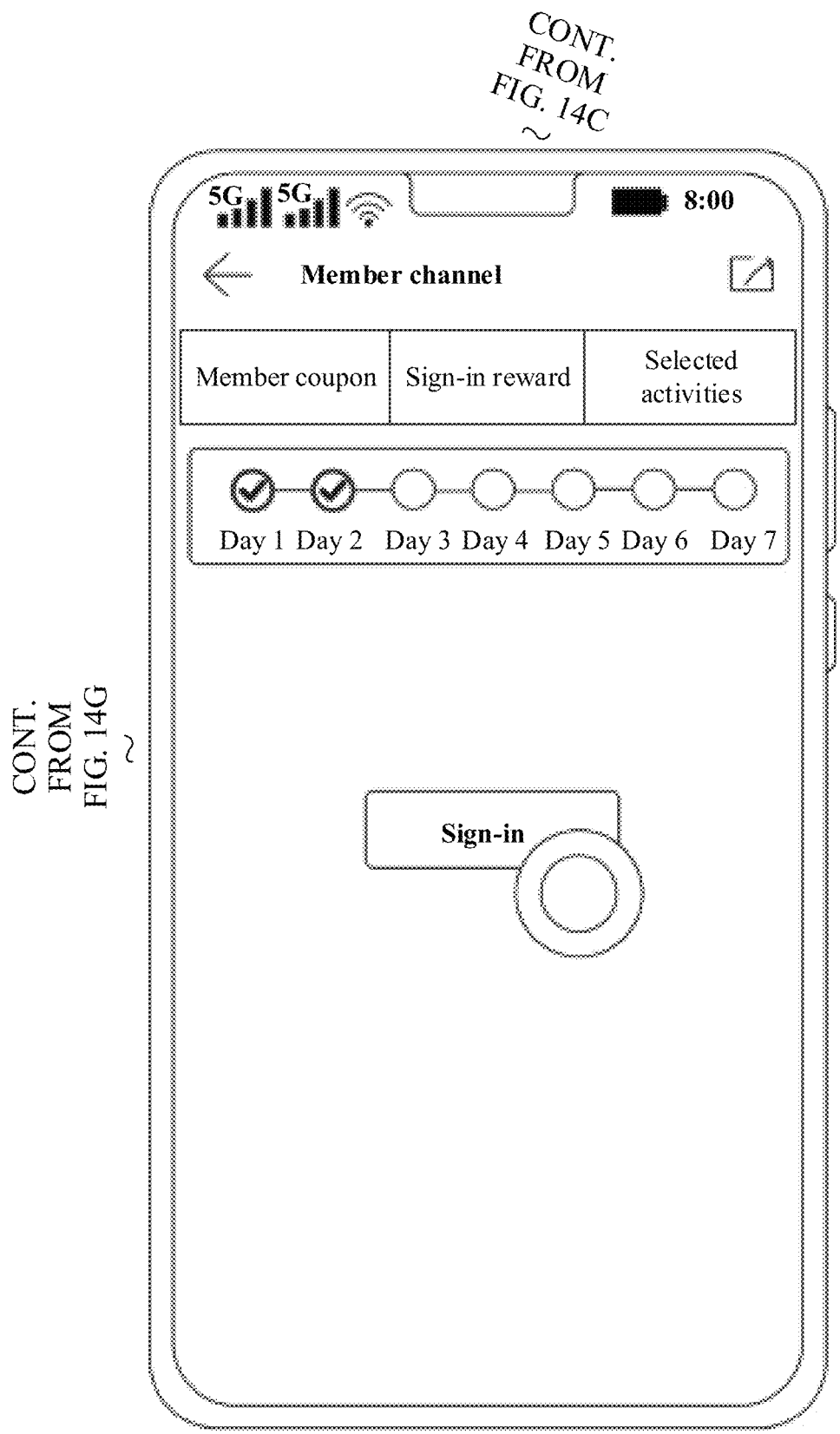

FIG. 14F to FIG. 14H show application interfaces when the mobile phone plays back the H-mall sign-in shortcut operation. The user clicks the H-mall sign-in shortcut operation in the shortcut operation application. In response to the click operation of the user, the shortcut operation service process is called to control the shortcut operation to be played back on the mobile phone. The sign-in process that is played back is the same as the process of the H-mall sign-in shortcut operation that is recorded by the user on the mobile phone. To be specific, in a home page of the H-mall application (refer to FIG. 14F), a control of the "gift" icon is first selected (refer to FIG. 14G), and a "sign-in" control is clicked (refer to FIG. 14H).

FIG. 14D and FIG. 14E show application interfaces for displaying results of playing back the shortcut operation after the mobile phone plays back the H-mall sign-in shortcut operation. After the mobile phone plays back the H-mall sign-in shortcut operation, the mobile phone sends a result of playing back the shortcut operation to the watch.

For example, after the sign-in succeeds on the mobile phone, the mobile phone sends a message indicating that the sign-in succeeds to the watch. After receiving the message indicating that the sign-in succeeds, the watch gives a corresponding prompt on the application interface to show that the sign-in succeeds (refer to 1403 in FIG. 14D). If the sign-in fails after the mobile phone plays back the shortcut operation, the mobile phone sends a message indicating that the sign-in fails to the watch by using a network. After receiving the message indicating that the sign-in fails, the watch gives a corresponding prompt on the application interface to show that the sign-in fails (refer to 1404 in FIG. 14E). It should be noted that the result of playing back the shortcut operation may be prompted in an image form, a text form, or a voice form. A prompt manner is not limited in this embodiment of this application.

It should be noted that if the case, in FIG. 14E, in which the operation fails to be played back occurs, it may be that, in the process of playing back the recorded shortcut operation, a corresponding control is not positioned or a corresponding control is positioned but the control cannot be operated. Alternatively, in some scenarios in which an operation can be performed only when the user logs in to an account, if in a recording process, the user logs in to the account in an application on which the operation is performed, but in a playback process, account information of the user is invalid, the playback process is interrupted, and the user is prompted that a playback operation fails to be performed.

Figure 15A:
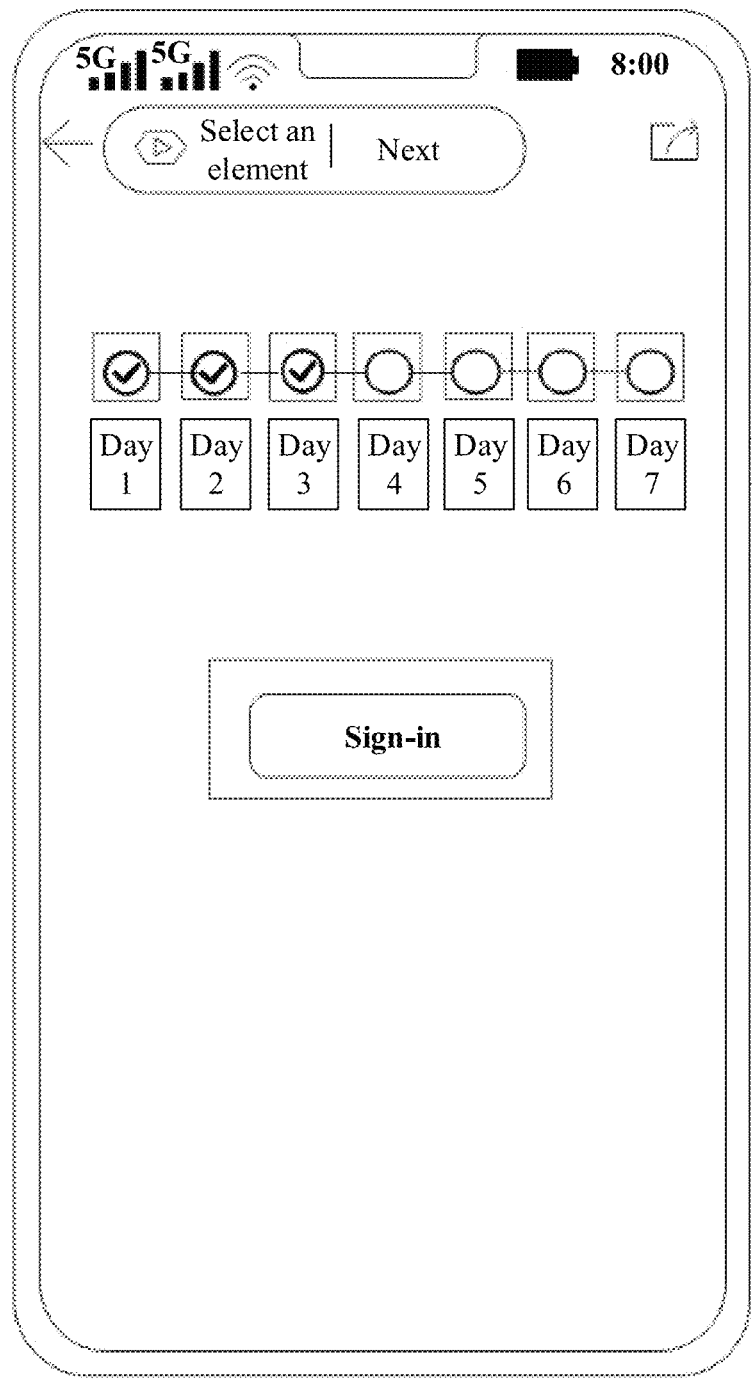
FIG. 15A and FIG. 15B are schematic diagrams of selecting an interface element according to an embodiment of this application.
Figure 15B:
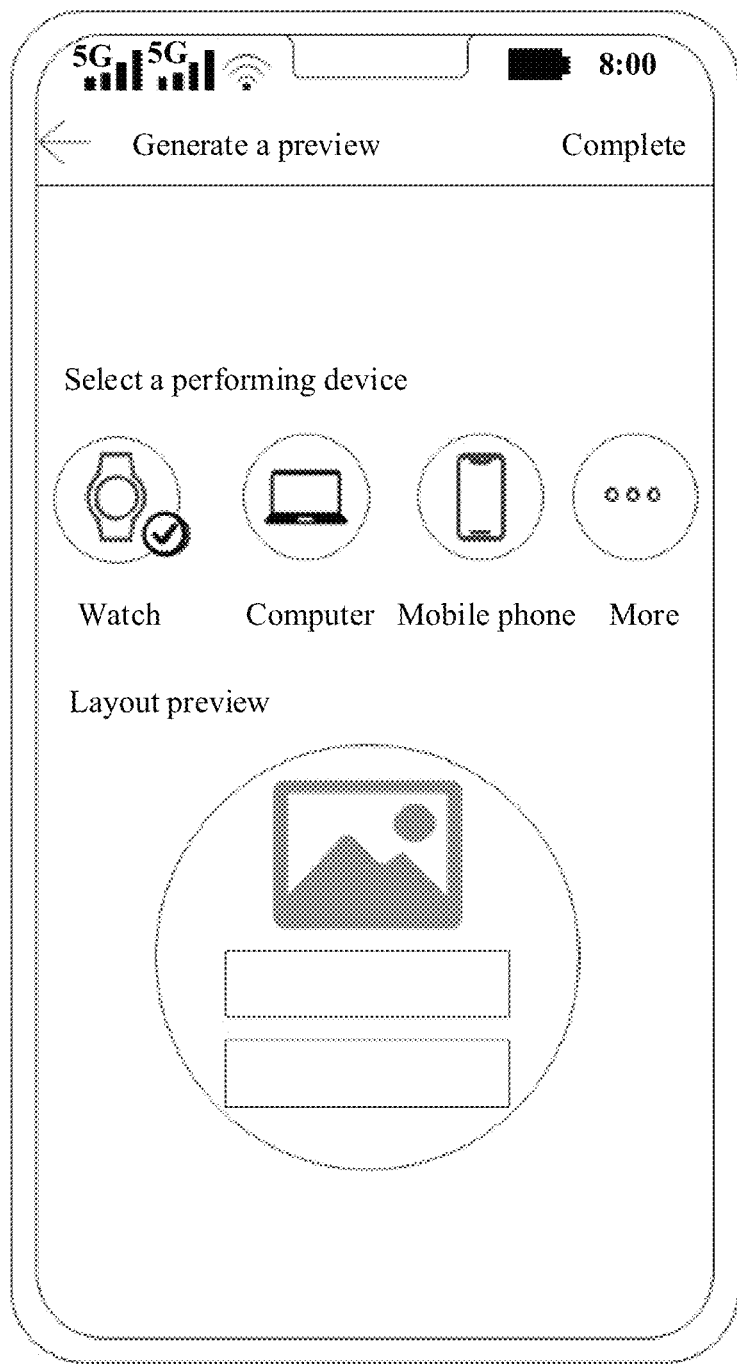

It should be noted that, in FIG. 14C to FIG. 14E, a displayed layout element may be obtained in an application interface of the mobile phone after the user completes a recording operation. For example, refer to FIG. 15A and FIG. 15B. After recording is completed, the user clicks a recording stop control. An application interface shown in FIG. 15A prompts the user to select an element in the interface, or shows, in a box select form, an element that can be selected, so that the user can select the element in the box select form. After selection is completed, "next" is clicked, and an interface shown in FIG. 15B may be displayed. In the interface, the user may select a wanted performing device, to select a device to present the selected layout element. For example, the user may select to display the layout element on the watch to prompt, in the playback process, the user for information related to the playback operation. When the user controls, by using the watch, the shortcut operation to be played back on the mobile phone, the interfaces shown in FIG. 14F to FIG. 14H may not occur, and the shortcut operation that is played back may be performed on a virtual screen of the mobile phone.

Figure 12:
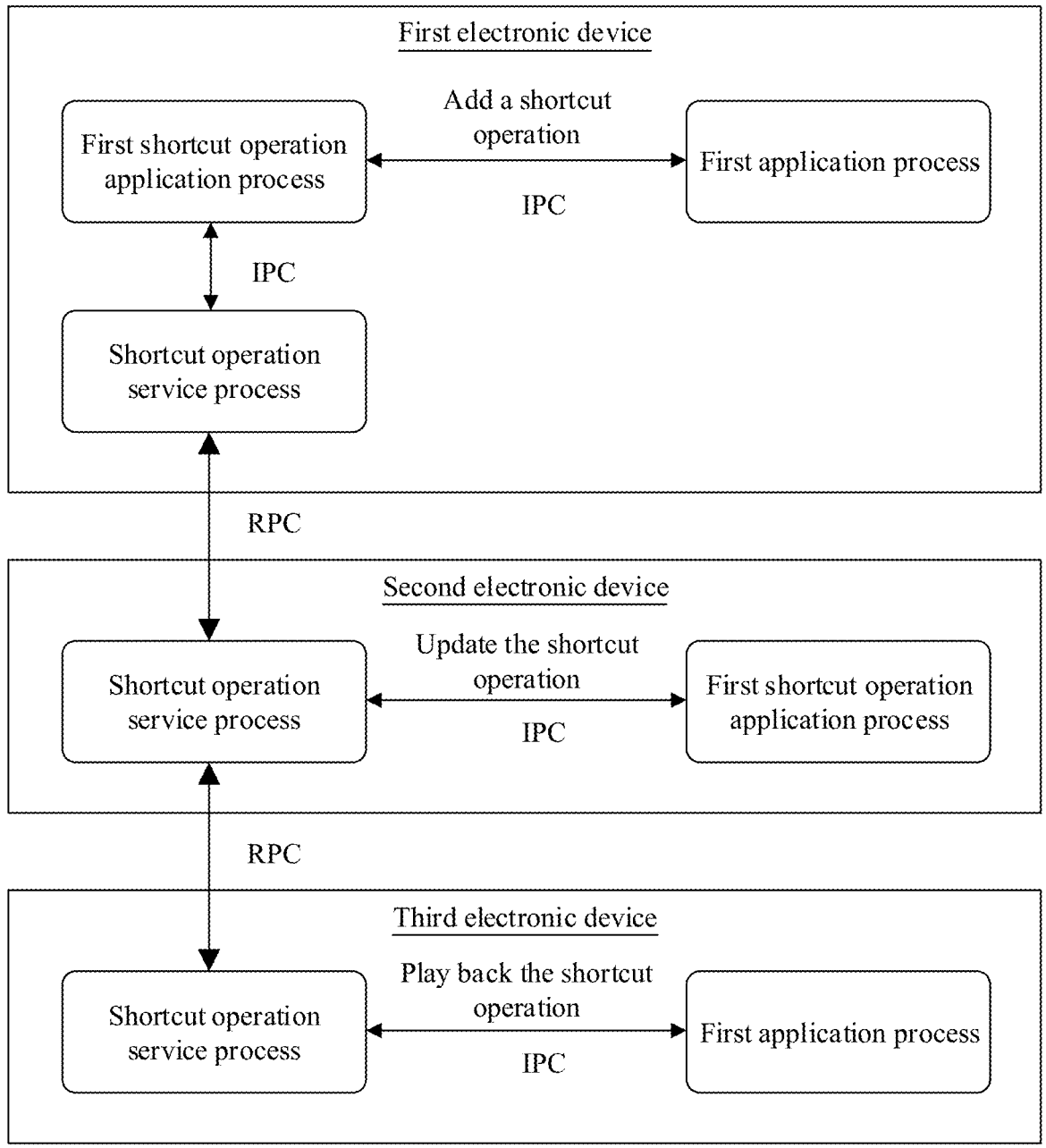
FIG. 12 is a schematic diagram of sharing and playing back a recorded operation of a user according to an embodiment of this application.

As shown in FIG. 12, a first electronic device may send a recorded shortcut operation to a second electronic device, and the second electronic device may send the shortcut operation recorded by the first electronic device to a third electronic device. The second electronic device may control the shortcut operation to be played back on the third electronic device. That the first electronic device is a mobile phone, the second electronic device is a watch, and the third electronic device is a tablet computer is used as an example for description. A shortcut operation recorded by a user on the mobile phone may be sent to the watch, the watch may send the shortcut operation to the tablet computer, and the watch may control the shortcut operation to be played back on the tablet computer.

Figure 13:
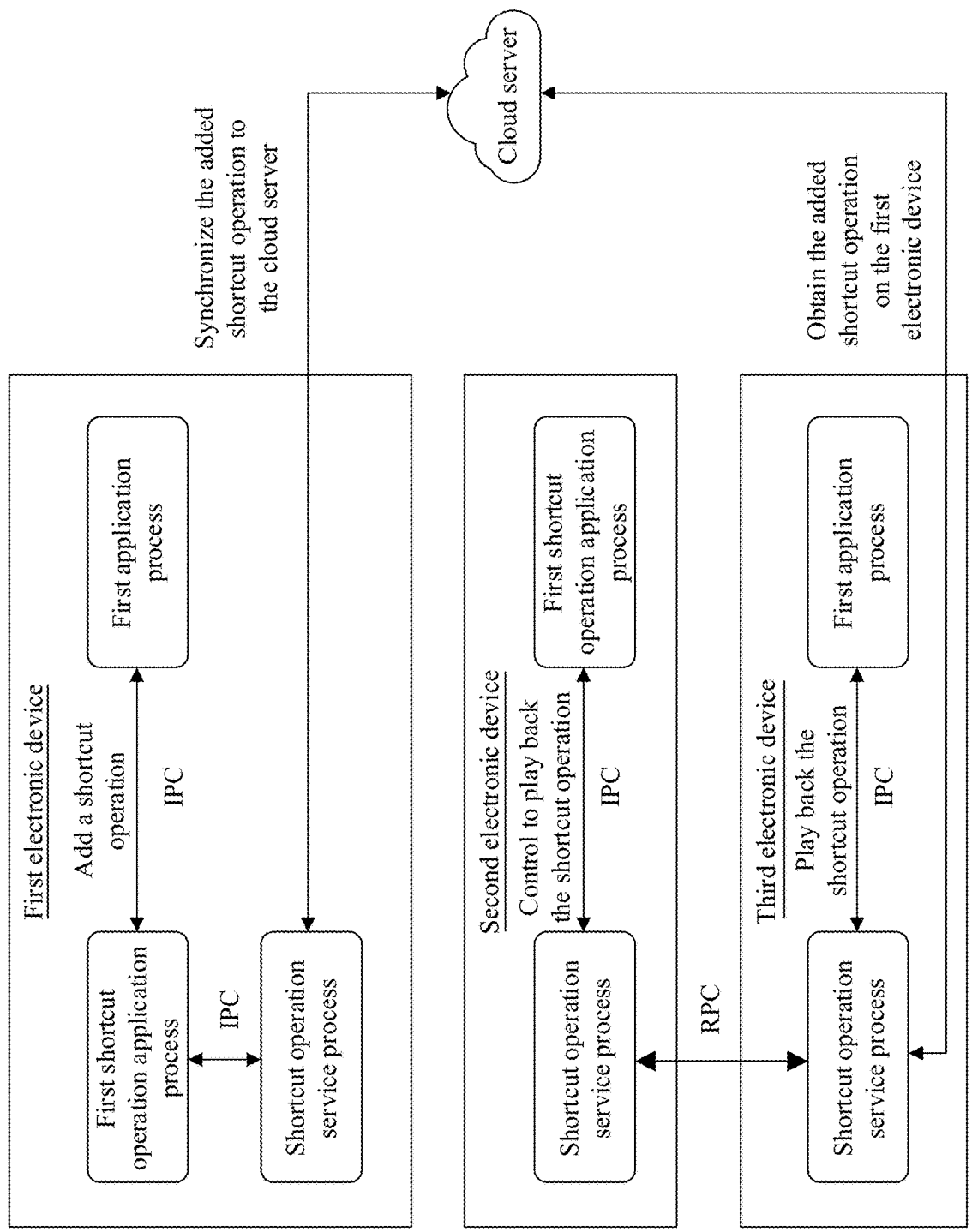
FIG. 13 is a schematic diagram of sharing and playing back a recorded operation of a user according to an embodiment of this application.

As shown in FIG. 13, the first electronic device and the third electronic device may log in to a cloud server by using a same account, so that the third electronic device can obtain the shortcut operation added to the first electronic device. For example, the watch and the mobile phone may log in to a cloud server by using a same account, to obtain, by using a data synchronization function, a shortcut operation sequence sent by the mobile phone to the cloud server.

In some embodiments, the second electronic device may control the first electronic device to add an operation of the user. For example, the second electronic device is a watch, the first electronic device is a mobile phone, and the user may control, by using the watch, the mobile phone to start to record a shortcut operation. For example, after the mobile phone and the watch are paired, the user can inform, through voice control, the watch to start to add a shortcut operation, and the user informs, through voice control, the watch which operation needs to be performed on the mobile phone, and records a performed operation by using a shortcut operation application on the mobile phone.

Figure 16A:
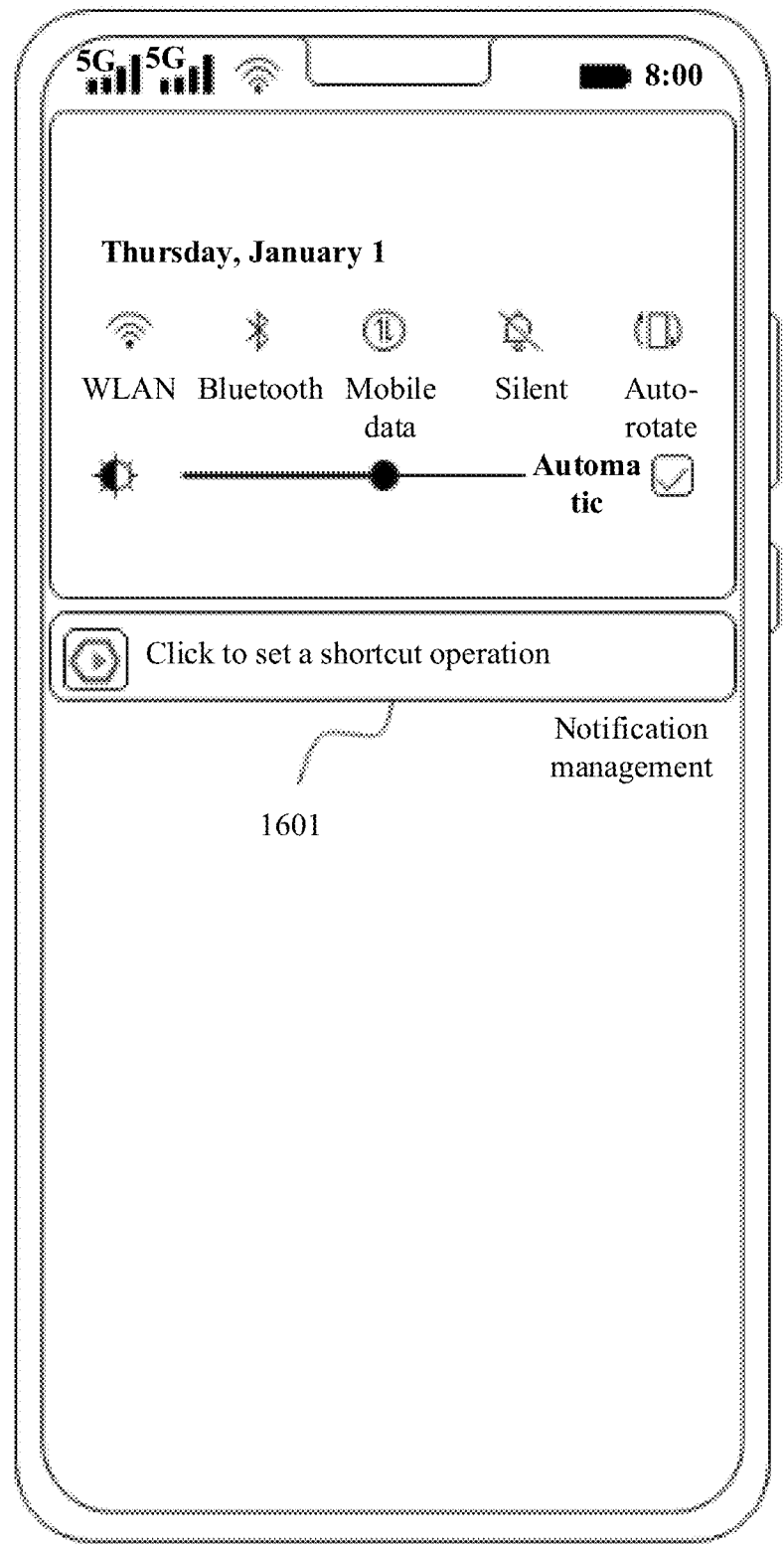
FIG. 16A to FIG. 16C are schematic diagrams of an interface according to an embodiment of this application.

In some embodiments, in a slide-down notification interface in the mobile phone, the user can click and set a shortcut operation control to add the shortcut operation. As shown in FIG. 16A, after sliding down and opening the notification interface in an interface of the mobile phone, the user clicks a control 1601. In response to the click operation of the user, in a possible implementation, the notification interface may jump to an interface of the shortcut operation application in the foregoing embodiment, and the user clicks a shortcut operation adding control in the interface to add the shortcut operation. In another possible implementation, in response to the click operation performed by the user on the control 1601 in the slide-down notification interface of the mobile phone, the notification interface may jump to an application interface of the shortcut operation application in the foregoing embodiment, and the user may select an application on which operation recording is to be performed. For a method for recording an operation of the user in the process of adding the shortcut operation of the user, refer to the same steps in FIG. 7A to FIG. 7C. Details are not described herein again.

Figure 16B:
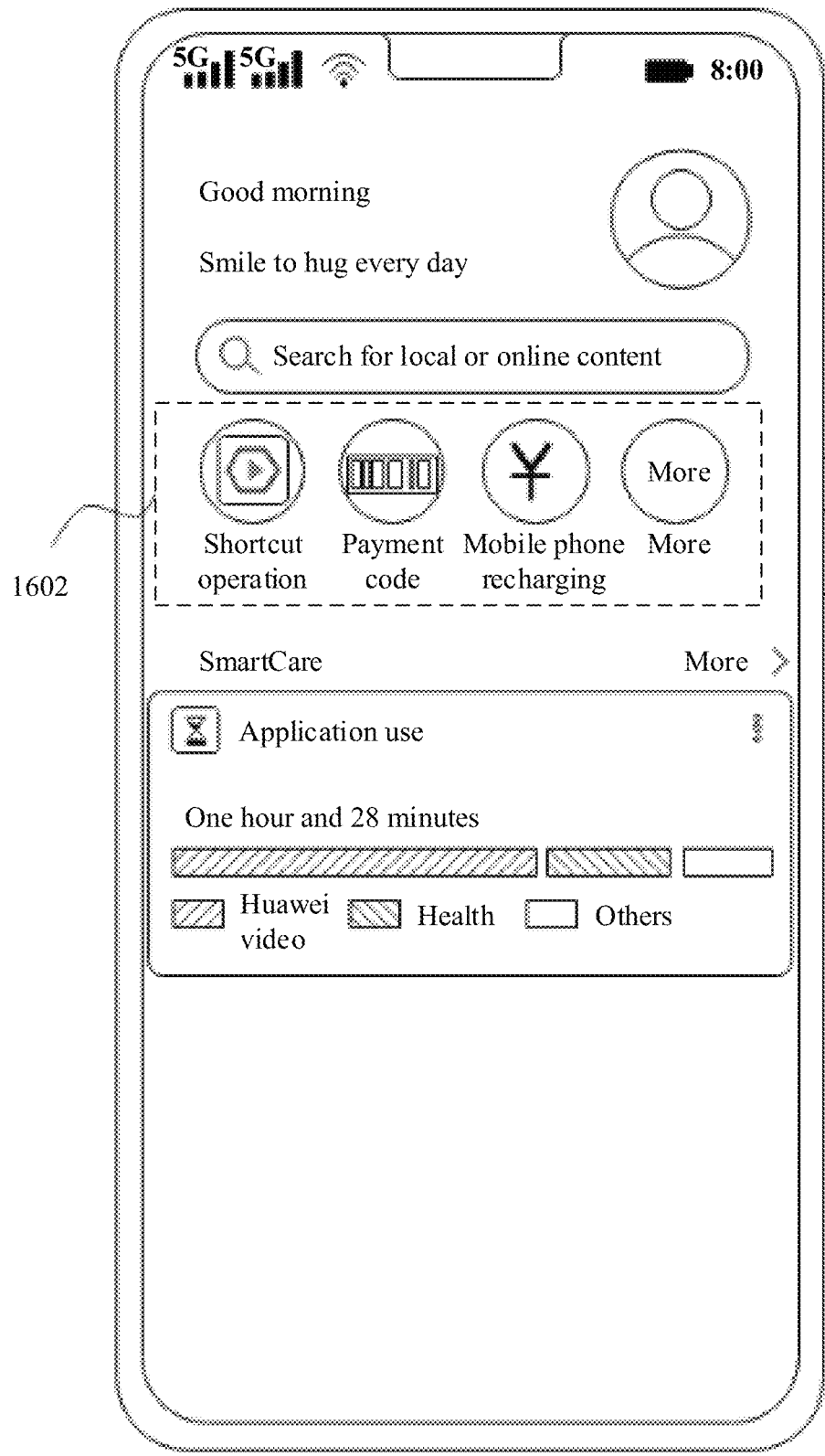

In some embodiments, the user may open the shortcut operation application in a HiBoard of the mobile phone. As shown in FIG. 16B, an area 1602 in an interface of the HiBoard of the mobile phone may display an icon of the shortcut operation application, and the user may click the icon to open the shortcut operation application to add the shortcut operation. For a method for recording an operation of the user in the process of adding the shortcut operation of the user, refer to the same steps in FIG. 7A to FIG. 7C. Details are not described herein again.

Figure 16C:
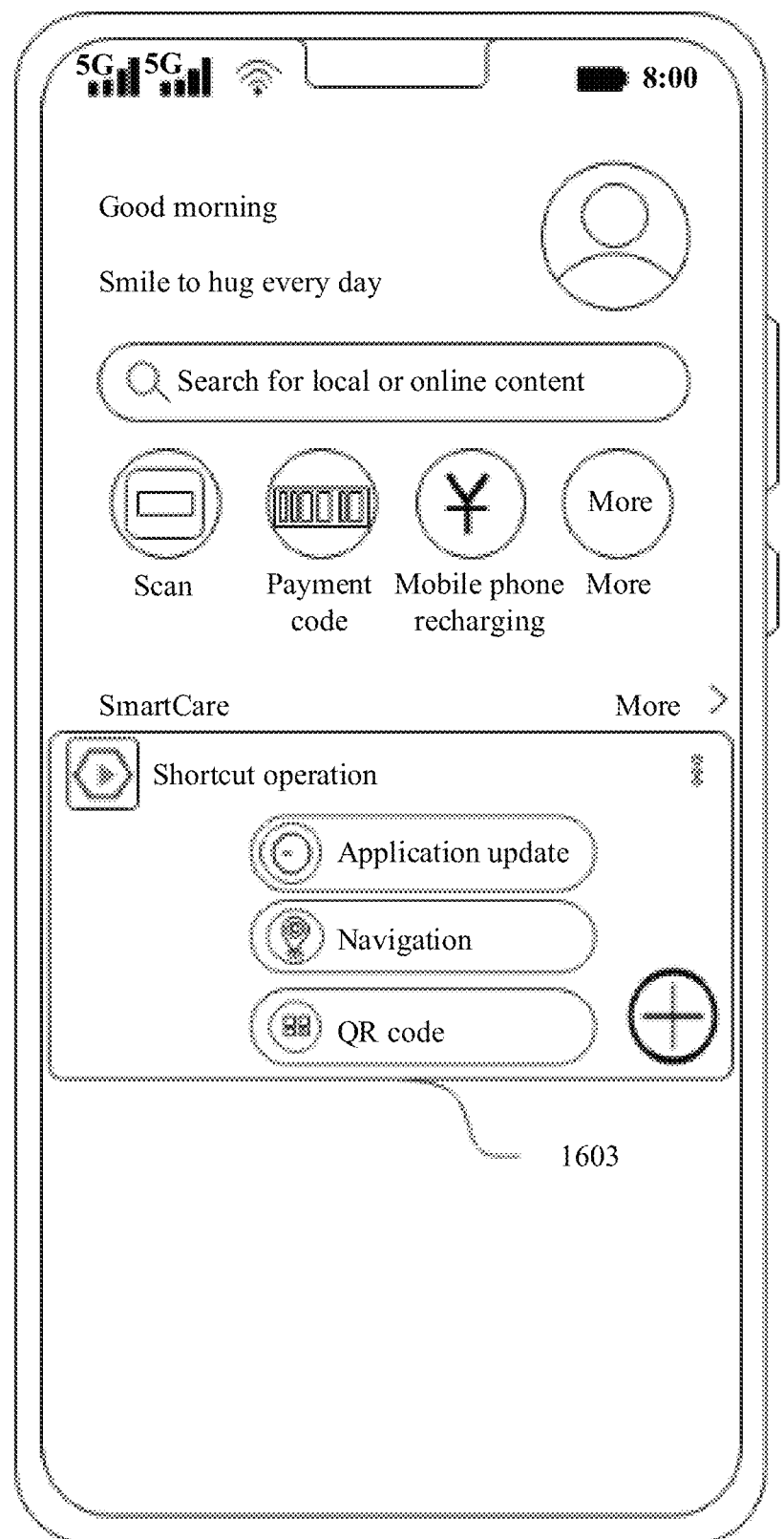

In some other embodiments, the interface of the shortcut operation application may be displayed in a SmartCare area in the interface of the HiBoard of the mobile phone. As shown in FIG. 16C, an area 1603 of the interface of the HiBoard of the mobile phone may display the interface of the shortcut operation application, and in the interface, the user may click the shortcut operation adding control to add the shortcut operation. In this interface, the user may alternatively select a shortcut operation to be played back, to control, by using the mobile phone, another electronic device paired with the mobile phone to play back the selected shortcut operation. For a method for playing back an operation of the user on the another electronic device, refer to the same steps in the embodiment shown in FIG. 10. Details are not described herein again.

Figure 17:
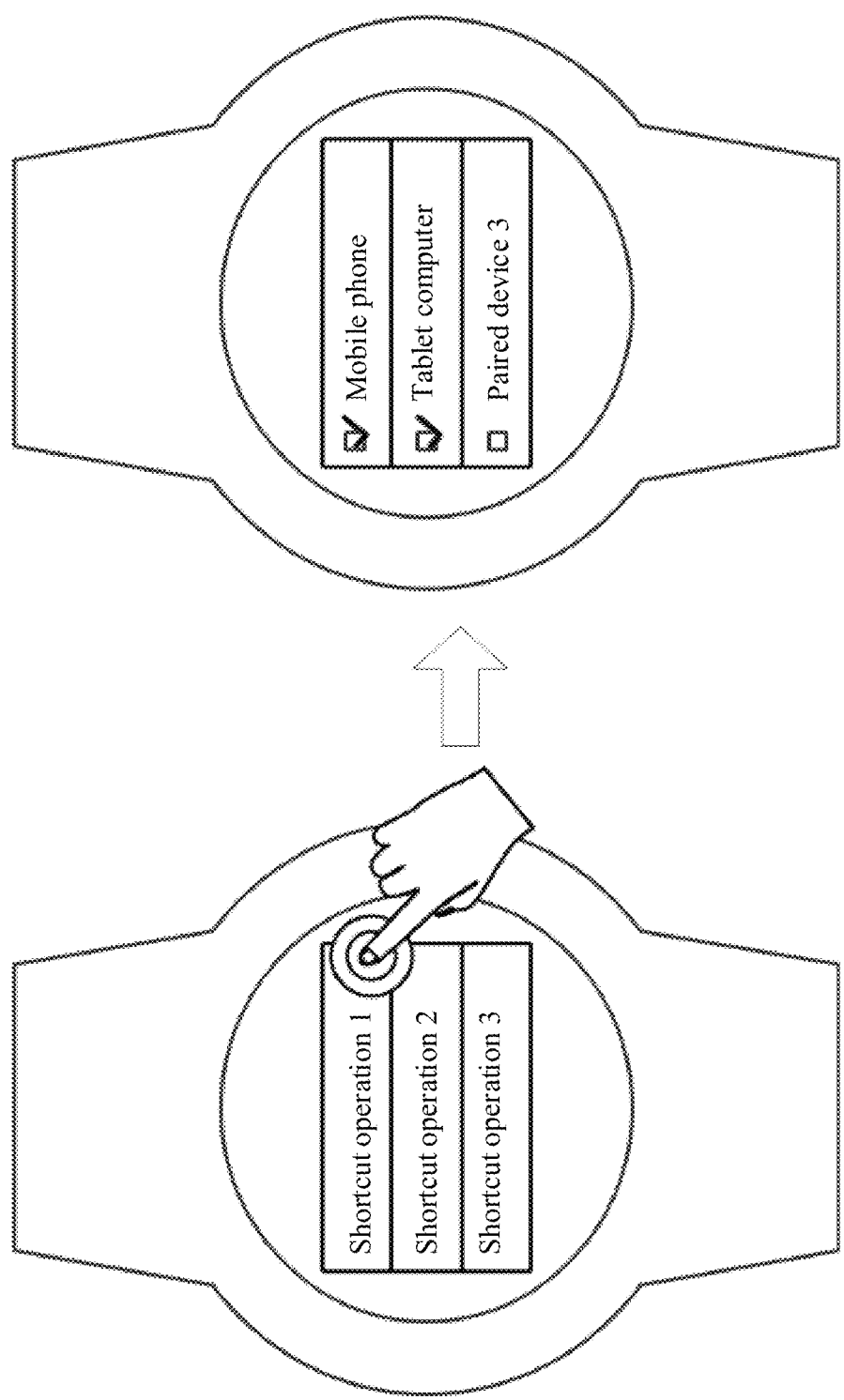
FIG. 17 is a schematic diagram of a scenario in which an operation of a user is played back according to an embodiment of this application.

In a playback control process, when the user wants to play back a recorded shortcut operation on a plurality of electronic devices, the user may select, on the first electronic device, a shortcut operation to be played back and a wanted playback device. For example, after the user selects, on the first electronic device, the shortcut operation to be played back, an interface of the first electronic device may display another electronic device paired with the first electronic device. The first electronic device may have a pairing device selection interface. In the pairing device selection interface, the user selects, from electronic devices that establish a connection to the first electronic device and complete pairing, a wanted electronic device to play back the shortcut operation. The pairing device selection interface may display all other electronic devices that establish a connection to the mobile phone and complete pairing. The pairing device selection interface may further display multi-selection boxes. When the user wants to simultaneously select a plurality of electronic devices to play back the selected shortcut operation, the user may simultaneously check multi-selection boxes corresponding to the plurality of electronic devices. For example, the user selects, on the watch, the mobile phone and the tablet computer as devices for playing back a "mall sign-in" shortcut operation. Refer to FIG. 17.

It should be noted that, in the foregoing embodiment, an example in which an operation performed by the user on a third-party application is recorded and played back is used for description. When the user wants to record an operation performed on a built-in application (for example, clock or gallery) of a system, and play back the recorded operation on a plurality of electronic devices, the operation sequence adding method is also applicable.

The invention claimed is:

1. A method for adding an operation sequence, wherein the method comprises:
 displaying a first interface of a first application, wherein the first application is configured to allow a user to add a shortcut operation and manage the shortcut operation, and wherein the first interface comprises a shortcut operation adding control;
 receiving a first operation applied to the shortcut operation adding control;
 displaying, in response to the first operation, a second interface of the first application, wherein the second interface comprises an identifier of a second application;
 receiving a second operation applied to the identifier of the second application;

displaying, in response to the second operation, a third interface associated with the second application, wherein the third interface comprises a first preset control;

also displaying, in response to the second operation, a stop control, wherein the stop control is configured to allow a user to stop a recording operation performed by the user;

receiving a third operation applied to the first preset control;

displaying, in response to the third operation, a fourth interface associated with the second application;

receiving a fourth operation applied to the stop control;

displaying, in response to the fourth operation, a fifth interface of the first application, wherein the fifth interface is configured to allow a user to set a name for a shortcut operation associated with the second application;

adding the shortcut operation associated with the second application after the name is set;

receiving a fifth operation for triggering playing back the shortcut operation associated with the second application;

displaying, in response to the fifth operation, the third interface; and displaying the fourth interface after displaying the third interface.

2. The method according to claim 1, wherein the fourth interface comprises a second preset control, and wherein before receiving the fourth operation applied to the stop control, the method further comprises:

receiving a sixth operation applied to the second preset control.

3. The method according to claim 1, wherein the method further comprises:

displaying, in response to the second operation, a recording control, wherein the recording control indicates to the user that operations of the user are being recorded.

4. The method according to claim 1, wherein the second interface comprises a plurality of identifiers of applications already installed, wherein the identifiers of the applications already installed comprises the identifier of the second application.

5. The method according to claim 1, wherein the displaying, in response to the fifth operation, the third interface comprises:

automatically displaying, in response to the fifth operation, the third interface.

6. The method according to claim 5, wherein the displaying the fourth interface after displaying the third interface comprises:

automatically displaying the fourth interface after displaying the third interface.

7. The method according to claim 1, wherein the first interface comprises a name of a shortcut operation added by the user.

8. The method according to claim 1, wherein the name for the shortcut operation associated with the second application is set by the user or automatically generated by the first application.

9. The method according to claim 1, wherein operation information of the third operation is saved in a process of recording the operation performed by the user.

10. The method according to claim 9, wherein operation information of the third operation comprises an operation event type.

11. An electronic device, comprising one or more touchscreens, one or more memories, and one or more processors, wherein the one or more memories store one or more computer programs; and when the one or more processors execute the one or more computer programs, the electronic device is enabled to:

display a first interface of a first application, wherein the first application is configured to allow a user to add a shortcut operation and manage the shortcut operation, and wherein the first interface comprises a shortcut operation adding control;

receive a first operation applied to the shortcut operation adding control;

display, in response to the first operation, a second interface of the first application, wherein the second interface comprises an identifier of a second application;

receive a second operation applied to the identifier of the second application;

display, in response to the second operation, a third interface associated with the second application, wherein the third interface comprises a first preset control;

also display, in response to the second operation, a stop control, wherein the stop control is configured to allow a user to stop a recording operation performed by the user;

receive a third operation applied to the first preset control;

display, in response to the third operation, a fourth interface associated with the second application;

receive a fourth operation applied to the stop control;

display, in response to the fourth operation, a fifth interface of the first application, wherein the fifth interface is configured to allow a user to set a name for a shortcut operation associated with the second application;

add the shortcut operation associated with the second application after the name is set;

receive a fifth operation for triggering playing back the shortcut operation associated with the second application;

display, in response to the fifth operation, the third interface; and display the fourth interface after displaying the third interface.

12. The electronic device according to claim 11, wherein the fourth interface comprises a second preset control, and wherein before receiving the fourth operation applied to the stop control, the electronic device is further enabled to:

receive a sixth operation applied to the second preset control.

13. The electronic device according to claim 11, wherein the electronic device is further enabled to:

display, in response to the second operation, a recording control, wherein the recording control indicated to the user that operations of the user are being recorded.

14. The electronic device according to claim 11, wherein the second interface comprises a plurality of identifiers of applications already installed, wherein the identifiers of the applications already installed comprises the identifier of the second application.

15. The electronic device according to claim 11, wherein the electronic device is further enabled to:

automatically display, in response to the fifth operation, the third interface.

16. The electronic device according to claim 15, wherein the electronic device is further enabled to:

automatically display the fourth interface after displaying the third interface.

17. The electronic device according to claim 11, wherein the first interface comprises a name of a shortcut operation added by the user.

18. The electronic device according to claim 11, wherein the name for the shortcut operation associated with the second application is set by the user or automatically generated by the first application.

19. The electronic device according to claim 11, wherein operation information of the third operation is saved in a process of recording the operation performed by the user.

20. The electronic device according to claim 19, wherein operation information of the third operation comprises an operation event type.

* * * * *